US005825670A

United States Patent [19]
Chernoff et al.

[11] Patent Number: 5,825,670
[45] Date of Patent: *Oct. 20, 1998

[54] HIGH PRECISON CALIBRATION AND FEATURE MEASUREMENT SYSTEM FOR A SCANNING PROBE MICROSCOPE

[75] Inventors: Donald A. Chernoff; Jason D. Lohr, both of Indianapolis, Ind.

[73] Assignee: Advanced Surface Microscopy, Indianapolis, Ind.

[*] Notice: The term of this patent shall not extend beyond the expiration date of Pat. No. 5,644,512.

[21] Appl. No.: 811,603

[22] Filed: Mar. 5, 1997

Related U.S. Application Data

[63] Continuation-in-part of Ser. No. 610,726, Mar. 4, 1996, Pat. No. 5,644,512.

[51] Int. Cl.[6] ............................... H02N 2/02; G01B 5/28
[52] U.S. Cl. ...................... 364/571.02; 73/105; 250/307; 315/317
[58] Field of Search .................... 364/571.01, 571.02; 310/316, 317, 318; 359/202; 356/373, 375, 376; 358/504, 505; 73/105; 250/306, 307, 308, 309, 310, 311, 559.29, 234, 235

[56] References Cited

U.S. PATENT DOCUMENTS

| | | | |
|---|---|---|---|
| 4,677,296 | 6/1987 | Lischke et al. | 250/310 |
| 5,051,646 | 9/1991 | Elings et al. | 310/317 |
| 5,107,113 | 4/1992 | Robinson | 250/306 |
| 5,172,002 | 12/1992 | Marshall | 250/561 |
| 5,198,715 | 3/1993 | Elings et al. | 310/328 |
| 5,204,531 | 4/1993 | Elings et al. | 250/306 |
| 5,210,410 | 5/1993 | Barret | 250/234 |
| 5,321,977 | 6/1994 | Clabes et al. | 73/105 |
| 5,345,816 | 9/1994 | Clabes et al. | 73/105 |
| 5,469,734 | 11/1995 | Schuman | 73/105 |
| 5,526,165 | 6/1996 | Toda et al. | 359/202 |
| 5,534,359 | 7/1996 | Bartha et al. | 428/688 |
| 5,557,156 | 9/1996 | Elings | 310/316 |
| 5,568,003 | 10/1996 | Deck | 310/316 |

OTHER PUBLICATIONS

Anderson, Erik et al., "Metrology of Electron–Beam Lithography Systems using Holographically Produced Reference Samples", J. Vac, Sci. Technol. B 9(6), Nov./Dec. 1991, pp. 3606–3611.

Boegli, V. et al., "Automatic Mark Detection in Electron Beam Nanolithography Using Digital Image Processing and Correlation", J. Vac. Sci. Technol., B8(6), Nov. Dec. 1990, pp. 1994–2001.

Gatherer, Alan et al., "A Lower Bound on Alignment Accuracy and Subpixel Resolution in Lithograph", J. Vac. Sci. Technol., B 9(6), Nov. Dec. 1991, pp. 3601–3605.

(List continued on next page.)

*Primary Examiner*—Emanuel Todd Voeltz
*Assistant Examiner*—Tony M. Cole
*Attorney, Agent, or Firm*—Woodard, Emhardt, Naughton, Moriarty & McNett

[57] ABSTRACT

The present invention allows for calibration of a scanning probe microscope under computer control. The present invention comprehends either the removal of nonlinear artifacts in the microscope output data after measurement has been taken (a off-line process), or the correction of nonlinear movements in the microscope scanner such that the scanner moves in a linear fashion during measurement (a realtime process). The realtime process may be operated in both an open-loop and a closed-loop process. The processes of the present invention uses an average cross-section of the scan in order to simplify the calculation and to improve the signal-to-noise ratio. Interpolation methods and centroid calculations are used to locate features on the scanned sample to subpixel precision. Comparison of the measured scan feature positions with the known topography of the scanned calibration specimen enable the present invention to assemble a calibrated length scale which may be used to correct individual feature positions in a full two-dimensional scan, each scan line in a two-dimensional image, or an average cross-section of the two-dimensional scan.

69 Claims, 42 Drawing Sheets

OTHER PUBLICATIONS

Gehrtz, M. et al., "Edge Position Measurement with a Scanning Probe Microscope", J. Vac. Sci. Technol., B 12(6), Nov./Dec. 1994, pp. 3567–3570.

Griffith, J.E. et al., "A Scanning Tunneling Microscope with a Capitance–Based Position Monitor", J. Vac. Sci. Technol., B 8(6), Nov./ Dec. 1990, pp. 2023–2027.

Hubner, B. et al., "Simple Metrology Scheme with Nanometer Resolutino Employed to Check the Accuracy of an Electron Beam Lithography System", J. Vac. Sci. Technol., B 10(6), Nov./Dec. 1992, pp. 2648–2652.

Okayama, S. et al., "Observation of Microfabricated Patters by Scanning Tunneling Microscopy", J. Vac. Sci. Technol., A 6(2), Mar./Apr. 1988, pp. 440–444.

Pragler, C.J. et al., "Alignment Signal Failure Detection and Recovery in Real Time", J. Vac. Sci. Technol., B 11(6), Nov./Dec. 1993, pp. 2164–2174.

Wilson, R.J. et al., "Image Processing Techniques for Obtaining Registrations Information with Scanning Tunneling Microscopy", J. Vac. Sci. Technol., A 6(2), Mar./Apr. 1988, pp. 398–400.

Young, Ian T., "Quantitative Microscopy", IEEE Engineering in Medicine and Biology, Jan./Feb. 1996, pp. 59–66.

Durselen, R., U. Grunewald, W. Preuss, "Calibration and Applications of a High–Precision Piezo Scanner for Nanometrology", Scanning, vol. 17, 1995, pp. 91–96.

Zhang, Nien Fan, Michael T. Postek, Robert D. Larrabee, Leon Carrol, Wm. J. Keery, "A New Algorithm for The Measurement of Pitch in Metrology Instruments", presented at SPIE Microlithography Conference, Feb. 1996.

Digital Equipment Corp., "The Envelope–Processing (NVELOP) Subroutine," *Laboratory Subroutines Programmer's Reference Manual,* Jan. 1982.

Fu, Joe, "Fortran IV Computer Software Program V02.5–11," Jun. 1985.

National Institute of Standards and Technology, Certificate of Analysis Standard Reference Material 484g, Scanning Electronc Microscope Magnification Standard (A Stage Micrometer Scale), Sep. 1996.

Fu, J., M.C. Croarkin, and T.V. Vorburger, "The Measurement and Uncertainty of a Calibration Standard for the Scanning Electronic Microscope," *Journal of Research of the National Institute of Standards and Technology,* vol. 99, No. 2, Mar.–Apr. 1994.

Fu, J. and T.V. Vorburger, "The Calibration of Scanning Electronic Microscope Magnification Standards SRM484" Metrology, Inspection, and Process Control and Microlithography X, *SPIE,* vol. 2725, Mar. 11–13, 1996.

ID
HIGH PRECISON CALIBRATION AND FEATURE MEASUREMENT SYSTEM FOR A SCANNING PROBE MICROSCOPE

TECHNICAL FIELD OF THE INVENTION

The present application is a continuation-in-part of U.S. patent application Ser. No. 08/610,726 filed Mar. 4, 1996, now U.S. Pat. No. 5,644,512.

The present invention generally relates to scanning probe microscopes and, more particularly, to a high precision calibration and feature measurement system for a scanning probe microscope.

BACKGROUND OF THE INVENTION

In a scanning probe microscope, such as a scanning tunneling microscope (SPM), a scanning near-field optical microscope (SNOM) or an atomic force microscope (AFM), for example, a probe is scanned across the surface of a sample to determine properties of the surface such as topography or magnetic field strength, so that these properties can be displayed for viewing. Alternately, the sample can be scanned across a fixed probe. Some of these microscopes, i.e., the SPM and the AFM, have been constructed with the ability to resolve individual atoms by either scanning the probe or the sample. The scanner which provides the motion is usually a piezoelectric device adapted for moving in all three dimensions, i.e. in the X-Y plane and in the vertical (Z-axis) direction. As can be appreciated, if one is to resolve movement of a probe to the atomic level, the actuating mechanism must be stable and accurately moveable in small increments.

Three dimensional scanners have been made in the form of a tube whose probe- or sample-carrying end can be made to deflect in the X, Y and Z directions through the application of voltages to various electrodes on the tube. As depicted in simplified form in FIGS. 1 and 2, the scanner 10 has a plurality of electrodes (not shown) to which voltages are applied to cause scanning action. The core of the scanner 10 is formed from a tube of a piezoelectric material. The scanner 10 is attached to a structure at 12 and has a free end at 14 to which the probe 16 (or sample) is attached. By applying a voltage to certain electrodes, the scanner 10 can be made to elongate and shorten, as indicated by the dashed arrows, and thereby create motion in the Z-axis. Likewise, by applying a voltage to other electrodes, the scanner 10 can be made to deflect the free end 14 to one side or the other, or both, and thereby create motion in the X- and Y-axes as indicated by the ghosted positions of FIG. 1 and 2. As those skilled in the art will readily recognize, a variety of other scanner configurations (tripods, bimorph benders, flexure stages, etc.) and materials (electrostrictive, etc.) can be used within the scope and spirit of the present invention, even though the above background description refers to piezo-electric tube scanners.

With acceptance and contemporary usage of such devices, it has become important to make scanning probe microscopes which have large scan ranges (for example, up to 150 microns) and good mechanical stability. The motion of the piezoelectric scanner is essentially proportional to the electric field in the piezoelectric material, which is equal to the voltage across the material divided by the thickness of the tube. As is known in the art, complementary voltages x, -x and y, -y can be applied to the various scanning electrodes to give larger scan ranges and more symmetry. While such techniques can provide the larger scan range of movement desired, the inherent nature of the piezoelectric material used to form the tubes begins to create problems of its own as the scan distance (i.e. the amount of bending created in the tube) is increased.

Scanning is typically accomplished in a so-called "raster" fashion such as that of the electron beam which creates a television picture; that is, the probe 16 (or sample) moves in, for example, the X direction at a high rate, and in the perpendicular direction, i.e. the Y direction, at a low rate to trace out a path such as that indicated as 28 in FIG. 3. Data about the height, magnetic field, temperature, etc. of the surface 30 of the sample 18 is then collected as the probe 16 is moved along. In these scanners, the X and Y position of the probe 16 is inferred from the voltages which are applied to the electrodes on the piezoelectric material of the tube. In the prior art, these scan voltages are sometimes triangle functions in X and Y (vs. time) to produce, if the deflection of the scanner is linear with voltage, a raster scan of the probe in both the X and Y directions. Often, DC voltages are also added to the scan electrodes to position the raster scan over different areas of the sample surface; that is, to select where on the sample the center position of the raster scan will be. The triangle function has the feature that the voltage, and therefore presumably the probe position, changes at a constant rate so that the probe moves at a constant velocity back and forth in the X direction, while moving at a lower constant velocity up and down in the Y direction. This constant velocity then allows data taken at constant time intervals (as the probe moves in X and Y) to also be spaced at constant distance intervals. Since computers can conveniently take data at constant time intervals, they can then store and/or plot the data in a two-dimensional array representing position, i.e. in an X-Y array. It will be appreciated by those skilled in the art that the motion in X and Y will usually consist of small steps rather than a linear ramp because the scan voltages are changed in finite increments, as is convenient under computer control.

As the field of scanning probe microscopes has progressed and larger scans of up to 150 microns have been produced so that, for example, the properties of manufactured objects such as optical disks and magnetic recording heads can be measured, the inherent properties of the piezoelectric materials employed in the tubes has begun to affect the above-described scanning process adversely. This is because, unfortunately, piezoelectric material, especially that of high sensitivity, is not a linear material; that is, the deflection of the material is not linear with the voltage applied to the electrodes. Also, the material exhibits hysteresis so that reversals in the direction in which the voltage is changing do not produce a proportional reversal in the direction in which the position of the probe changes. Thus, a triangular voltage in time applied to the electrodes on the piezoelectric material in the manner of the prior art as described above does not produce a linear scan in time. This is illustrated in FIG. 4, where the position of a probe on the scanner as a function of the driving voltage for a one dimensional scan is graphed in simplified form. Notice that as the direction of the voltage changes at the ends of the scan, the position does not trace out the same path. This property of piezoelectric materials is well known and is classified as either hysteresis or "creep".

Sensitivity variation with voltage and hysteresis make it such that the position of the probe is not linear with the voltage applied to the electrodes on the piezoelectric material. Such non-linearity in probe position is transferred to, and therefore corrupts, the topographical data produced by the probe. In the prior art, several different methods exist which reduce the inaccuracies caused by the fundamental non-linearity of the scanner material. U.S. Pat. No. 5,051, 646 to Elings et al. describes the use of a non-linear voltage profile (where each half-cycle of the former triangular wave has been replaced by the sum of a straight line and a decaying exponential). The key parameters of the non-linear function are the amplitude (Mag) and decay constant (Arg) of the exponential. These parameters are adjusted experimentally by the user, based on visual inspection of images and signal traces produced by the microscope. The microscope is then operated in an 'open-loop' mode in which the control system drives the scanner using the pre-determined voltage profile; it is then assumed that the probe position varies linearly with time. Another method in the prior art involves fitting the scanner with position sensors, which may use optical, capacitive or strain transducers. The output of the position sensor is used in a 'closed-loop' mode, that is, the controller adjusts the drive voltage so that the scanner motion conforms to the programmed trajectory. The accuracy of a closed-loop system depends on several assumptions, including: that the sensor output is linear in position (or that its non-linearity has been calibrated), that the frame of reference is stable, that sensor output on each axis is independent of the scanner position on the other axes, and that the Abbe error (due to the distance between the probe and the sensing point) can be neglected.

Although the above methods can provide a noticeable improvement in scan linearity (feature positions can be accurate to 1–5%), residual non-linearity can still be significant for many purposes. With advances in current technology and the strict engineering requirements of many current components, precise, accurate measurements of objects such as CD-ROM surfaces, magnetic films, microlithographic structures and biomaterials need to be made for quality control and to prevent undesired effects. For example, the new DVD (digital video disc) standard calls for a mean track pitch of 740 nm with a maximum allowable jitter (range) of ±30 nm. To achieve a range of ±30 nm, the standard deviation should be 10 nm or less. According to the gage-maker's rule, the measurement tool should be 4× more precise than the object being measured, so therefore a standard deviation of 2.5 nm is required. Current calibration methods for scanning probe microscopes cannot produce this measurement accuracy.

There is therefore a need for a method for calibrating a scanning probe microscope in order to remove non-linearity artifacts in the probe data caused by non-linear probe motion. The present invention is directed toward meeting this need.

SUMMARY OF THE INVENTION

The present invention allows for calibration of a scanning probe microscope under computer control. The present invention comprehends either the removal of nonlinear artifacts in the microscope output data after measurement has been taken (a off-line process), or the correction of nonlinear movements in the microscope scanner such that the scanner moves in a linear fashion during measurement (a realtime process). The realtime process may be operated in both an open-loop and a closed-loop process. The processes of the present invention use an average cross-section of the scan in order to simplify the calculation and to improve the signal-to-noise ratio. Interpolation methods and centroid calculations are used to locate features on the scanned sample to subpixel precision. Comparison of the measured scan feature positions with the known topography of the scanned calibration specimen enable the present invention to assemble a calibrated length scale which may be used to correct individual feature positions in a full two-dimensional scan, each scan line in a two-dimensional image, or an average cross-section of the two-dimensional scan.

The present invention further comprehends dividing the realtime calibration process into a course adjustment process and a fine-tuning process. Further aspects of the present invention include a process for linearizing any scan site after making calibration measurements on just two or more scan sizes; a process for measuring feature separations in the measured sample along arbitrary directions; a process for determining and calibrating Z axis linearity; process for correcting two- and three-dimensional distortions, including cross-coupling of X and Y axes, or X, Y and Z axes; and the design of special calibration specimens in order to enable three-dimensional distortions to be calibrated.

DESCRIPTION OF THE PREFERRED EMBODIMENT

Figure 1:
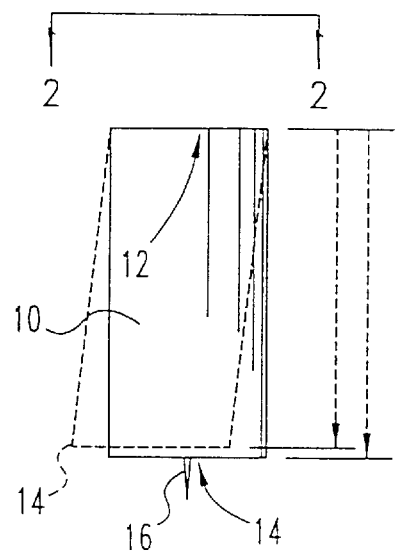
FIG. 1 is a side elevational view of a prior art piezoelectric scanner.
Figure 2:
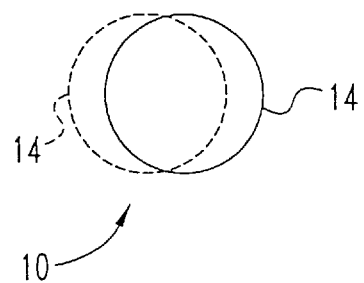
FIG. 2 is a top plan view of the scanner of FIG. 1.

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Figure 5:
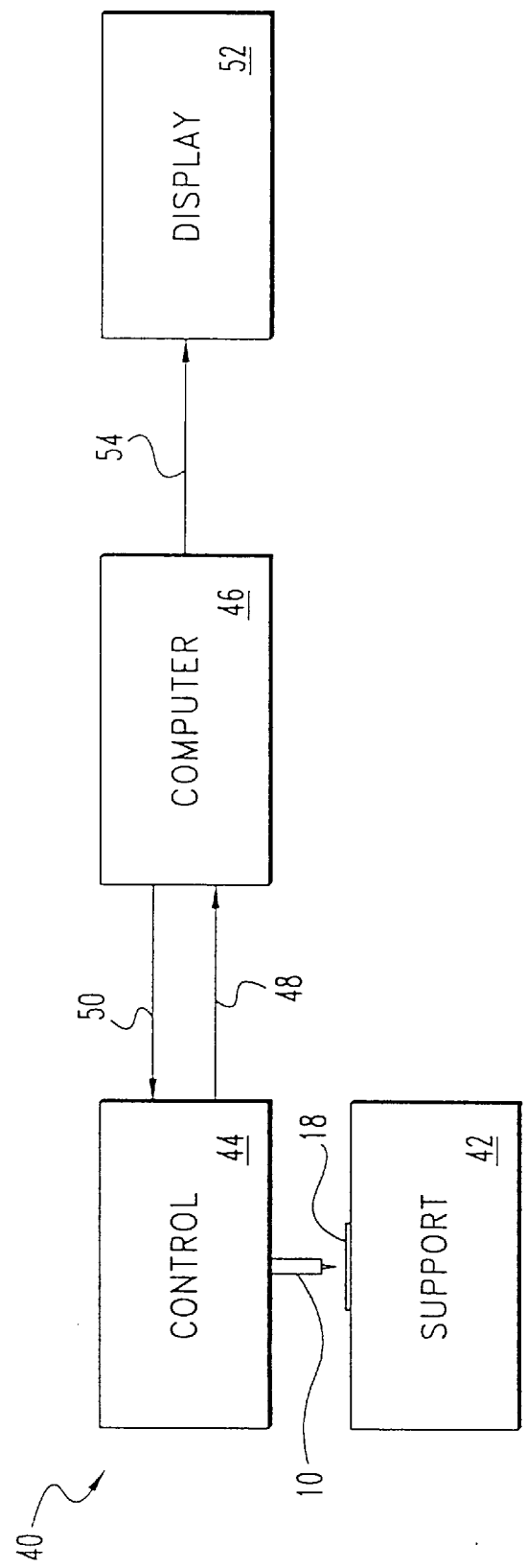
FIG. 5 is a schematic block diagram of a scanning probe microscope and associated computing equipment of the present invention.

The present invention allows for calibration of a scanning probe microscope under computer control. The present invention comprehends either the removal of non-linear artifacts in the microscope output data after measurement has been taken (a so-called off-line process), or the correction of non-linear movements in the microscope scanner such that the scanner moves in a linear fashion during measurement (a so-called realtime process). FIG. 5 illustrates a schematic block diagram of the basic apparatus required to accomplish either of the embodiments of the present invention. A scanning probe microscope is indicated generally at 40 and includes a support 42 which is adapted to hold a sample 18 to be analyzed. A scanner 10 is mounted above the sample 18 and is coupled to control circuitry 44 which is operative to apply the necessary voltage waveforms to the scanner 10 electrodes in order to cause scanning motion thereof. The above components of the scanning probe microscope 40 are well known in the art.

A computer 46 is also provided and is coupled to the control circuitry 44 via communication lines 48 and 50. Measurement data obtained by the scanner 10 is transmitted to the computer 46 via communication line 48, preferably through an analog-to-digital converter which is formed as part of the control circuitry 44 or as part as the input circuitry of the computer 46. Data and instructions may also be transmitted from the computer 46 to the control circuitry 44 via the communication line 50, preferably through a digital-to-analog converter which is formed as either part of the computer 46 output circuitry or as part of the control circuitry 44. The computer 46 may thus instruct the control circuitry 44 as to the voltage waveform which should be applied to the scanner 10 in order to produce linear motion thereof. Finally, the computer 46 is able to communicate the measurement data to the user via a display 52 (such as a CRT or printer) via the communication line 54.

Figure 6:
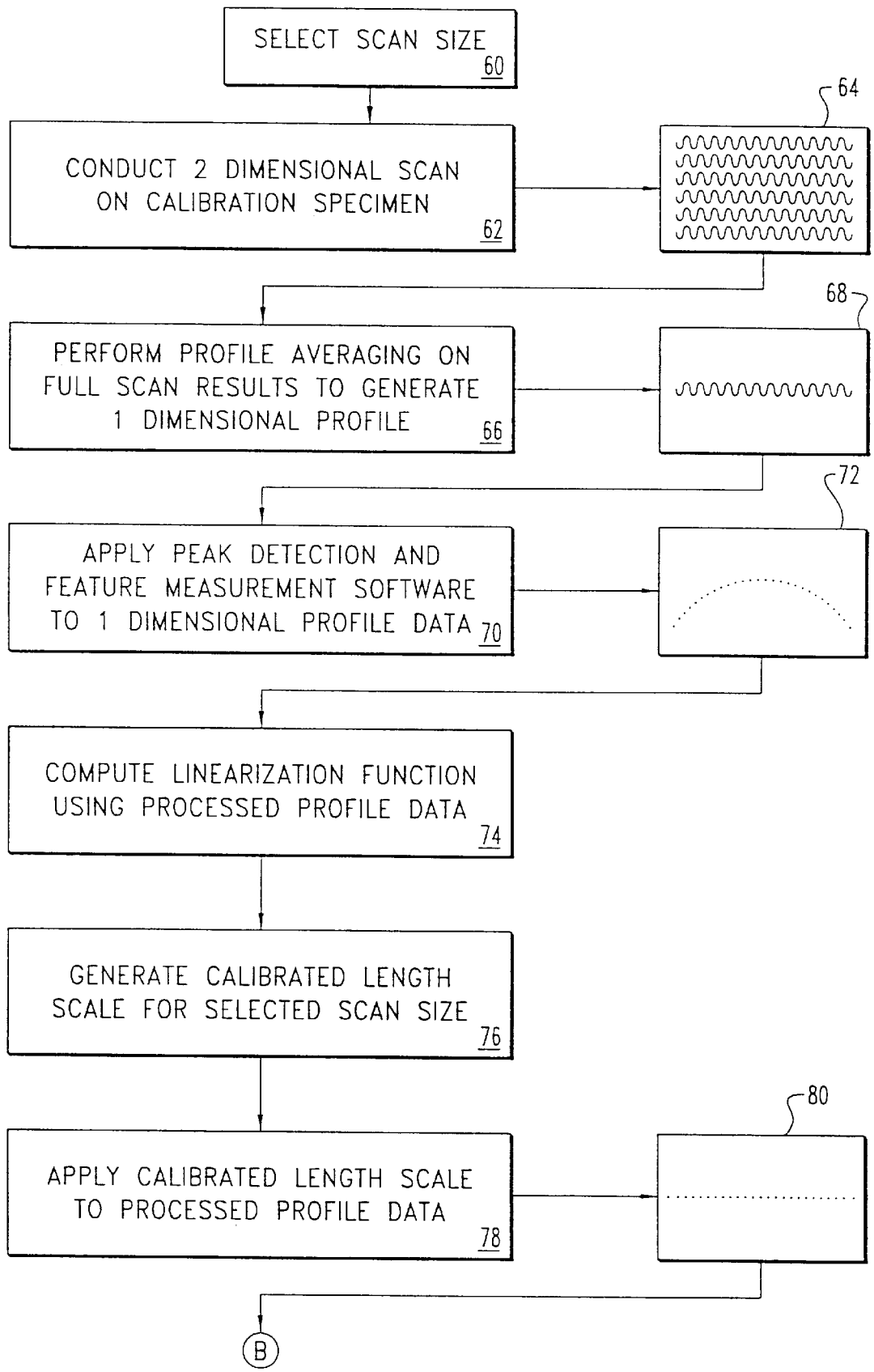
FIG. 6 is a schematic process diagram of an off-line calibration process of the present invention.

Referring now to FIG. 6, there is illustrated a general process flow diagram for a first embodiment off-line process of the present invention. In the process of FIG. 6, the scanning probe microscope 40 is allowed to scan the sample 18 with its inherent, uncorrected, non-linear motion. The measurement data thus produced is corrupted with artifacts from such non-linear motion, however this data may be corrected by the present invention prior to being displayed to the user. The present invention does this by making a measurement on a known calibration specimen and then comparing the resultant measurement data array to the expected data. This comparison will reveal the non-linear artifacts present in the measurement data, which may be recorded and later removed from subsequent measurement results.

The process begins at step 60 by selecting a desired scan size, which is preferably in the range of 1–100 µm. The calibration must be performed for the same scan size which will be used to make subsequent measurements. For purposes of illustration hereinbelow, it will be assumed that the scan data consist of 512 lines containing 512 pixels each. The data value at each point corresponds to the Z height of the surface. At step 62, a calibration specimen is used as the sample 18 and a two-dimensional scan is performed on the calibration specimen, resulting in a two-dimensional data array 64. The calibration specimen may be any material which has a precisely known topography. For example, a precision diffraction grating may be used as the calibration specimen.

Non-linearities are exposed in the present process, including subtle non-linearities which would otherwise be hidden, through the generation and processing of a cross-sectional average line profile of the scan results. This is accomplished by performing a profile averaging operation at step 66 on the full scan results in order to generate a one-dimensional profile 68. A significant part of the improvement in signal-to-noise ratio comes from the fact that averaging removes or reduces the amplitude of edge and surface irregularities found on the calibration features. Such irregularities are an intrinsic characteristic of manufactured calibration specimens and their presence would otherwise degrade the accuracy of subsequent calculations. The one-dimensional profile 68 is basically a cross-sectional average of the full two-dimensional data array 64, and comprises a 1×512 point data array in the illustrated example. The profile averaging process is illustrated in greater detail hereinbelow with reference to FIGS. 8 and 9.

After the one-dimensional profile data array 68 has been generated, peak detection and feature measurement processes are applied to the one-dimensional data array at step 70, in order to generate the processed profile data array 72. The process of step 70 is described in greater detail hereinbelow with respect to FIGS. 10, 16 and 18. The application of the peak detection and feature measurement processes at step 70 function to highlight the non-linearities present in the measurement data. This allows a linearization function to be computed at step 74 and a calibrated length scale for the selected scan size to be generated at step 76. The calibrated length scale is then applied to the processed profile data 72 at step 78 in order to generate the calibrated profile data 80. The processes of steps 74–78 are described in greater detail hereinbelow with respect to FIG. 11. The process then verifies the self-consistency and precision of the calibrated profile data at step 82. Self-consistency is determined by computing the mean of the calibrated pitch data, which are shown graphically at 80. When this mean value is substantially equal to the stated pitch of the calibration sample, then the calibration results are said to be self-consistent. The precision of the calibrated profile data is determined by comparing its standard deviation with a preselected standard deviation goal.

Figure 7:
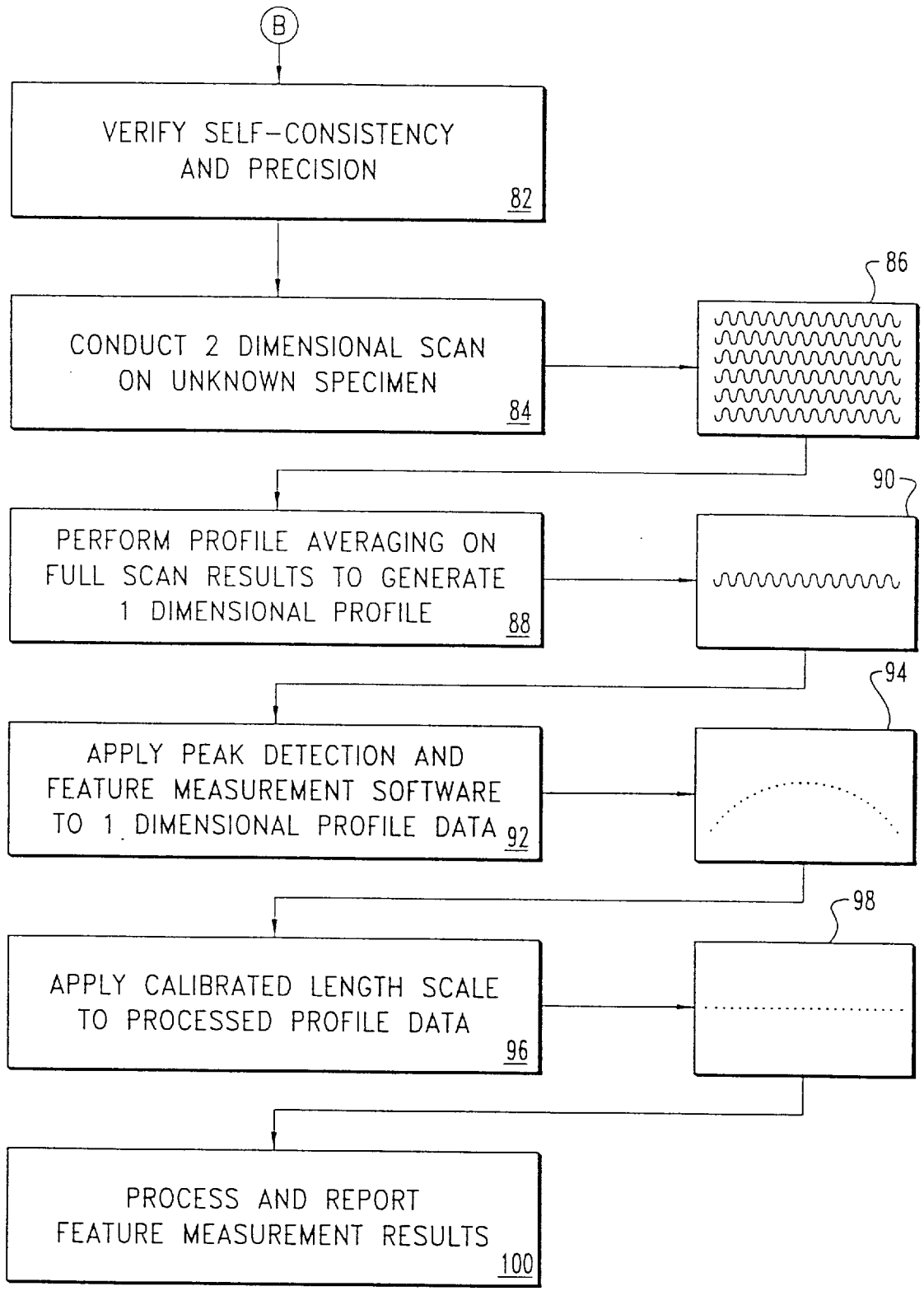
FIG. 7 is a schematic process diagram of a first embodiment measurement process incorporating off-line data correction.

After the process of FIG. 6 has been completed on a calibration specimen, the calibration data may then be applied to correct measurement data for an unknown specimen, as illustrated in FIG. 7. First, a two-dimensional scan is made of an unknown specimen at step 84, thereby producing a two-dimensional measurement data array 86. Because the motion of the scanner 10 has not been corrected, the two-dimensional data array 86 contains the same non-linearity artifacts that were present in the calibration two-dimensional data array 64. Profile averaging on the full two-dimensional scan results 86 is performed at step 88 in order to generate a one-dimensional profile 90. This step is analogous to step 66 of FIG. 6, and is described in greater detail hereinbelow with respect to FIGS. 8 and 9. Next, the peak detection and feature measurement processes are applied to the one-dimensional profile data 90 at step 92, in order to produce the processed profile data 94. This step is analogous to step 70 of FIG. 6, and is described in greater detail hereinbelow with respect to FIGS. 10, 16 and 18. At step 96, the calibrated length scale which was determined during the calibration feature of FIG. 6, is applied to the processed profile data 94 in order to remove the non-linearities therefrom. The result is the calibrated profile data 98. The feature measurement results for the unknown specimen are then processed and reported to the user at step 100.

The calibrated length scale may be applied only to the processed profile data 94, thereby allowing an average cross-section (corrected for non-linear artifacts) of the scan to be reported to the user. Alternatively, the calibrated length scale may be applied to every line of the scan so that a corrected two-dimensional scan may be displayed to the user. Rendering of a corrected two-dimensional scan from this data requires interpolation, so that the data points are equally spaced. It is usually most important to the user that the feature locations of the measurement sample be found very precisely and that their feature positions be corrected. The data is preferably delivered to the user as a tabular list of feature positions, as well as such graphs and statistics as may be derived from the table.

Figure 8:
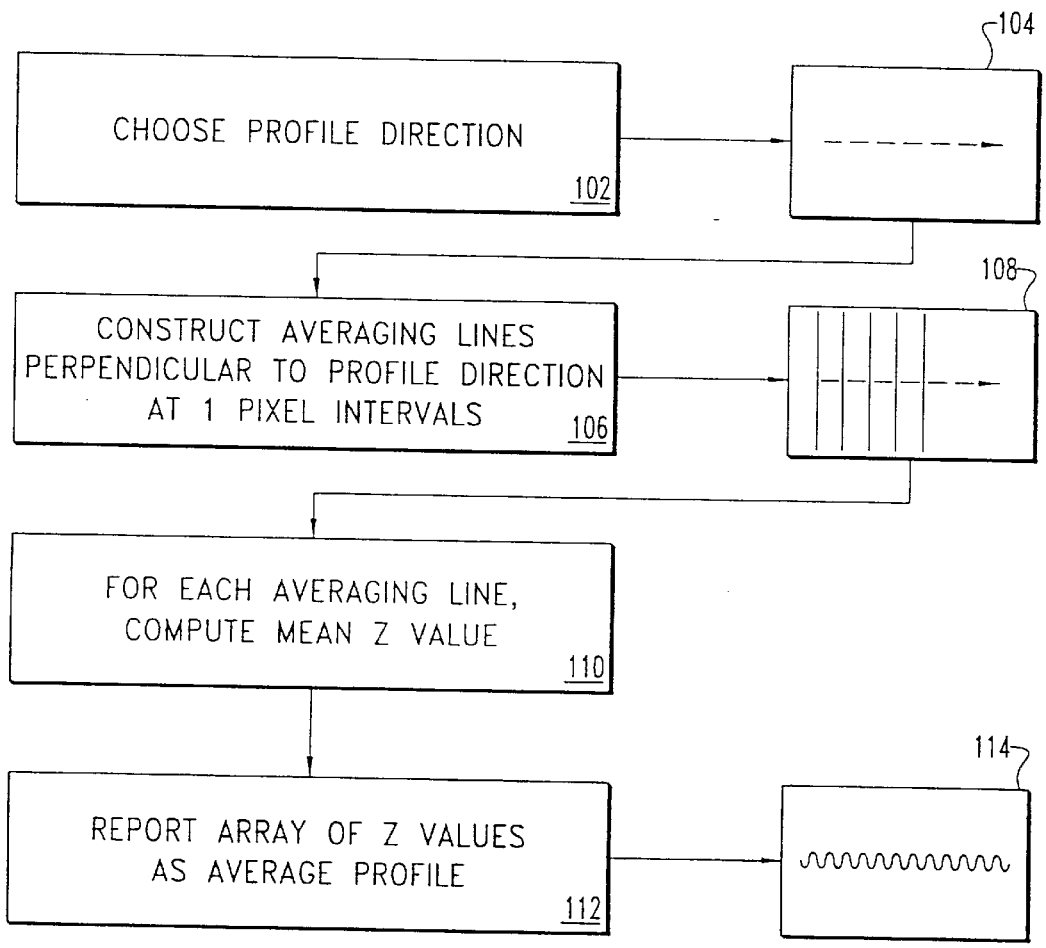
FIG. 8 is a schematic process diagram of a profile averaging process of the present invention.
Figure 9:
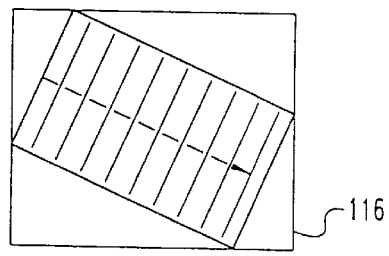
FIG. 9 is a schematic representation of an alternate profile direction and averaging line construction of the present invention.

Referring to FIG. 8, the profile averaging process of steps 66 (FIG. 6) and 88 (FIG. 7) is described in greater detail. The process begins at step 102 where the direction of the profile cross-section is chosen, as indicated schematically at 104. The data averaging will occur perpendicular to this cross-section line. Hypothetical averaging lines are then constructed in the data array 64, 86 at step 106, perpendicular to the profile direction and at one pixel intervals. This is illustrated schematically at 108. It will be appreciated by those skilled in the art that the profile direction and averaging lines may be tilted with respect to the X axis, as illustrated at 116 in FIG. 9, or it may be parallel to the Y axis. This allows the profile averaging process to be optimized when the sample has been scanned off of the desired axis. At step 110, for each averaging line i, the mean height value $z_i$ is computed according to the following formula:

$$z_i = \frac{1}{N} \sum_{j=1}^{N} z_{ij}$$

where N equals the number of scan lines in the Y direction. This array of $z_i$ height values forms the one-dimensional profile at step 112, as illustrated schematically at step 114. This one-dimensional profile corresponds to the profile 68 (FIG. 6) and 90 (FIG. 7).

Figure 10:
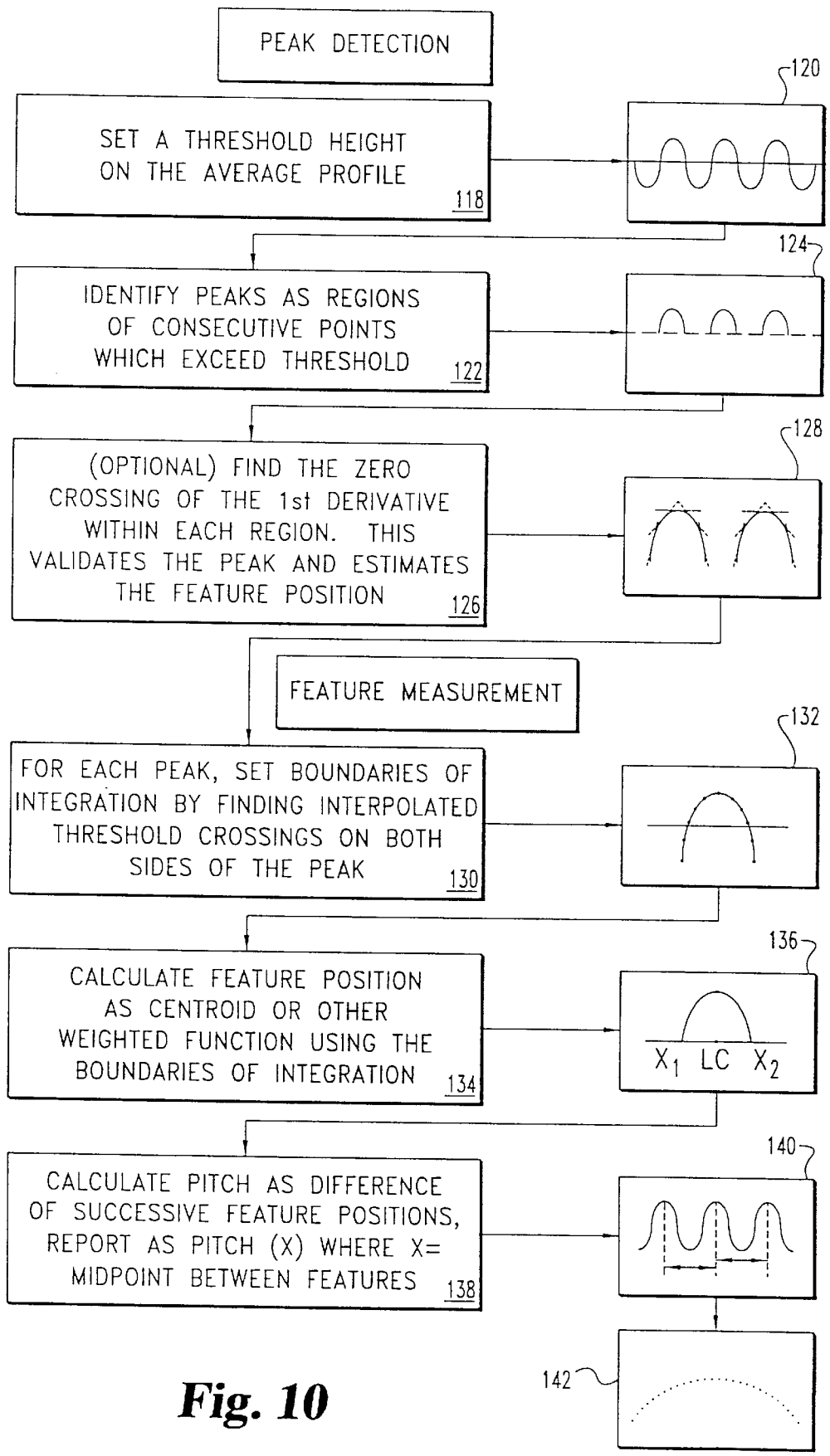
FIG. 10 is a schematic process diagram of a peak detection and feature measurement process of the present invention.
Figure 16:
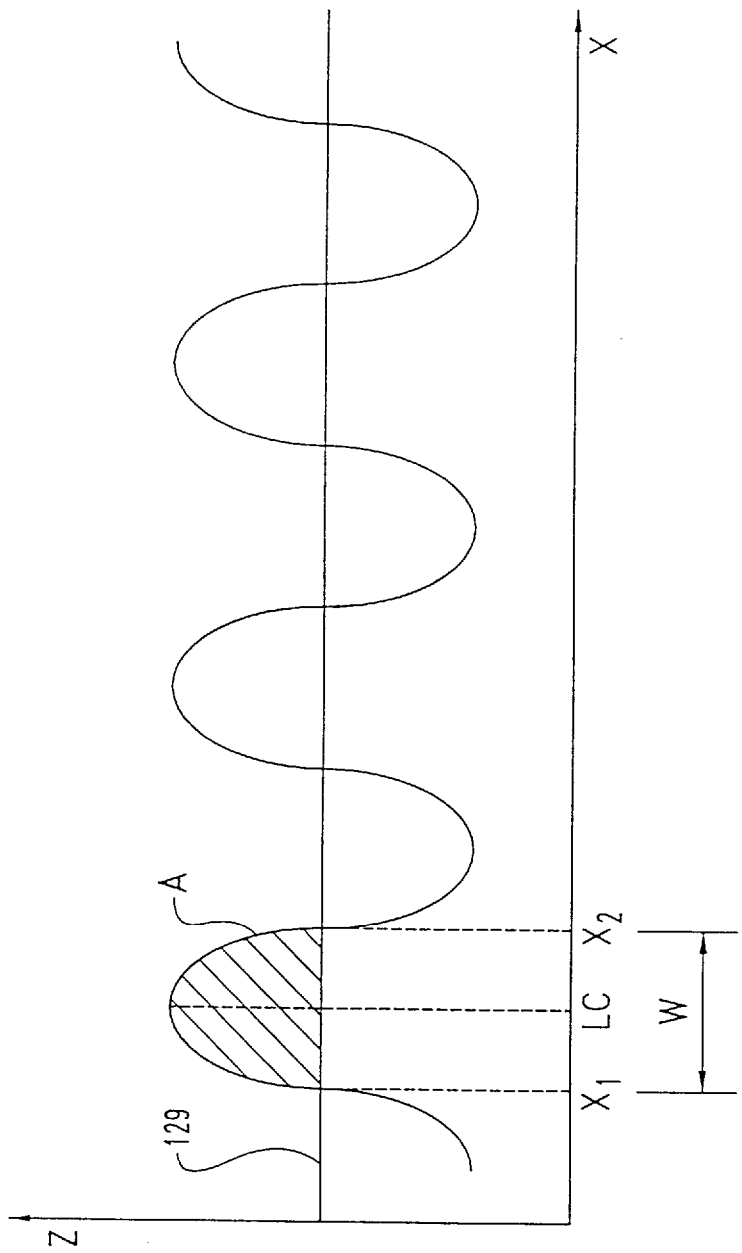
FIG. 16 is a graph of Z height vs. X position, illustrating a peak detection and feature measurement process of the present invention.
Figure 18:
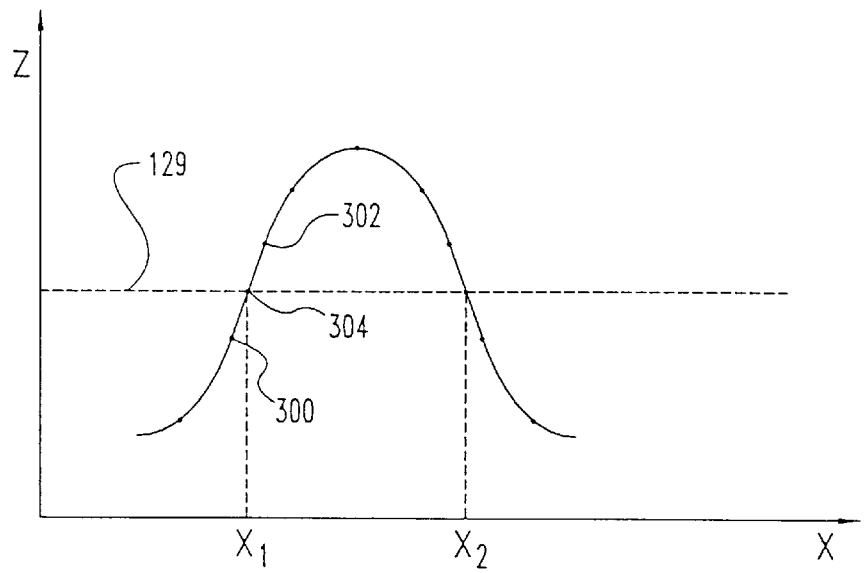
FIG. 18 is a graph of Z height vs. X position, illustrating a peak boundary detection process of the present invention.

Referring now to FIGS. 10, 16 and 18, the peak detection process of steps 70 (FIG. 6) and 92 (FIG. 7) is illustrated in greater detail. The peak detection process is performed on the one-dimensional profile 68 (FIG. 6) or 90 (FIG. 7). This profile represents a cross-section of the two-dimensional data array expressed as a one-dimensional array of z height values as a function of x position values (corresponding to equally spaced pixels). The array is searched for peaks by setting a threshold height on the one-dimensional average profile at step 118, as illustrated schematically at 120. Peaks are then identified at step 122 as regions of consecutive points which exceed this threshold height, as illustrated schematically at 124. The peak may optionally be validated and the feature position estimated at step 126 by determining the zero crossing of the first derivative within each of the peak regions. This is illustrated schematically at 128. Once the peaks have been identified in the profile data array, the topographical features of the sample may be measured.

The feature measurement process of steps 70 (FIG. 6) and 92 (FIG. 7) is illustrated in greater detail beginning at step 130, where the boundaries of integration are set for each peak by finding the interpolated threshold crossings on both sides of the peak, as illustrated schematically at 132. As illustrated in greater detail in FIG. 18, for any given peak, the left boundary $x_i$ is found by a linear interpolation between two adjacent points: the pixel 300 whose z value is at or below the threshold 129 and the pixel 302 whose z value is at or above the threshold 129. The linear interpolation consists of these steps: draw a straight line connecting the two points 300 and 302 and find the intersection 304 of that line with the threshold level 129. The right boundary $x_2$ is found by an analogous procedure. The peak pixel is then located as the local maximum of the subarray extending between the points $x_1$ and $x_2$. Each peak represents a feature of the sample being measured. At step 134, the feature position (or line center, LC) is preferably calculated as the x-coordinate of the centroid of the shaded area A shown in FIG. 16. This shaded area is bounded by the cross-section curve z(x) and the baseline 129, which intersects z(x) at $x_1$ and $x_2$. As is well known, the formula for the centroid is:

$$LC = \frac{1}{A} \int \int_A x \, dx \, dz = \frac{1}{A} \int_{x_1}^{x_2} \Delta z \times dx$$

where
$A = \iint_A dx \, dz$
where:
$\Delta z = z(x) - \text{baseline}$

A represents the region of integration as well as the numerical value of the shaded area.

The centroid formula above is a weighted average of x values of points on the cross-section profile near the peak of the feature, in which the weights are linearly related to the z values on the profile. Other weighted averages may also be used. This is also illustrated schematically at 136. Step 138 then calculates the pitch as the difference between successive feature positions. As described previously, a set of centroid locations is determined, LC(n), where n=feature number. Then for each pair of adjacent centroid positions {LC(n), LC(n+1)} there is an associated pitch value (P(n)) which is defined as the distance between the two centroid positions (P(n)=LC(n+1)−LC(n)) so that for a section with M features, there will be M−1 pitch values. Each pitch value is then associated with a position x(P(n)) which is defined as the midpoint between the two features defining the pitch (x(P(n))={LC(n+1)−LC(n)}/2). This is illustrated schematically at 140 and 142.

Figure 11:
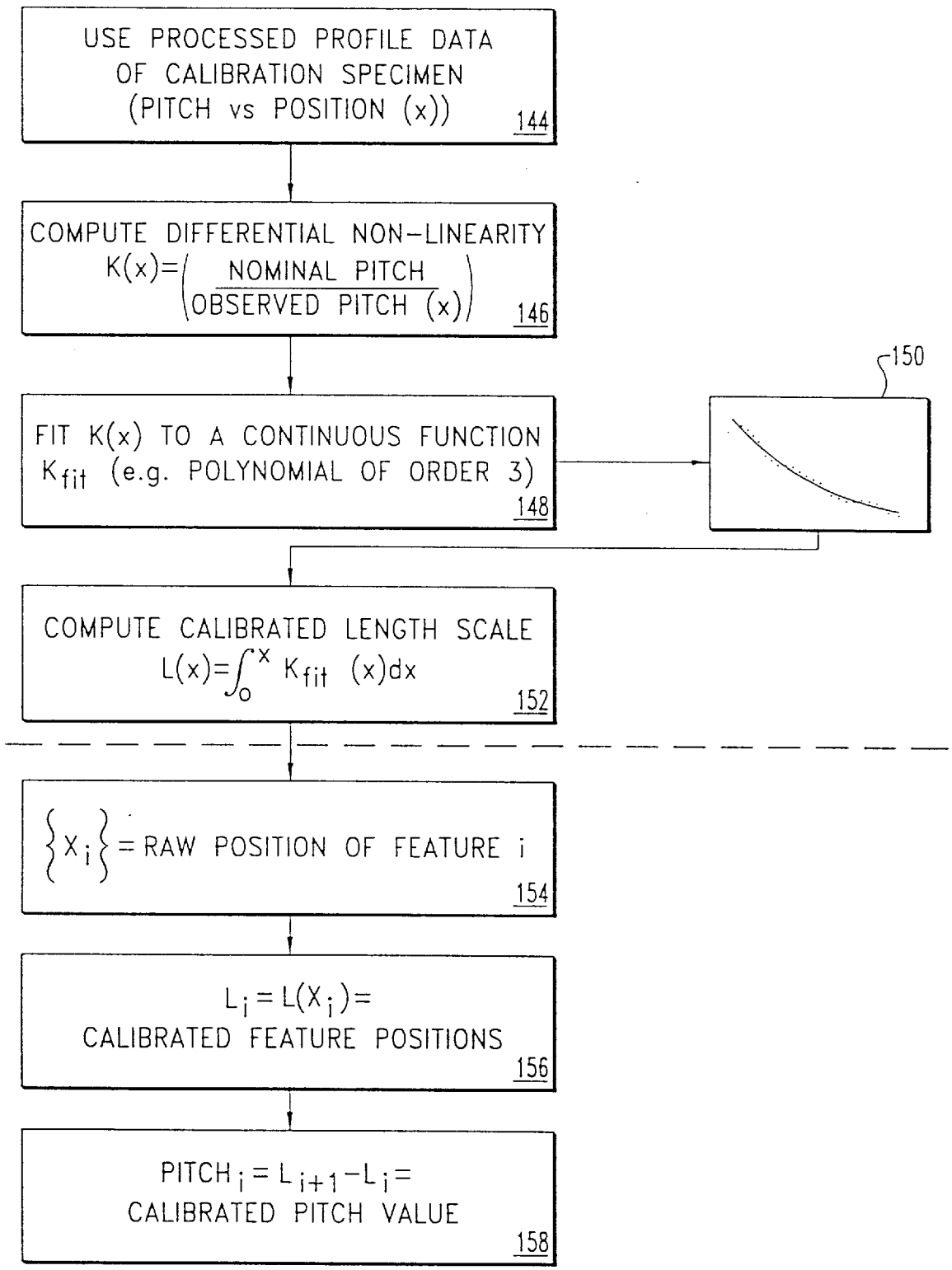
FIG. 11 is a schematic process diagram of a calibrated length scale determination process of the present invention.

Referring now to FIG. 11, the steps 74–78 (FIG. 6) and 96 (FIG. 7) are illustrated in greater detail. Step 144 retrieves the processed profile data of the calibration specimen calculated according to the process of FIG. 10. This data represents the pitch of the calibration specimen as a function of the position x. Because the pitch of the calibration sample is theoretically known, the differential non-linearity may be computed at step 146 as follows:

$$K(x) = \frac{\text{nominal pitch (theoretical)}}{\text{observed pitch}(x) \text{ (measured)}}$$

At step 148, the K(x) function is fit to a continuous function $K_{fit}(x)$, which may be, for example, a third order polynomial. This is illustrated schematically at 150. The calibrated length scale L(x) is then computed at step 152 as follows:

$$L(x) = \int_0^X K_{fit}(x) dx$$

Therefore, each data point is nominally associated with an "x" position, there being a one-to-one correspondence between the "x" positions and the pixels in the one-dimensional array or in each line of the two-dimensional array. The calibrated length scale L(x) will give the true position in the scan for any data point nominally associated with a position x. This true position results from removing the non-linear artifacts, and describes where the scanner 10 was actually located (i.e. the position L(x)) when the data point was taken, as opposed to where the scanner 10 was supposed to be located (i.e. the position x).

The calibration specimen, such as a diffraction grating, will have identifiable features thereon, such as the lines on the grating surface. The position of each of these features can be identified (via the process of FIG. 10) and, if the features repeat in a regular pattern, the pitch between successive features may be measured. As illustrated at step 154, if $x_i$ is the raw position of feature i, then the calibrated feature position $L_i$ may be defined at step 156 as follows:

$$L_i = L(x_i)$$

Finally, step 158 calculates the calibrated pitch values for each feature i as follows:

$$P(i) = L_{(i+1)} - L_i$$

The invention has heretofore been illustrated with a calibration specimen that has precisely known, equally-spaced features (such as a diffraction grating) and a measurement (unknown) specimen which may or may not have equally-spaced features. It is possible to use the above procedure to derive the calibrated length scale L(x) using a calibration specimen that has unequally-spaced features, provided that the distances are accurately known. As long as the theoretical distance between a given pair of features is known, the differential non-linearity K can be calculated.

Figure 17:
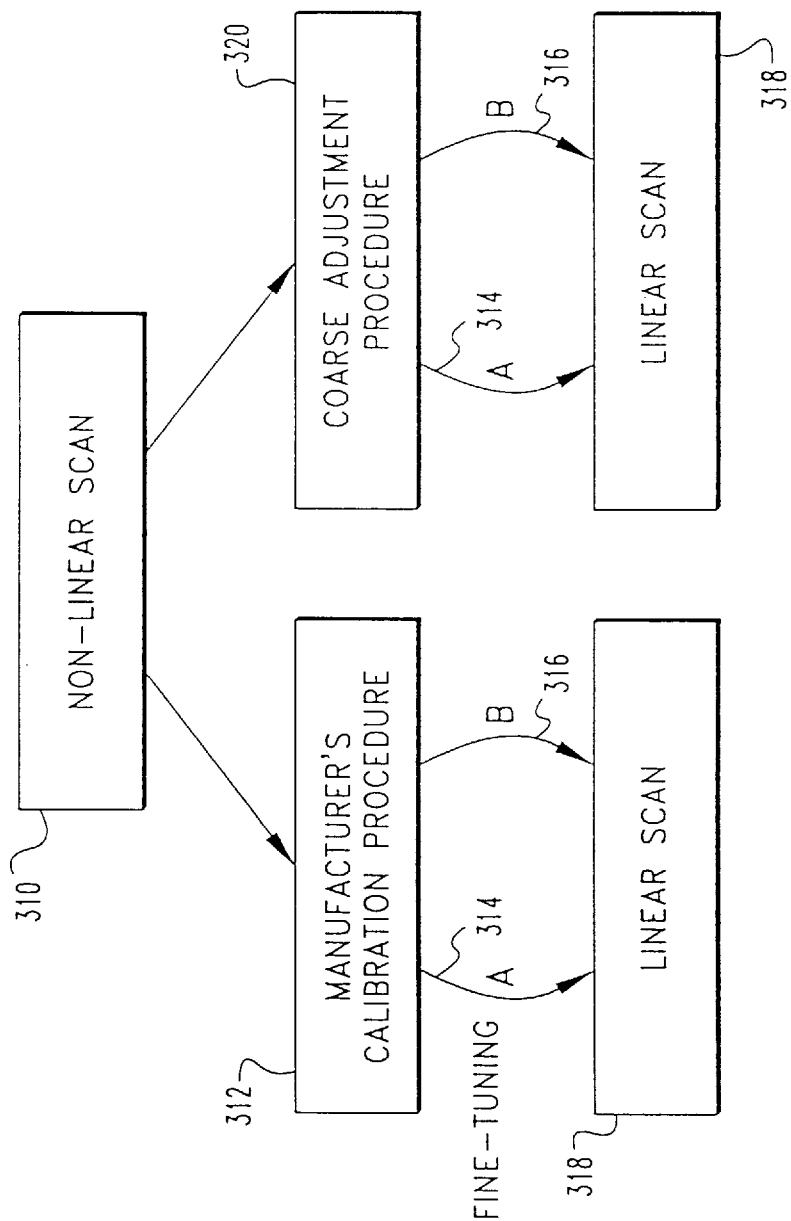
FIG. 17 is a schematic process diagram illustrating a course adjustment and fine tuning realtime calibration procedure of the present invention.

Referring now to FIG. 17, there is illustrated a second embodiment of the present invention in which the non-linear motion of the scanner 10 is detected and this information is used to adjust that voltage waveform applied to the scanner 10 electrodes in order to compensate for the non-linear motion. As a result, after calibration of the scanning probe microscope 40, subsequent measurements made on unknown samples do not have non-linear artifacts associated with the measurement data. This is referred to as a realtime process because the non-linearities are corrected as the measurements are made.

FIG. 17 gives an overview of the realtime process. As initially assembled, the scanning probe microscope 40 may produce non-linear scans 310. The manufacture's calibration procedure 312 improves the system so that scans are more linear, however non-linear artifacts remain in the measurement data. Details of two fine tuning processes 314 and 316 which result in linear scans 318 are described hereinbelow. As an alternative to the microscope manufacturer's calibration procedure, a coarse adjustment procedure 320 of the present invention may be used. After coarse adjustment, linear scans can be obtained by performing either of the fine tuning methods 314 and 316.

Figure 13:
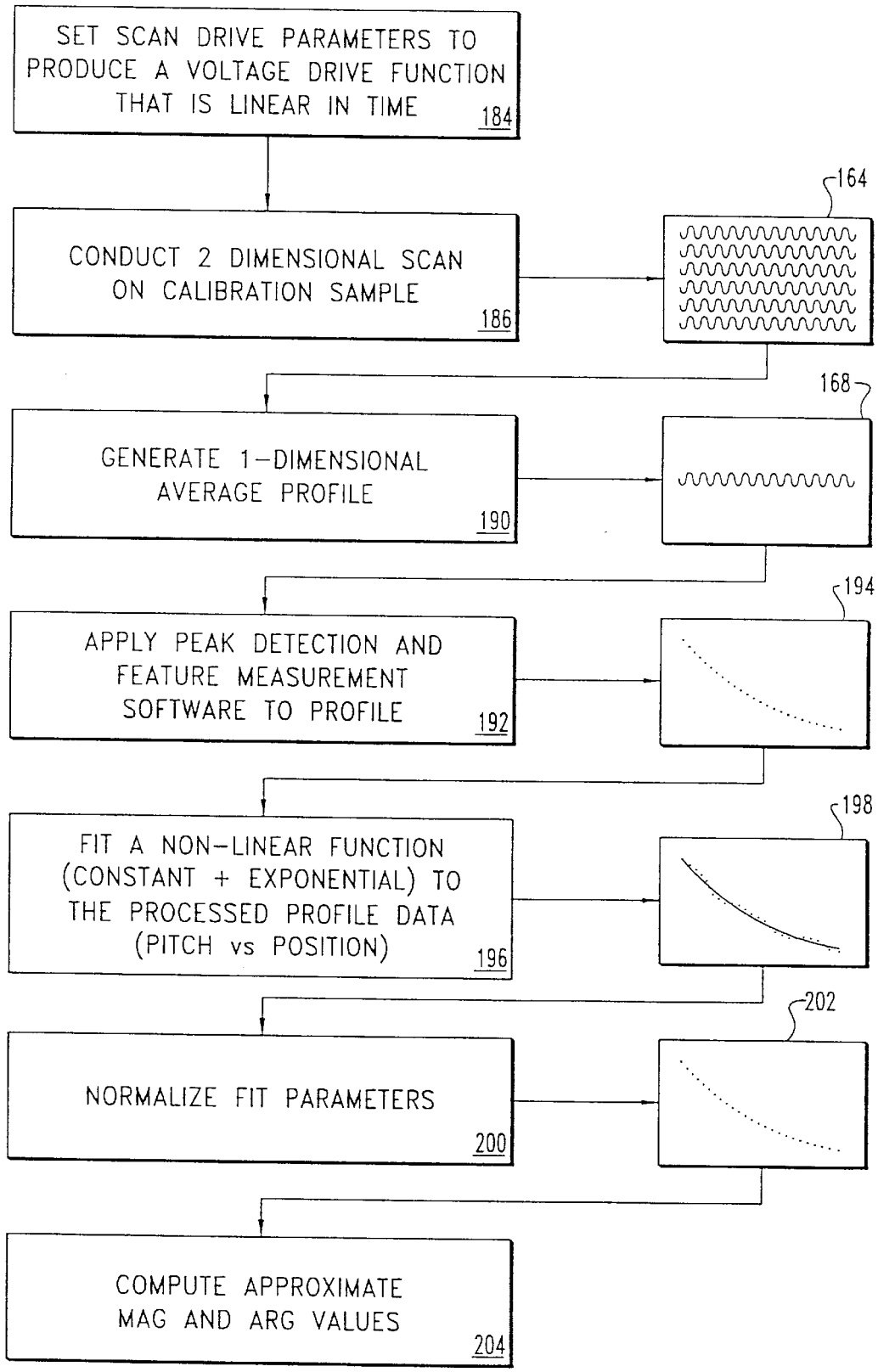
FIG. 13 is a schematic process diagram illustrating a coarse adjustment realtime calibration process of the present invention.

FIG. 13 gives details of the coarse adjustment procedure 320. It begins with a system that may be badly non-linear. At step 184, the scan drive parameters used by the control circuitry 44 are set to produce a voltage drive function that is linear in time (i.e. a triangle waveform). A two-dimensional scan of the calibration sample is then performed at step 186 in order to produce the two-dimensional data array 164. A one-dimensional average profile 168 is then generated at step 190, and the peak detection and feature measurement processes are applied to the one-dimensional profile 168 at step 192. This results in the processed profile data 194. Profile 194 is created with no correction to the scan drive waveform. A linear scan drive voltage is applied which then results in the profile showing the full non-linearity of the scanner 10. This corresponds to the Mag and Arg values being set equal to zero.

At step 196, a non-linear function (a constant plus an exponential term) is fit to the processed profile data 194. This is illustrated schematically at 198. The non-linear function has the form:

$$D + E \cdot e^{-fx}$$

D, E, F are adjustable parameters. The fit parameters of the non-linear function are then normalized at step 200, as illustrated schematically at 202. The fit and normalization procedure of steps 196–202 involves normalizing the scan position as follows:

$$x_{norm} = \frac{x}{\text{Scan Size}}$$

Next, the pitch is normalized:

$$\text{Normalized pitch} = \frac{\text{observed pitch}}{\text{mean of observed pitch values}}$$

Then, the normalized pitch as a function of normalized scan position, $x_{norm}$, is fit to the non-linear function. Approximate Mag and Arg values are then computed at step 204 as follows:

Arg=F

Mag=B=E/D=the derated correction magnitude for the current scan size $Mag_0$ and $Mag_1$ relate to B using:

$$B = S \cdot (Mag_0 - Mag_1 \cdot ln(S))$$

$$\text{Where } S = \frac{\text{Scan Size in Volts}}{\text{Max Scan Size in Volts}}$$

The user may choose different combinations of $Mag_0$ and $Mag_1$ to satisfy this equation at a given scan size. At step 204, provisional values for Arg (the correction argument) and for Mag (sometimes called B, the derated correction magnitude) have been determined, both values being pertinent for the selected scan size. This may be regarded as a coarse adjustment, because it has been found experimentally that scans made using these control parameters are usually not perfectly linear. This phenomenon may be due to hysteresis and memory effects in the piezoelectric material, such that the differential non-linearity at a given point in a scan depends on the scan speed during preceding segments of the scan. By programming a non-linear drive voltage, we affect the non-linearity that we are trying to control. Thus, further adjustment, called 'fine tuning', is needed.

Figure 12:
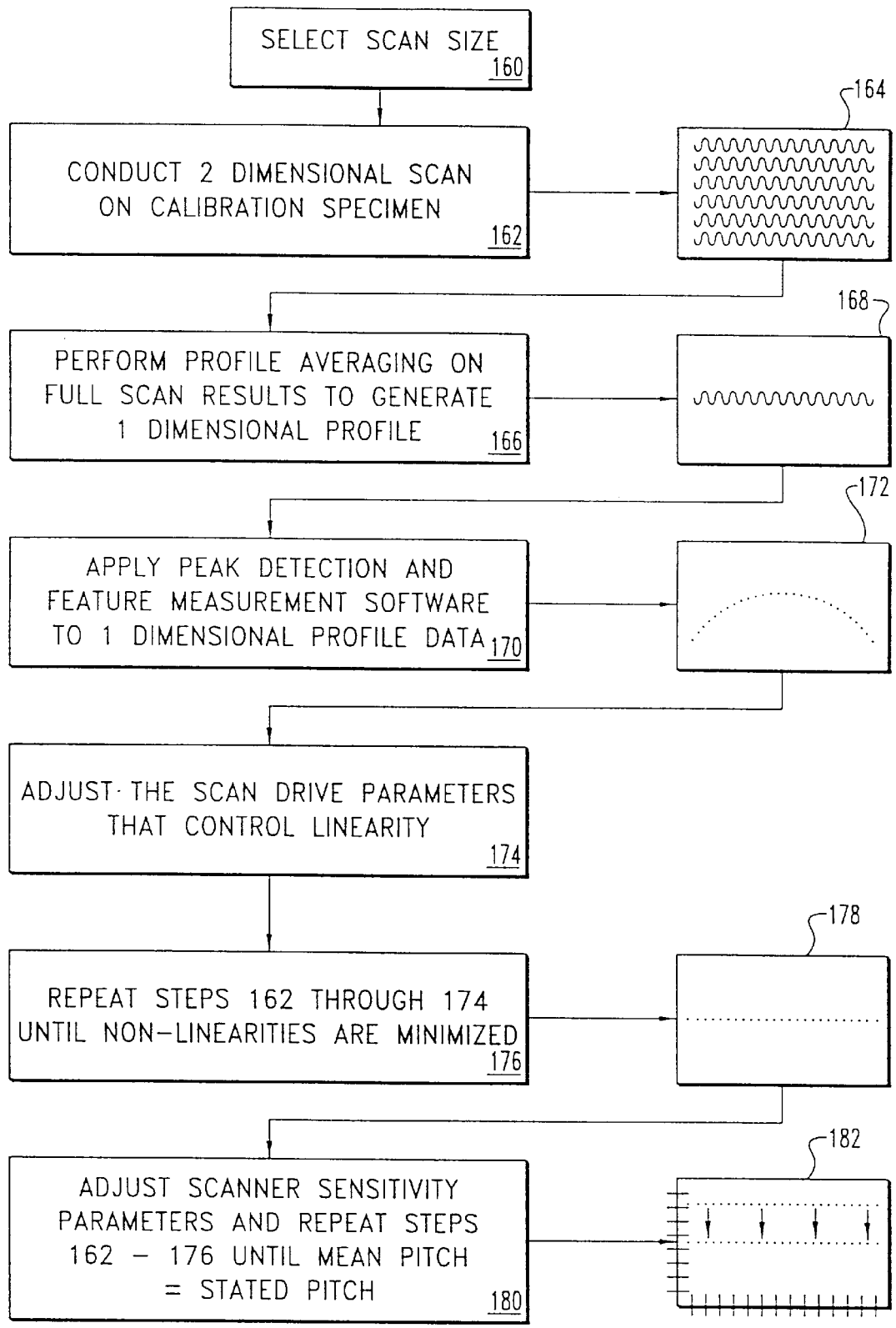
FIG. 12 is a schematic process diagram of a fine-tuning realtime calibration process of the present invention.
Figure 14:
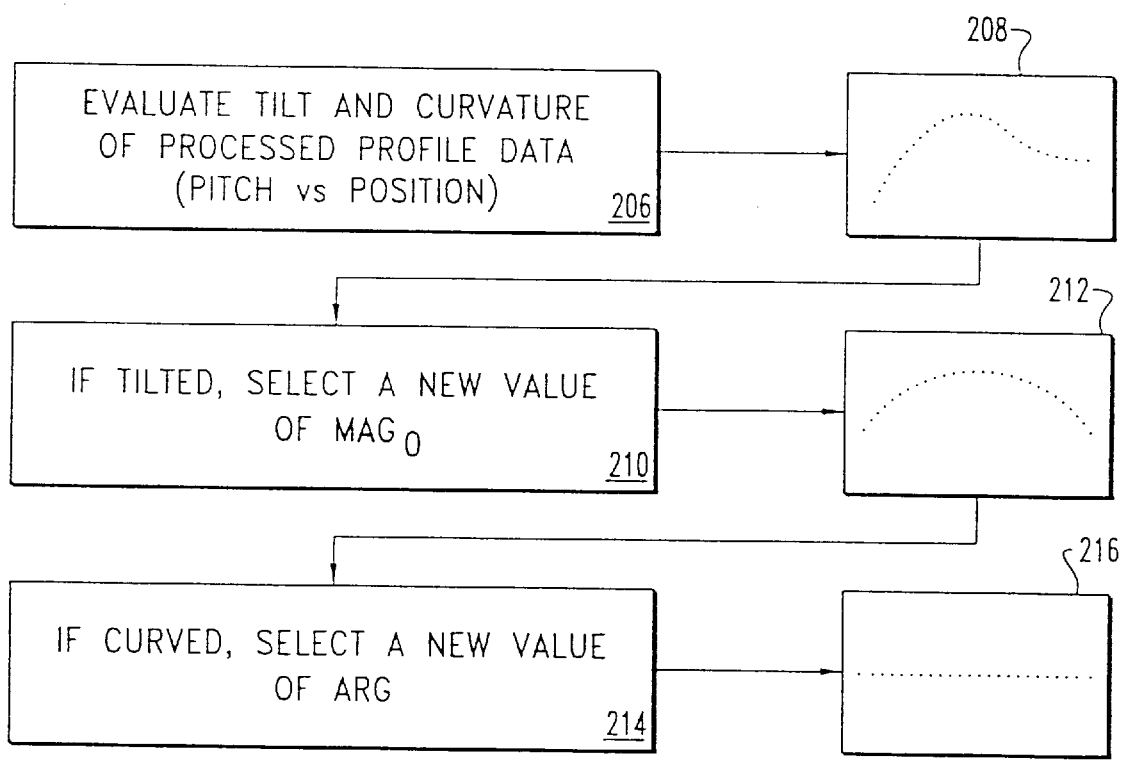
FIG. 14 is a schematic process diagram illustrating a first embodiment method for computing Mag and Arg values according to the present invention.

The fine tuning process 314 is described in detail in FIGS. 12 and 14. As with the first embodiment process, the second embodiment process begins at step 160 by selecting the scan size. The scan size used for the calibration procedure must be equivalent to the scan size used for later measurements. A two-dimensional scan is then performed at step 162 on a calibration specimen in order to produce a two-dimensional measurement data array 164. Step 162 is equivalent to step 62 of FIG. 6. In order to highlight the nonlinearities in the scan, profile averaging is performed at step 166 on the full scan results 164 in order to generate a one-dimensional profile 168. Step 166 is analogous to the step 66 of FIG. 6. Next, peak detection and feature measurement processes are applied at step 170 to the one-dimensional profile data 168 in order to produce the processed profile data 172. Step 170 is analogous to step 70 of FIG. 6. Profile 172 (of FIG. 12) is created with some adjustment to the drive waveform. However, the Mag and Arg parameters have not been properly adjusted to minimize the non-linearity of the scanner.

The scan drive parameters that control linearity are adjusted at step 174 based upon the results of step 170.

In one type of prior art SPM, there are three (primary) scan drive parameters:

$Mag_0$—correction magnitude $Mag_1$—correction magnitude derating

Arg—correction argument

These three parameters (for both X and Y) describe the shape of the applied scan waveform for a given scan size. The scan waveform V(t) is preferably shown as follows:

$$V(t) = C \left[ t + \frac{B}{Arg} (1 - e^{(-Arg)t}) \right]$$

$$\text{where } C = \frac{1}{1 + \frac{B}{Arg}(1 - e^{-Arg})}$$

$$B = S(Mag_0 - Mag_1 \cdot ln(s))$$

$$S = \frac{\text{Scan Size in Volts}}{\text{Max Scan Size in Volts}}$$

The argument (Arg) determines the exponential decay of the non-linear term. Both $Mag_0$ and $Mag_1$ determine the amount of the exponential term to use, and how that amount varies with scan size. These three parameters need to be determined for both the X and the Y axes. Other prior art microscopes may use parameters with different names, but which perform analgous functions.

FIG. 14 is a first method of accomplishing step 174. As illustrated in FIG. 14, the Mag and Arg values may be fine tuned to remove any tilt and curvature, beginning at step 206. As shown in 208, the graph is tilted upward when the right end is higher than the left end. The proper action is to reduce the amplitude of the exponential. For a given scan size, this is easily controlled by reducing $Mag_0$ at step 210. It is also possible to achieve the same result by adjusting $Mag_1$. If the center of the graph is higher than the mean of the left and right ends, as shown at 212, the proper action is to reduce the Arg value at step 214.

Referring once again to FIG. 12, the fine tuning process continues at step 176, where steps 162–164 are repeated until the non-linearities in the processed profile data 172 are minimized, as illustrated schematically at 178. Nonlinearities are minimized when the following criteria are met for the pitch data displayed in 178:

the standard deviation approximates the standard deviation seen at the self-consistency check (step 82)

the tilt and curvature of graph 178 are not significant relative to the random variations. This can be evaluated either by visual inspection of the graph or by a regression analysis (least squares fit to a 2nd-order polynomial), in which the linear and quadratic coefficients are not significantly different from 0 (using the customary statistical tests).

At step 180, the scanner sensitivity parameters are adjusted and steps 162–176 are repeated until the mean pitch (calculated according to the process of FIG. 10) is equal to the stated pitch of the calibration specimen. This is illustrated schematically at 182.

Figure 19:
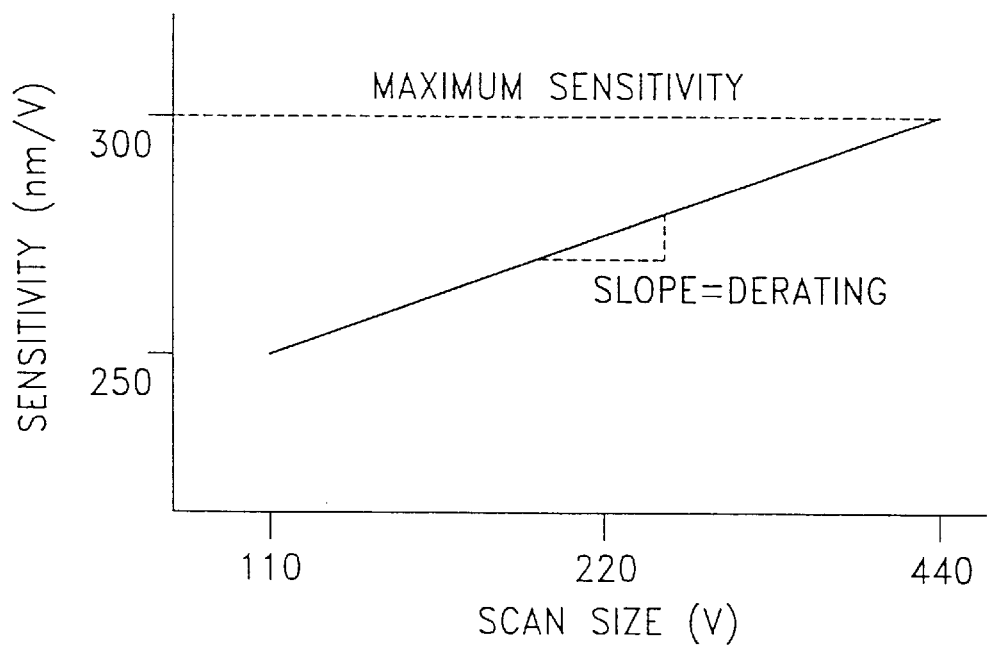
FIG. 19 is a graph of scanner sensitivity vs. scan size.

Scanner sensitivity is defined as (Distance moved)/(Applied Voltage). Because of the non-linearities of the piezoelectric material, scanner sensitivity is a function of scan size (which can be expressed either in length units or voltage). As shown in FIG. 19, it is customary to express the sensitivity variation as a linear function of voltage, regardless of whether a higher order polynomial might be more accurate. A parameter called "Sensitivity" may be defined as the actual sensitivity observed for the largest scan size. A second parameter called 'Sensitivity Derating' is defined as the slope of the sensitivity graph. (The derating is customarily defined as a positive number when the sensitivity increases with voltage.) The SPM controller uses this linear function in order to select a total applied voltage needed to obtain a given scan size. At step 178, if the mean pitch is greater than the nominal pitch, the proper action is to decrease the sensitivity calculated by the controller for that scan size. The user can do this by either reducing the 'Sensitivity' or increasing the "Sensitivity Derating'.

Figure 15:
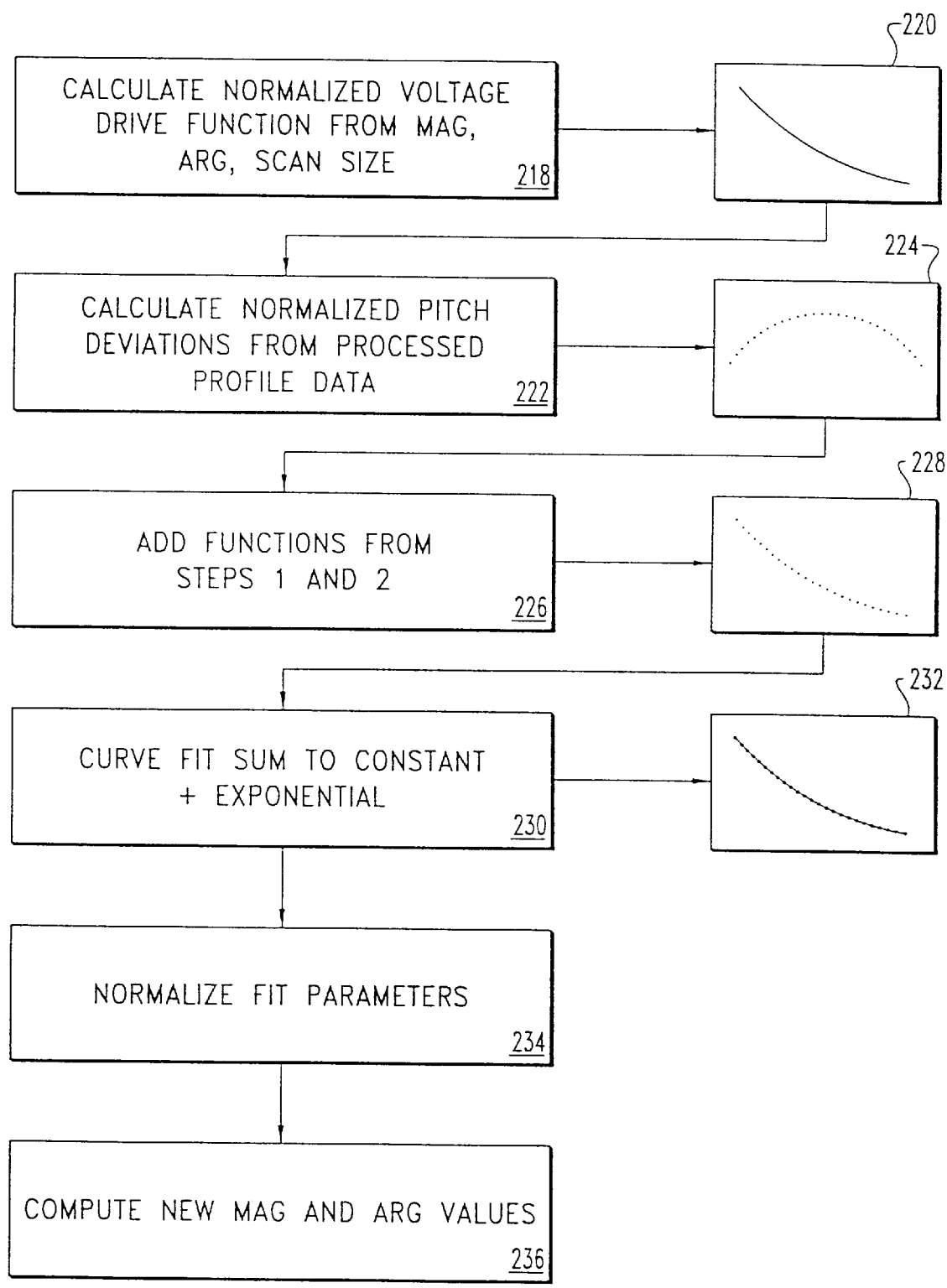
FIG. 15 is a schematic process diagram illustrating a second embodiment method for computing Mag and Arg values according to the present invention.

FIG. 15 shows a second fine tuning method of accomplishing step 174, the adjustment of Mag and Arg values. The parameter Mag is often called B and is a function of parameters Mag0, Mag1 and S, as indicated above in the discussion of the coarse adjustment procedure of FIG. 13. For clarity, the equations which describe the nonlinear scan waveform used in one type of prior art SPM are repeated below.

$$V(t) = C \left[ t + \frac{B}{Arg} (1 - e^{(-Arg)t}) \right]$$

$$\text{where } C = \frac{1}{1 + \frac{B}{Arg}(1 - e^{-Arg})}$$

$$B = S(Mag_0 - Mag_1 \cdot \ln(s))$$

$$S = \frac{\text{Scan Size in Volts}}{\text{Max Scan Size in Volts}}$$

Note that the value of constant C assures that the waveform is normalized at the start of scan, t=0 and V(O)=0 and at the end of scan, t=1 and V(1)=1.

It is convenient to consider the following normalized "Drive" function $$\text{Drive} = (dV/dt) = C^*[1 + B^* \exp(-Arg^*t)]$$

which gives the normalized voltage increment per normalized time increment during the scan. In a normalized scan, it is customary to express the length scale Xnorm on a range from 0 to 1. Since data points are customarily captured at uniform time intervals, we can identify Xnorm=t. With that substitution, it is obvious that the Drive function shown here is of the same form as the nonlinear function $$D + E^* \exp(-F^* x)$$

which was used as the fitting function in the coarse adjustment procedure of FIG. 13.

The details of the present fine tuning process are as follows. Recall that at step 162, the calibration specimen was scanned at a selected scan size. To make that scan, the controller provided to the scanner a voltage drive function based on the current values of Mag and Arg. At step 218, the normalized voltage drive function is calculated using the scan size and the current values of Mag and Arg and it is indicated schematically at 220. In analogy with the coarse adjustment procedure, normalized pitch values are then calculated at step 222 from the processed profile data 172 and are illustrated schematically at step 224. For each point in the processed profile data array, we compute:

Normalized pitch=observed pitch/(mean of observed pitch values)

Xnorm=X/(ScanSize)

Step 226 then multiplies the functions of steps 220 and 224 together in order to produce the composite function of step 228

Composite=Drive*Normalized pitch

At step 230, the composite function is fit to the nonlinear function $$D + E^* \exp(-F^* x)$$

as illustrated schematically at 232. New Mag and Arg values are computed at step 236 using:

Arg=F

Mag=B=E/D

When the new Mag and Arg values are used to program the scan drive waveform, it is found experimentally that the scan linearity is improved. Nevertheless, further improvement may be achieved by repeating the fine tuning process one or more times, that is, by making a new scan using the new Mag and Arg values and then processing the scan according to the process of FIG. 15 in order to produce another new set of Mag and Arg values.

Two fine tuning methods have been presented above which differ in the details of how the new Mag and Arg values are selected. In the first method (FIG. 14), a qualitative, visual inspection of the processed profile data leads to a manual choice of new values. In the second method, a numerical curve fitting process leads to computed values of Mag and Arg. The second method has the following advantages over the first:

It has been found experimentally that scanner linearity can be improved more quickly (i.e. with fewer iterations) using the second method.

Because the new Mag and Arg parameters are computed, not manually selected, the overall process of scanning, evaluating the calibration data array, calculating new Mag and Arg parameters, and reprogramming the controller can be carried out automatically, without intervention by technical personnel. This has an obvious economic benefit.

A method for coarse adjustment and a method for fine tuning adjustment of realtime scanner nonlinearity have been presented above, in which both methods depend on fitting data to a nonlinear function. Understanding of the basic mathematics involved may be enhanced by the following remarks:

the fitting process used for the coarse adjustment procedure described above is seen to be identical to the present fine tuning procedure, once we recognize that the coarse tuning data was captured with Drive=1.

the Normalized pitch is a correction factor, which reduces the new drive rate where the old observed pitch was too small (and vice versa).

Finally, it should be noted that other composite functions can be selected which would give approximately the same results as the preferred form shown above. These alternative choices include:

Composite=Drive+Normalized Pitch−1
Composite=Drive*(Observed pitch/nominal pitch)
Composite=Drive+(Observed pitch/nominal pitch)−1

Once the preferred form has been stated, these alternatives and other possible composite functions are obvious to one skilled in the art.

It will be appreciated by those skilled in the art that the prior art feature positions (such as in U.S. Pat. No. 5,051,646 to Elings et al.) are measured with only 1 pixel resolution. In an image 512 pixels wide, a pitch value of 100 pixels can therefore be measured only to a precision of 1%, and the non-linearity can therefore be judged and corrected to 1% precision. In contrast, the feature measurement process of the present invention can measure pitch values to a precision of ⅓₀th pixel or better. The resolution is limited only by the absolute measurement capabilities of the microscope. Therefore, non-linearities can be detected and corrected on a correspondingly finer scale using the processes of the present invention.

Figure 20:
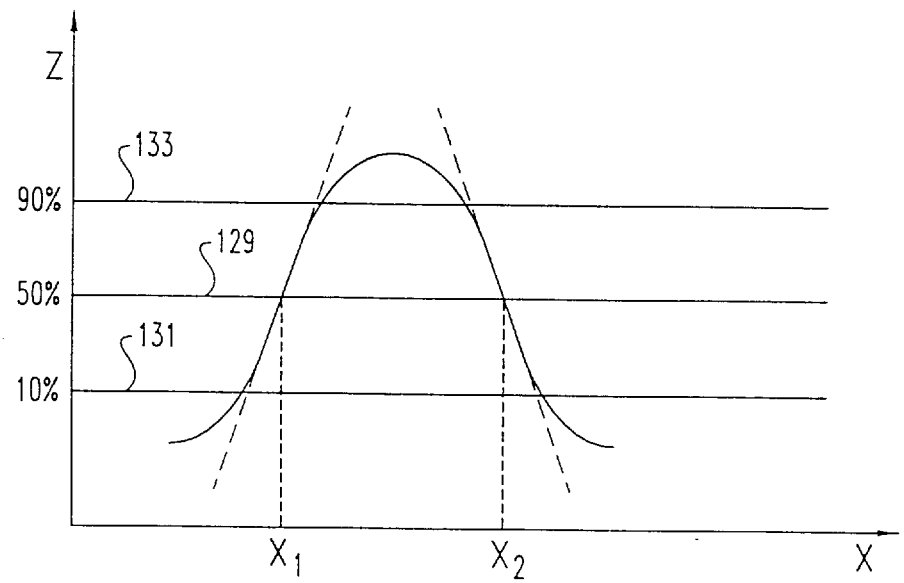
FIG. 20 is a graph of Z height vs. X position, illustrating an alternative feature location process of the present invention.

An alternative process for locating features uses the edge position instead of the peak center position. As illustrated in FIG. 20, for any given peak, the approximate locations of its left and right edges $x_1$ and $x_2$ are determined to be at local maxima in the absolute value in the first derivative. For each edge, a subarray in the one-dimensional profile is then defined which falls within predetermined upper and lower height thresholds (e.g. a 10% threshold 131 and a 90% threshold 133) of the baseline to peak height. This subarray is then fit to a linear function (z=mx+b). The absolute edge of the peak is then calculated as the intersection of the linear fit function with a user selectable height threshold (e.g. the 50% height threshold 129). This process is then repeated on the opposite side of the peak in order to find the second edge $x_2$. Pitch values are then calculated as the difference between positions of corresponding edges of consecutive features. Additional results of the edge location process are useful. The difference between first and second edges of a given feature is a measure of its width. The slope of the fit line for a given edge is a measure of the feature's slope.

Figure 21:
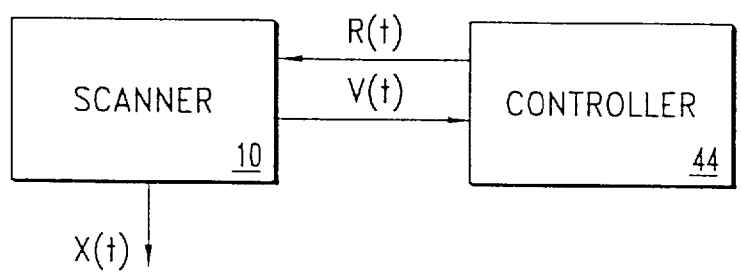
FIG. 21 is a schematic block diagram of a prior art closed-loop scan axis control system.

The concepts of the present invention may be used to design an improved closed-loop scanner controller which outperforms the prior art controller 44. FIG. 21 illustrates a block-diagram overview of a prior art closed-loop scan axis control system. Only one axis is shown, for simplicity. A controller 44 receives raw sensor output, R(t) from a scanner 10 and sends a drive voltage v(t), to the scanner 10. In response to the drive voltage v(t), the scanner 10 produces probe trajectory X(t).

Figure 22:
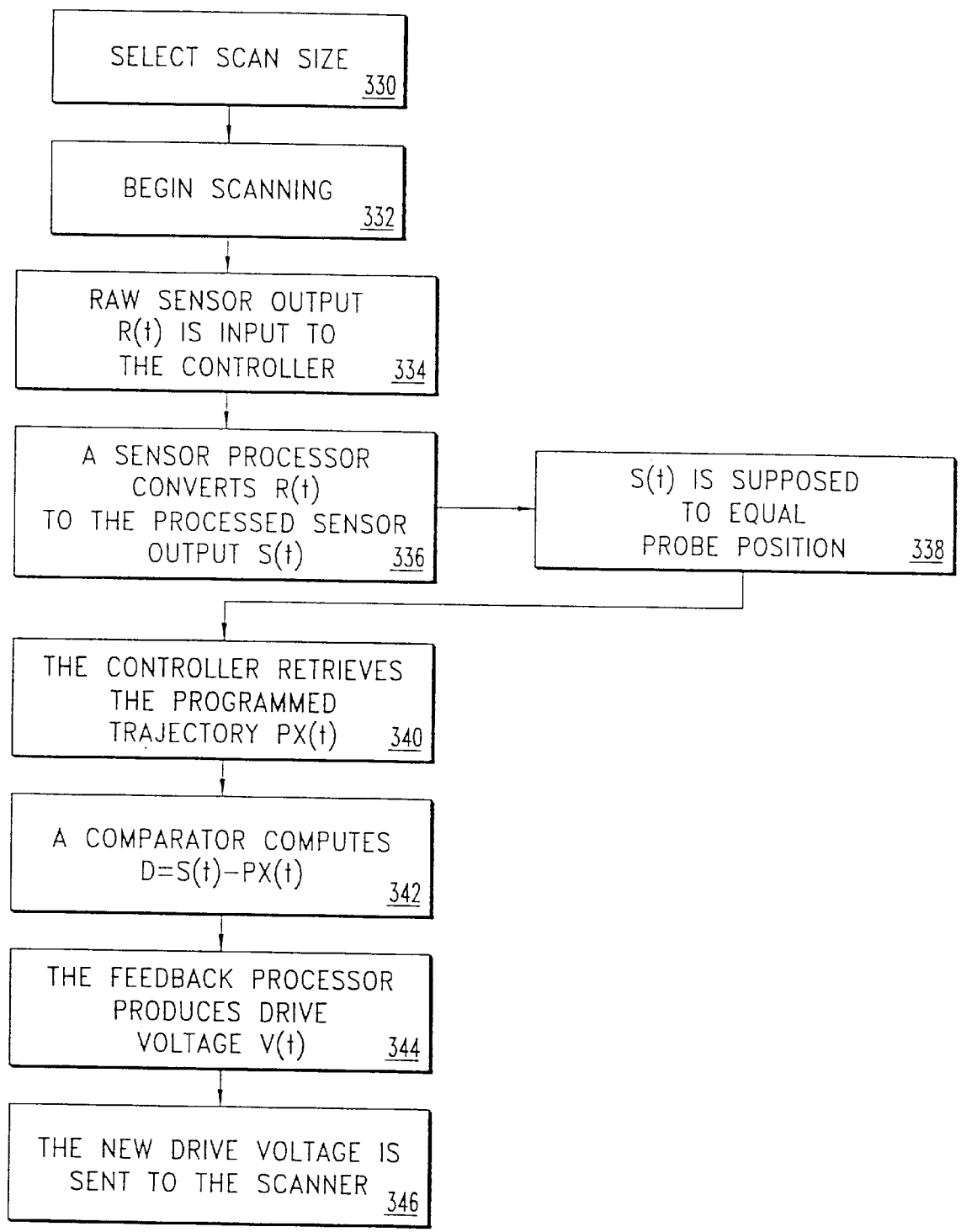
FIG. 22 is a schematic process diagram illustrating a control process performed by the prior art control system of FIG. 21.

FIG. 22 illustrates the process performed by the prior art closed-loop controller 44. The scan size is first selected at 330 and the scan begins at 332. The input to the controller 44 is the raw sensor output, R(t) at step 334. A sensor processor converts R(t) to the processed sensor output, S(t) at step 336, which is intended to equal the probe position X(t), as indicated at 338. The controller 44 retrieves the current value of the programmed trajectory PX(t) at step 340. S(t) and PX(t) are presented to a comparator, which computes $$D(t)=S(t)-PX(t)$$

at step 342. A feedback processor examines current and earlier values of D in order to set the next increment of drive voltage v(t) applied to the scanner 10 at step 344; the objective of this feedback is to keep D close to 0. The output of the feedback processor is drive voltage v(t), which is sent to the scanner 10 at step 346.

The details of feedback methods are well-known in the prior art and will not be elaborated upon herein. It will be observed, however, that X(t)=PX(t), when S(X)=X. For example, when S(X) is less than X, the feedback will compensate by making X(t) greater than PX(t). Because the computer system stores data at equal intervals of PX, the actual measured data are corrupted by this systematic error in S(X).

Figure 23:
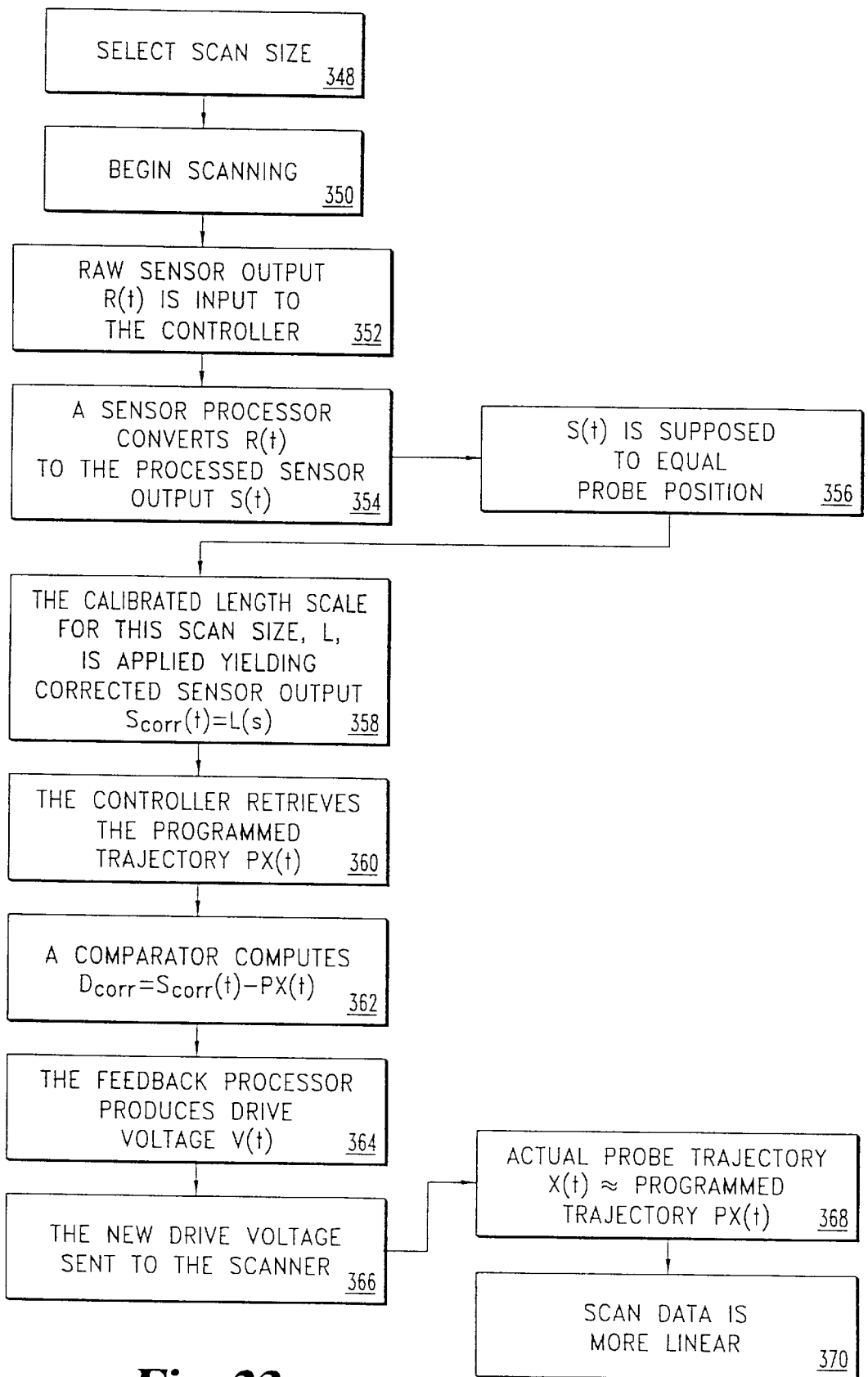
FIG. 23 is a schematic process diagram illustrating an improved closed-loop controller operation process of the present invention.

First, consider the offline correction method. As described above, the first embodiment off-line process (FIG. 6) is applied to correct the measurement data. In particular, an image of the calibration specimen at a selected scan size is obtained, an average cross-section is calculated, the feature positions are determined and the differential nonlinearity, K(x), the fit function Kfit(x), and the calibrated length scale, L(x) are each computed. Now consider the realtime correction method of FIG. 17. Just as for the offline correction method, a calibrated length scale, L(X) is determined for a selected scan size. FIG. 23 illustrates a process performed by an improved closed-loop controller operated according to the current invention. The scan size is first selected at 348 and the scan begins at 350. The input to the controller at step 352 is the raw sensor output, R(t). A sensor processor converts R(t) to the processed sensor output, S(t) at step 354. As illustrated at 356, S(t) is supposed to equal the probe position. At step 358, the calibrated length scale L is applied, yielding the corrected sensor output $$S_{corr}(t)=L(S).$$

This correction step improves the accuracy of the controller of the present invention over the prior art controller 44. The controller retrieves the current value of the programmed trajectory PX(t) at step 360. $S_{corr}(t)$ and PX(t) are presented to a comparator at step 362, which computes $$D_{corr}(t)=S_{corr}(t)-PX(t).$$

The feedback processor examines current and earlier values of $D_{corr}$ and produces drive voltage v(t) at step 364, which is sent to the scanner at step 366. The result is that the actual probe trajectory X(t) more closely resembles the programmed trajectory PX(t), as illustrated at 368 and the scan data is more linear, as illustrated at 370.

It is desirable to check the accuracy of the scan produced using the improved controller of the present invention. If desired, accuracy can be further improved by a fine tuning process which is analogous with fine tuning process 314, which was described in relation to FIGS. 12 and 14 for an open-loop scanner. The only differences required for use of this process for a closed-loop controller are as follows:

The adjustable parameters (e.g. the coefficients a, b, c, . . . of the various terms of a polynomial) of the calibrated length scale L take the place of the scan drive parameters.

The linear term in the calibrated length scale L affects the scanner sensitivity (mean calibration).

Figure 24:
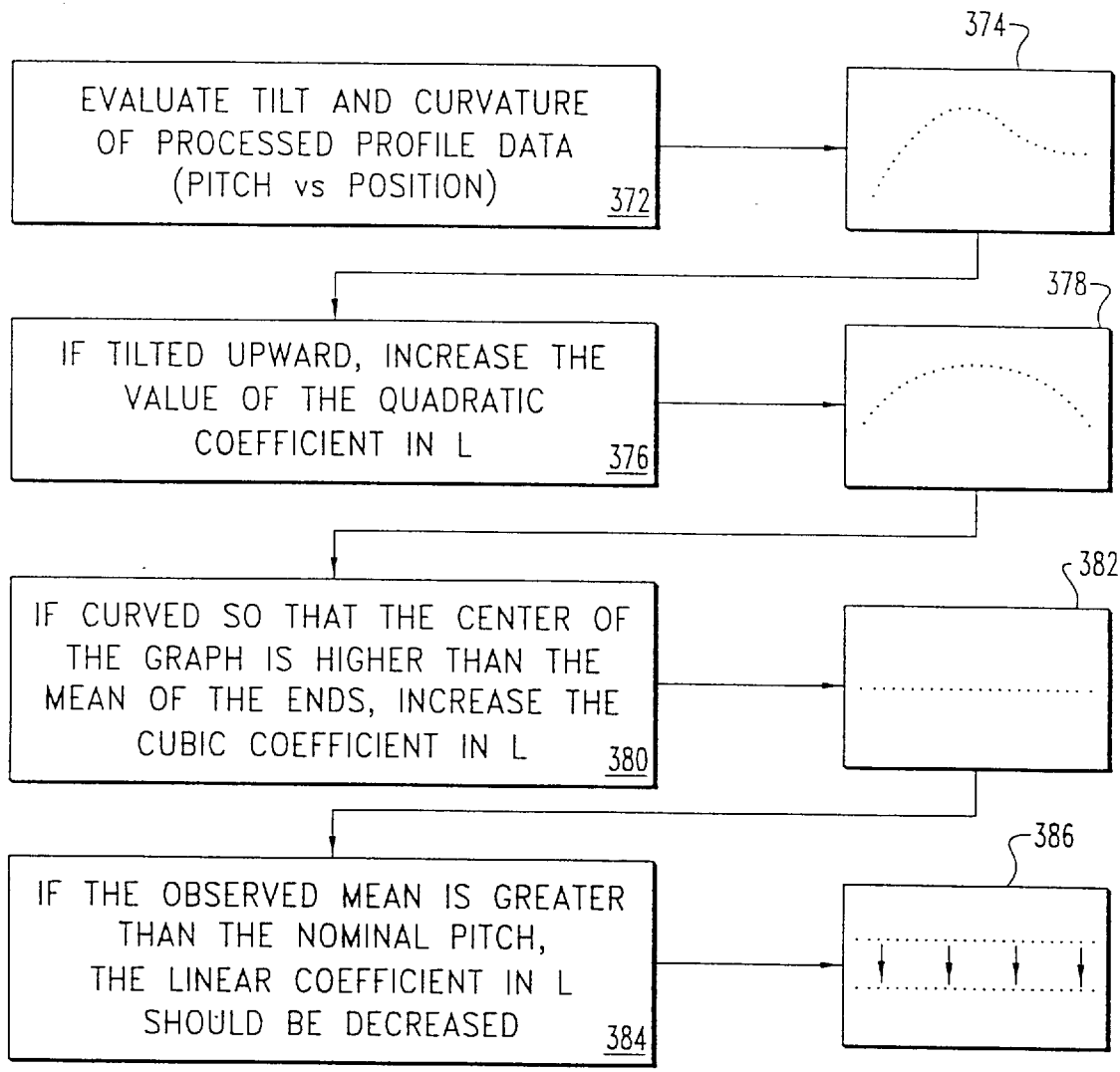
FIG. 24 is a schematic process diagram illustrating a closed-loop fine-tuning realtime calibration process of the present invention.

The adjustment process is slightly different and is described in detail in FIG. 24.

At step 372–382, the tilt and curvature of the processed profile data are evaluated. If tilted upward, the value of the quadratic coefficient in L is increased at step 376, as illustrated at 378. If curved so that the center of the graph is higher than the mean of the left and right ends, then the value of the cubic coefficient in L is increased at step 380, as illustrated at 382. At step 384, the mean value of the pitch data is compared with the nominal value for the calibration specimen. If the observed mean is greater than the nominal pitch, the linear coefficient in L is decreased, as illustrated at 386.

The above process is one possible method for optimizing the parameters of the calibrated length scale L. It should be obvious to one of ordinary skill in the art that other methods of searching parameter space and selecting improved values are possible.

So far, the present description has mainly considered processes for improving linearity at individually selected scan sizes. The following describes a process for linearizing any scan size within the range of the scanner, without requiring use of the calibration specimen at that scan size. The calibrated length scale L is an analytic function, with a defined set of adjustable parameters. For example, in the third order polynomial $a+bx+cx^2+dx^3$, the set of parameter values (a, b, c, d) define the calibrated length scale at a given scan size. By determining this set of parameter values at two or more scan sizes, we can estimate (interpolate and extrapolate) the values of each parameter at other scan sizes.

Figure 25:
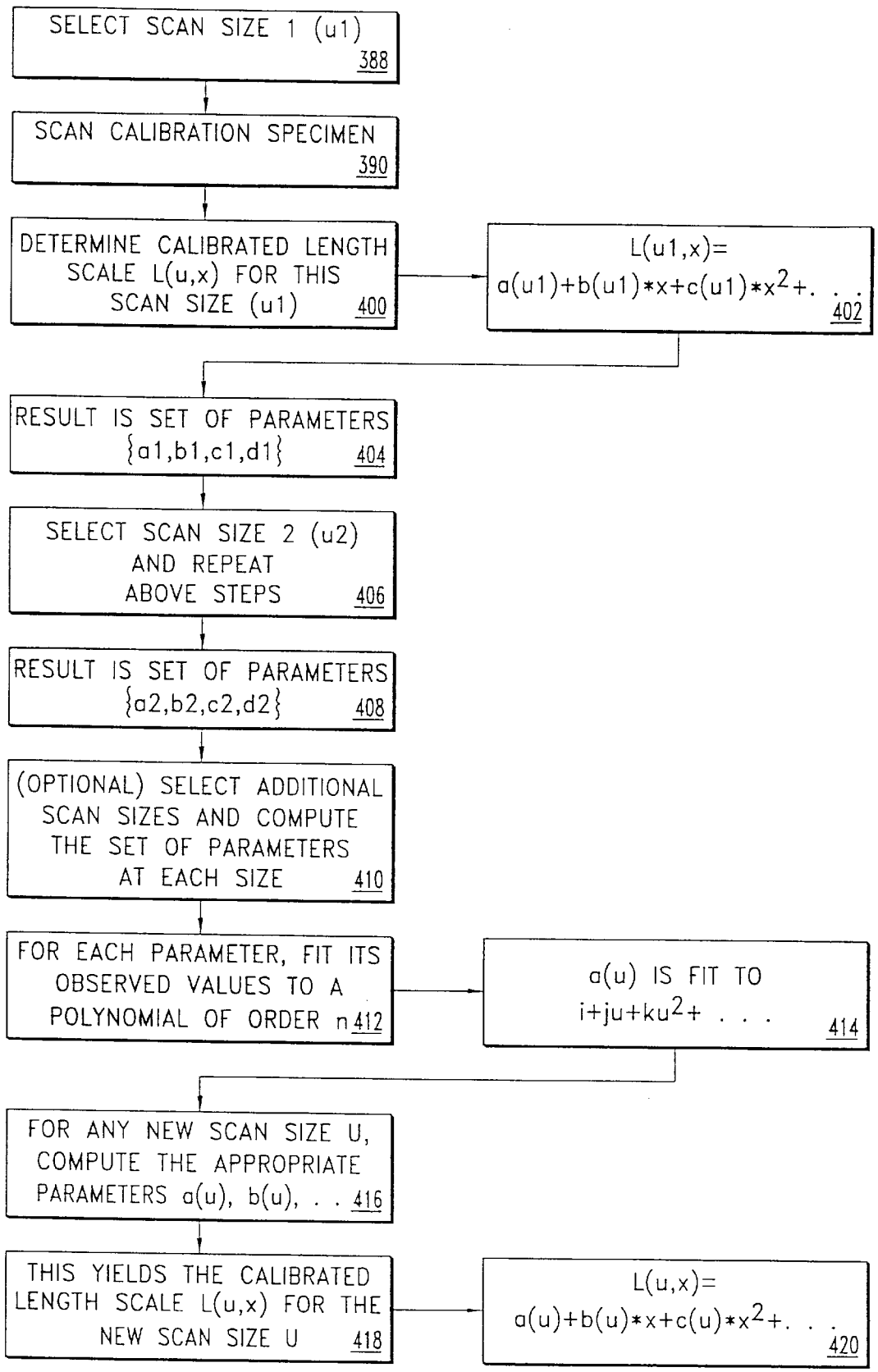
FIG. 25 is a schematic process diagram illustrating a process for linearizing any scan size without requiring the use of a calibration specimen at that scan size.

FIG. 25 illustrates the process steps. At step 388, a first scan size U1 is selected; then, at step 390, the calibration specimen is scanned. The calibrated length scale L is determined at step 400 using the process shown in FIG. 6. Note, that L is expressed as a function of both scan size U and position within the scan X at step 402. That is, L is expressed as:

$$L(U1,x)=a(U1)+b(U1)*x+c(U1)*x^2+ \ldots$$

where it is recognized that the adjustable parameters (or coefficients) a, b, c, . . . are functions of the scan size.

The result of finding L is the the set of parameters (a1, b1, c1, . . . ), as illustrated at 404. At step 406, we repeat this process for a second scan size U2 and obtain a second set of parameters (a2, b2, c2 . . . ) at step 408.

This process may optionally be repeated at additional scan sizes at step 410. At step 412, the values of each parameter as a function of U are fit to a polynomial of order n (where n is restricted to being at least 1 less than the number of independent data points. That is n=1 for two scan sizes.) At step 414, each of the coefficients a, b, c, . . . are expressed as functions of U, for example the function $a(u)=i+j*U+k*U^2+ \ldots$. Analogous functions are obtained for the other parameters in L. At step 416, the parameters a(u), b(u), c(u), . . . are computed for a newly-selected scan size U. At step 418, the calibrated length scale L(U,X) is computed using those parameters. This function L can be used to make offline corrections for data captured by any SPM, as described above in FIG. 7, where measured feature positions are corrected by applying the calibrated length scale. This function L can also be used to make a realtime correction for a closed-loop SPM, as described above in FIG. 23.

Next, a process for realtime linearization of any scan size of an open-loop scanner, without requiring calibration at that scan size, will be described. As noted above, in one type of prior art SPM, the open-loop control system provides nonlinear voltage increments Δv(t) using the general functional form:

$$\Delta v(t)=C+Mag*e^{(-Arg)t}$$

where normalization factors that are unimportant for this discussion are omitted. In the prior art, it is preferred that Arg be held fixed for all scan sizes, whereas Mag was varied with scan size using a nonlinear derating function. We have found that holding Arg constant results in significant errors. For example, when Arg is adjusted so as to minimize nonlinearity for a large scan size (e.g. 100 μm, as suggested in the prior art), smaller scan sizes (e.g. 10 μm) captured using that Arg value may have significant nonlinearity (e.g., 5% variation of pitch value with position in the image). In the improved process of the current invention, Arg varies with scan size, instead of being held fixed. Mag also varies with scan size, using the prior art derating function. Mag and Arg are optimized at two or more scan sizes using either of the fine-tuning processes 314 or 316. The values of Mag are fit to the nonlinear prior art derating function in order to determine the parameters $Mag_0$ and $Mag_1$. The values of Arg as a function of scan size are fit to a polynomial, preferably a linear function due to its simplicity. The Arg value to be used at any arbitrary scan size is obtained from its fit function.

Figure 26:
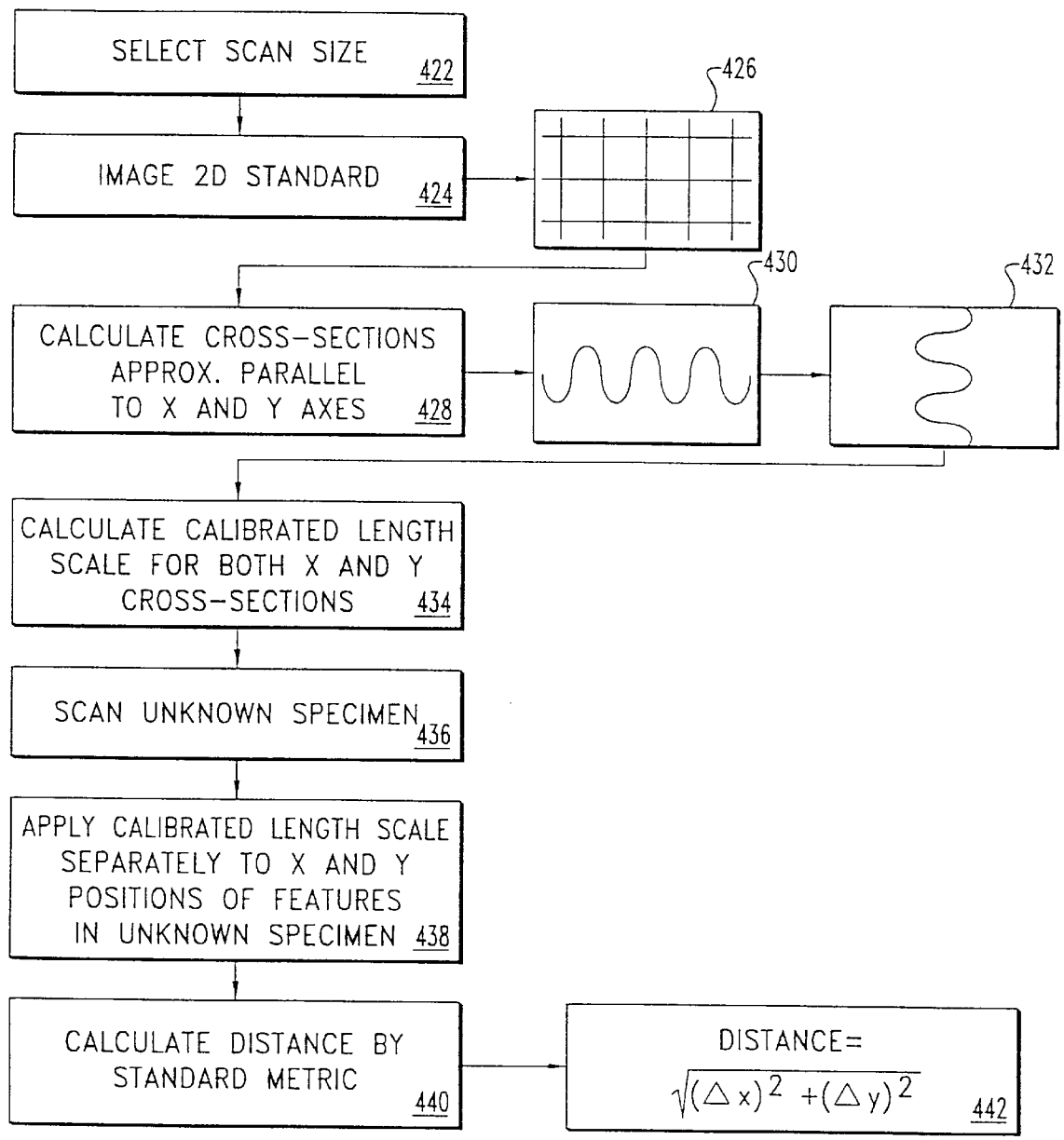
FIG. 26 is a schematic process diagram illustrating a process for calibrating X and Y feature positions and for measuring distances along arbitrary directions.

In the above discussion, we have emphasized the measurement of feature spacings which are generally measured along either the X or Y axes. It is of interest to be able to measure the separation of features along other directions. FIG. 26 presents an improved process for correcting X and Y feature positions and measuring distances along arbitrary directions.

At step 422, a scan size is selected. At step 424, a two dimensional standard is imaged, as illustrated at 426. This consists of any array of posts or pits. (Note: it is also possible to get the needed data by imaging a one-dimensional grating twice, once oriented with ridges parallel to Y and once with ridges parallel to X). At step 428, average cross-sections are calculated parallel to the X and Y axes, as illustrated at 430 and 432. At step 434, the process of FIG. 6 is used to calculate calibrated length scales independently for the X and Y axes.

At step 436, the unknown specimen is scanned and feature positions are determined. At step 438, the calibrated length scales are applied to the X and Y coordinates of the features. At step 440, the difference between two features is calculated using the standard metric (or formula), shown in 442.

In analogy with the concern about linearity of position data relating to the horizontal axes, X and Y, users of Scanning Probe Microscopes are concerned about the linearity of positioned data along the Z axis. In a prior art method, linearity of the Z axis is evaluated by mounting a planar object (e.g. a silicone wafer) on a wedge specimen, scanning an image and evaluating whether the observed slope is planar (albeit tilted) or curved. A curved slope is taken to indicate that the Z axis scan is nonlinear. This prior art method has a deficiency: nonlinearity of the X axis scan can result in a curved slope, regardless of the quality of the Z axis scan.

Figure 27:
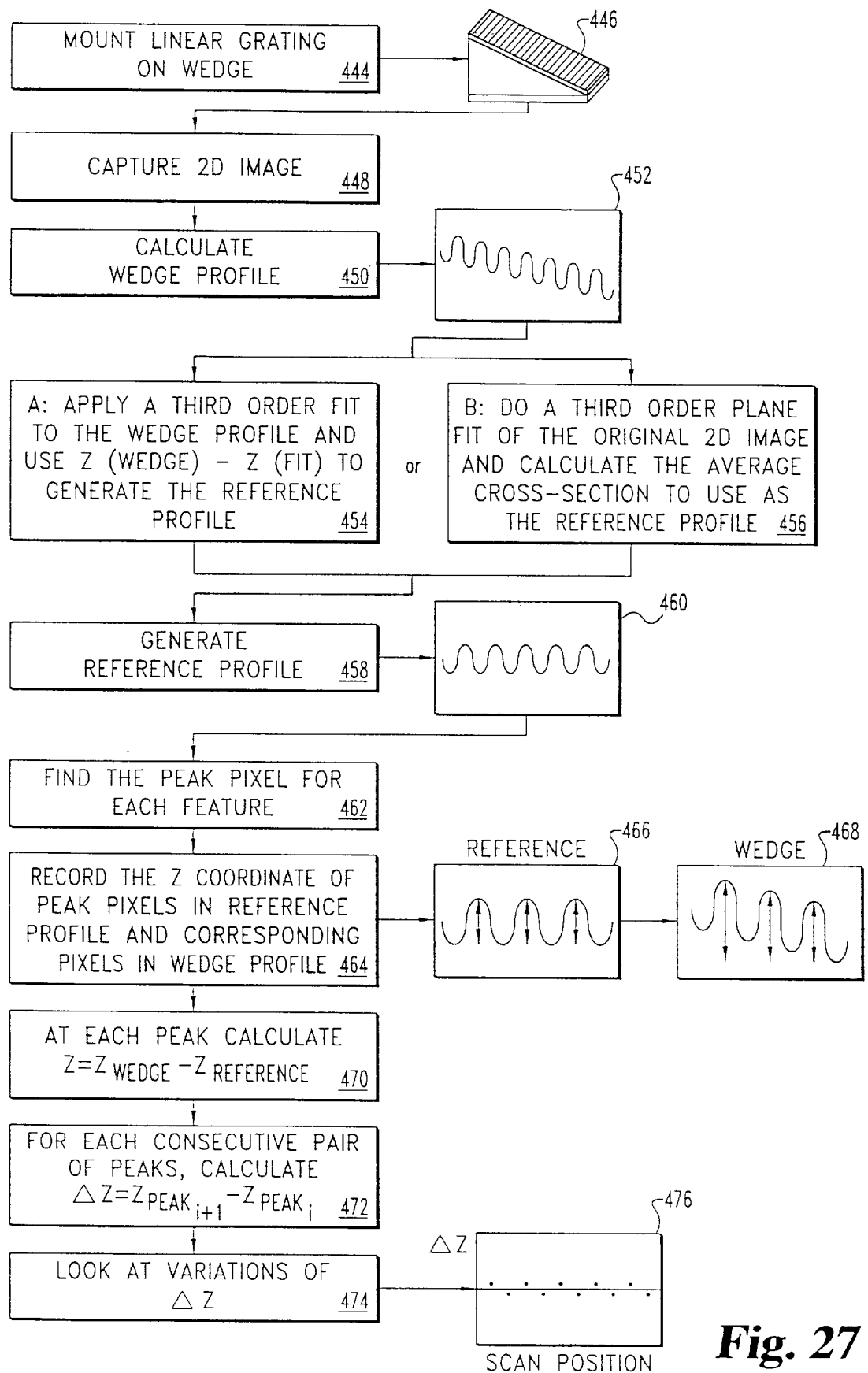
FIG. 27 is a schematic process diagram illustrating a process for determining Z axis linearity.

FIG. 27 presents an improved process for checking Z axis linearity. The results can be used both for quality assurance and to guide parameter adjustments so that realtime SPM performance is improved. These parameters adjustments are not described here in detail, but would be obvious to one skilled in the art, after consideration of the analogous process for a horizontal scan axis discussed hereinabove.

The process begins at step 444 by mounting the 1-dimensional (linear) grating on a wedged specimen holder, as illustrated at 446, so that the grating ridges are approximately perpendicular to the wedge direction. The specimen is oriented in the SPM so that the wedge direction is approximately parallel to either the X or the Y scan axis. The wedge angle is not critical; values in the range 0.3°–20° may be useful. At step 448, a 2-dimensional scan (image) is captured. An average profile, labeled the "Wedge Profile", is calculated at step 450, as illustrated at 452.

A reference profile is generated by either of two procedures. Procedure "A" is performed at step 454 by fitting the wedge profile Z(wedge) to a 3rd-order polynomial Z(fit) and then calculating:

Reference profile=$Z_{wedge} - Z_{fit}$.

That is, the reference profile consists of the residuals of this fit. These residuals represent the general undulations of the ridges plus the remaining surface roughness (which had already been reduced when the average profile was created). Procedure "B" is an alternative to "A". The original 2-D image captured at step 448 is modified by doing a 3rd-order planefit at step 456. From the planefit image, an average cross-section profile is calculated. Both of the procedures "A" and "B" should yield the same result.

The reference profile produced by either of these procedures is shown at 460. At step 462, using the reference profile, the peak pixel (maximum value of Z) for each feature is located. At step 464, the Z value at each peak pixel in the reference profile and at each corresponding pixel in the wedge profile is recorded, as illustrated at 466 and 468. At step 470, the difference between each wedge/reference pixel pair is calculated as follows:

$Z = Z_{wedge} - Z_{reference}$.

This equation is equivalent to:

$Z_i = Z_{fit}(x_{pi})$ where $x_{pi}$ is the x-coordinate of the peak pixel at the i-th feature on the reference profile. At step 472, for each consecutive pair of Z values, a Δz value is computed as follows:

$\Delta Z = Z_{i+1} - Z_i$.

At step 474, the ΔZ values are examined graphically as a function of feature number or scan position as illustrated at 476. Basic statistics such as mean and standard deviation are also calculated. Variations in ΔZ indicate differential nonlinearity in the Z axis of the scanner. The integral nonlinearity can be obtained by integrating the differential nonlinearity.

The following novel features contained in the above process yield unexpected and/or improved results.

By selecting as the calibration specimen a grating instead of a featureless surface, we create a staircase of definite dimensions. In particular, the X run and Z rise of each tread are constant because of the grating features are equally spaced. By referring to the features as discrete objects in this manner, we avoid any concern about the nonlinearity of the X axis. Thus, this method can be applied to any SPM, whether or not the X axis has been properly linearized.

By creating an untilted reference profile as described above, and then subtracting its peak pixel Z values from the wedge profile, we remove most of the effects of surface roughness. As a result, the ΔZ values contain much less noise.

Figure 34:
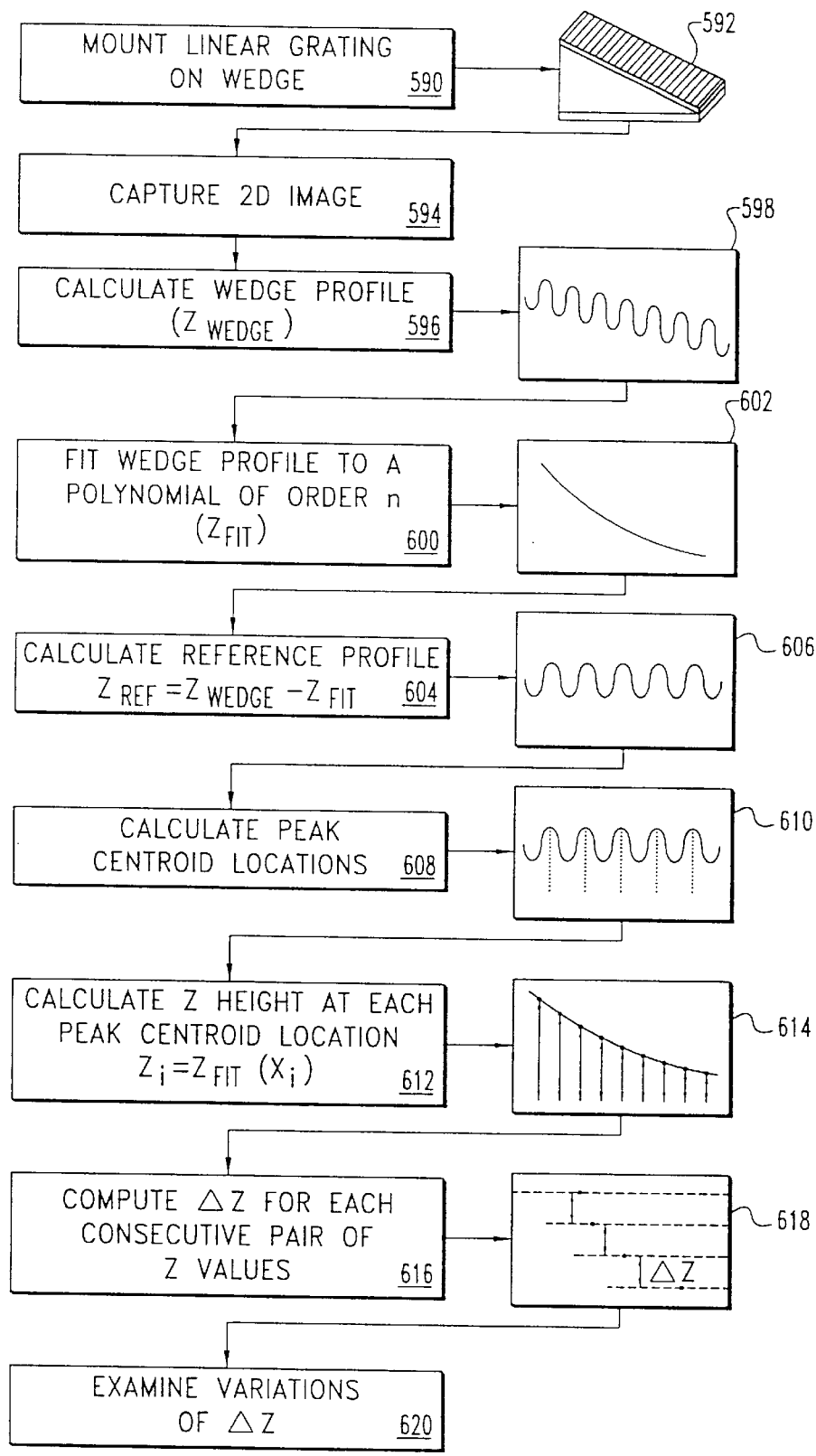
FIG. 34 is a schematic process diagram illustrating a second embodiment process for determining Z axis linearity.
Figure 35:
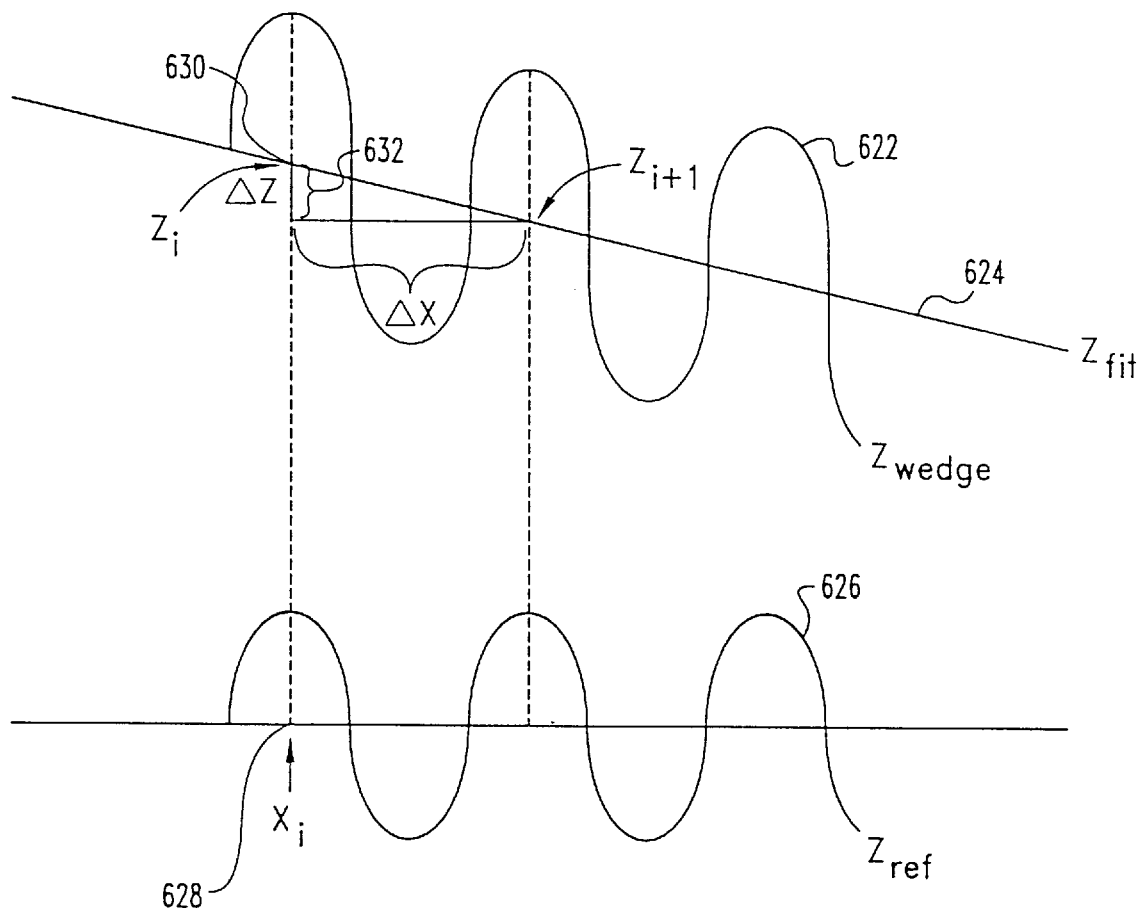
FIG. 35 is a graph of a z height vs. x. position, illustrating the process of FIG. 34.

FIG. 34 presents a second improved process for checking Z axis linearity. FIG. 35 shows functions and points used in this process. The data capture and calculation of the wedge profile, steps 590–598 are the same as the corresponding steps 444–452 in FIG. 27. The subsequent data treatment is different. At step 600, the wedge profile, $Z_{wedge}$, item 622 in FIG. 35 (z height as a function of x, the scan position) is fitted to a polynomial of order n, e.g. n=3. The order n is chosen small enough so that the general undulations of the ridges remain substantially in the residuals of the fit. This polynomial is designated $Z_{fit}$, and is shown as 624 in FIG. 35 and is illustrated as 602 in FIG. 34. The reference profile, $Z_{ref}$, item 626, is calculated at step 604 as:

$Z_{ref} = Z_{wedge} - Z_{fit}$ as illustrated at 606. Note that $Z_{ref}$ and $Z_{wedge}$ are discrete functions, whereas $Z_{fit}$ is a continuous function. At step 608, the peak centroid locations, $x_i$ (item 628) are calculated on the reference profile using the feature measurement process of FIG. 6, step 70, as illustrated at 610. At step 612, individual values, $Z_i$ (item 630) of z height at each peak centroid location are calculated from the fit function as:

$Z_i = Z_{fit}(x_i)$ as illustrated at 614. This is analogous to step 472 (FIG. 27), but here we are using a more precise location and we are taking advantage of the fact that $Z_{fit}$ is a continuous function. At step 616, for each consecutive pair of Z values, a ΔZ value (item 632) is computed as follows:

$\Delta Z_i = Z_{i+1} - Z_i$ as illustrated at 618. The variations of ΔZ are examined at step 620, which is equivalent to steps 474 and 476 (FIG.27), as described above.

The advantage of this method (compared with that described in FIG. 27) is that the feature locations are found more precisely, using the centroid location instead of the peak pixel. By reducing the uncertainty of the x-coordinate, the uncertainty of the z value is correspondingly reduced.

It should be obvious to those skilled in the art that other methods exist for improving the precision of the Z measurement used for evaluating Z axis linearity. For example, in the process of FIG. 27, instead of using just the Z value at the peak pixel, one could instead use the mean of Z values in a sub-array containing the peak pixel. Another alternative would be to fit segments of the reference and wedge profiles to a nonlinear function which models the peak shape and use the local maxima of those fit functions to provide calculated peak heights.

Figure 28:
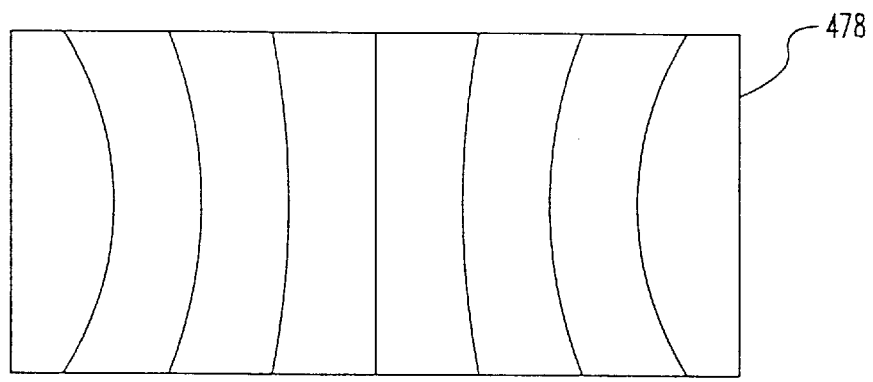
FIG. 28 is an X-Y scan exhibiting pincushion distortion.

Hereinabove, we have considered the nonlinearity of the X axis to be independent of the nonlinearity of the Y axis. However, it is possible for cross-coupling to exist. FIG. 28 illustrates one type of distortion (called pincushion distortion) which is due to cross-coupling. As drawn, the grating features 478 are approximately evenly spaced for Y values near the middle of the frame, but they are not evenly spaced near the top and bottom of the frame. A 1-dimensional analysis and correction procedure would not be adequate for this case.

Figure 29A:
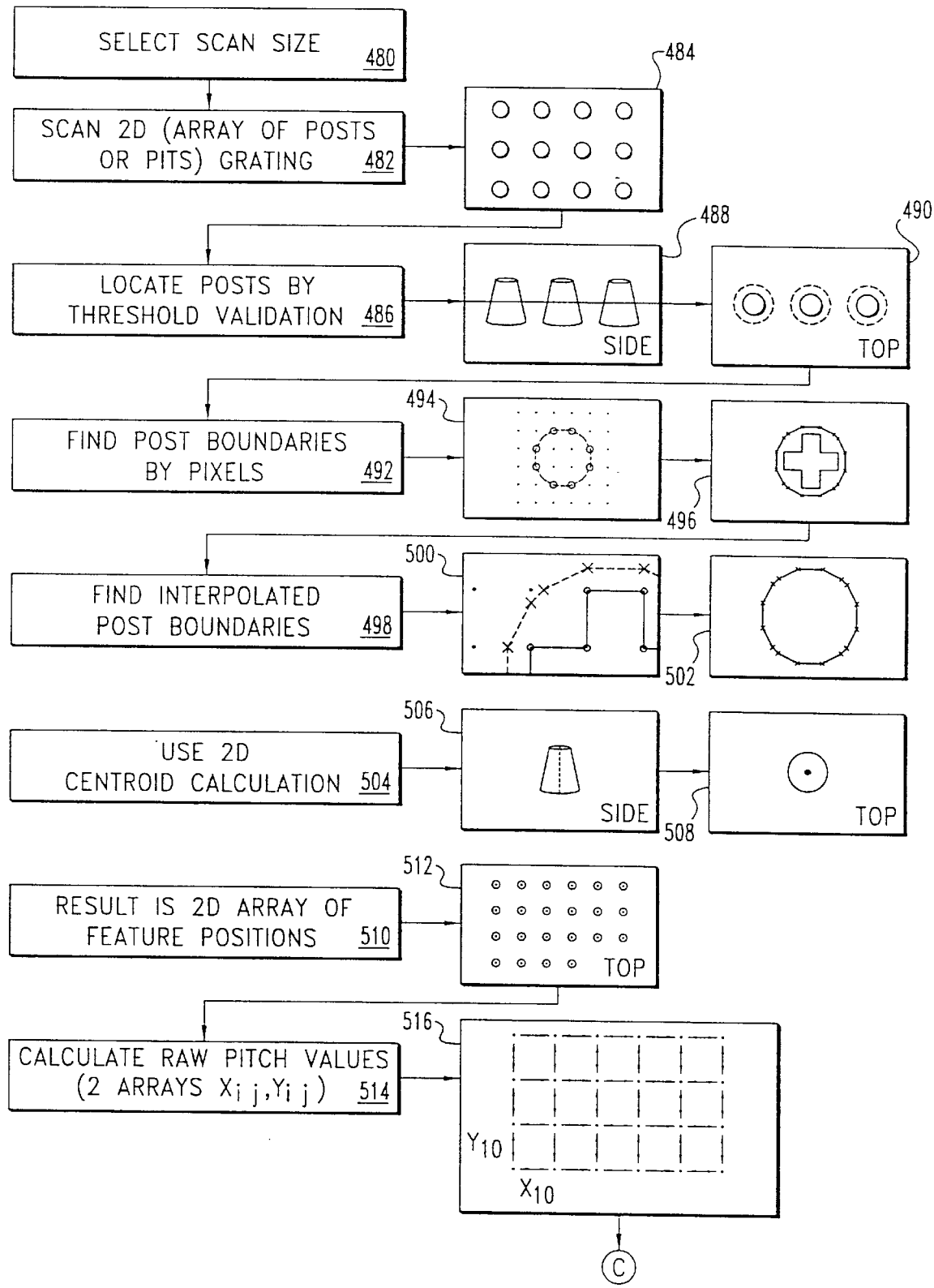
FIGS. 29a and b are schematic process diagrams illustrating a process for analyzing and correcting two-dimensional distortions.

FIG. 29 presents a process for analyzing and correcting 2-dimensional distortions. The process is an extension of the methods used hereinabove for the 1-dimensional case. A scan size is selected at step 480. A two-dimensional calibration standard (e.g. a square array of evenly-spaced pits or posts, as illustrated by 484) is then scanned at step 482. (In what follows, it is assumed that the structures are posts. It is obvious that the mathematical treatment of a pit specimen would be identical if the image data were first inverted, transforming z to -z).

Figure 30:
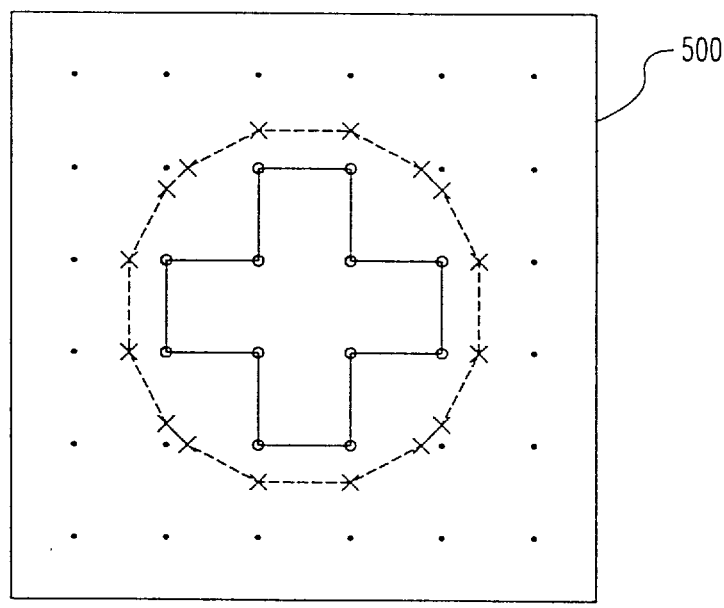
FIG. 30 is an enlarged view of a portion of FIG. 29.

At step 486, the posts are located by threshold validation. That is, all pixels which exceed a predetermined threshold height are located, as illustrated at 488 and 490. This is analogous to steps 118–124 in FIG. 10. At step 492, the pixels at the post boundry are explicitly identified, as illustrated at 496. The circled pixels illustrated at 494 are just above the threshold. At step 498, interpolated boundaries are determined, as illustrated at 500 and 502. For each of the circled pixels, we first determine which of the four nearest neighbor pixels is below the threshold. For each below-threshold pixel, we find one interpolated threshold-crossing point, just as was done at step 132 in FIG. 10. The threshold-crossing points are indicated by crosses at 500. This portion of the figure is shown at a larger size as FIG. 30. The polygon connecting all the threshold-crossing points and the surface above it define the volume of integration for the centroid calculation at step 504. In this calculation, the X and Y coordinates of the feature's centroid are calculated separately, as illustrated at 506 and 508. The details of the centroid calculation are well-known in mathematics. At step 510, we have a 2-dimensional array of feature positions, as illustrated at 512. At step 514, raw pitch values are calculated as the observed separation between adjacent features, as illustrated at 516. Each pitch value is associated with the (x,y) coordinate of the midpoint between the two features. This is the analog of step 138 of FIG. 10. The result consists of two 2-dimensional arrays.

Figure 29B:
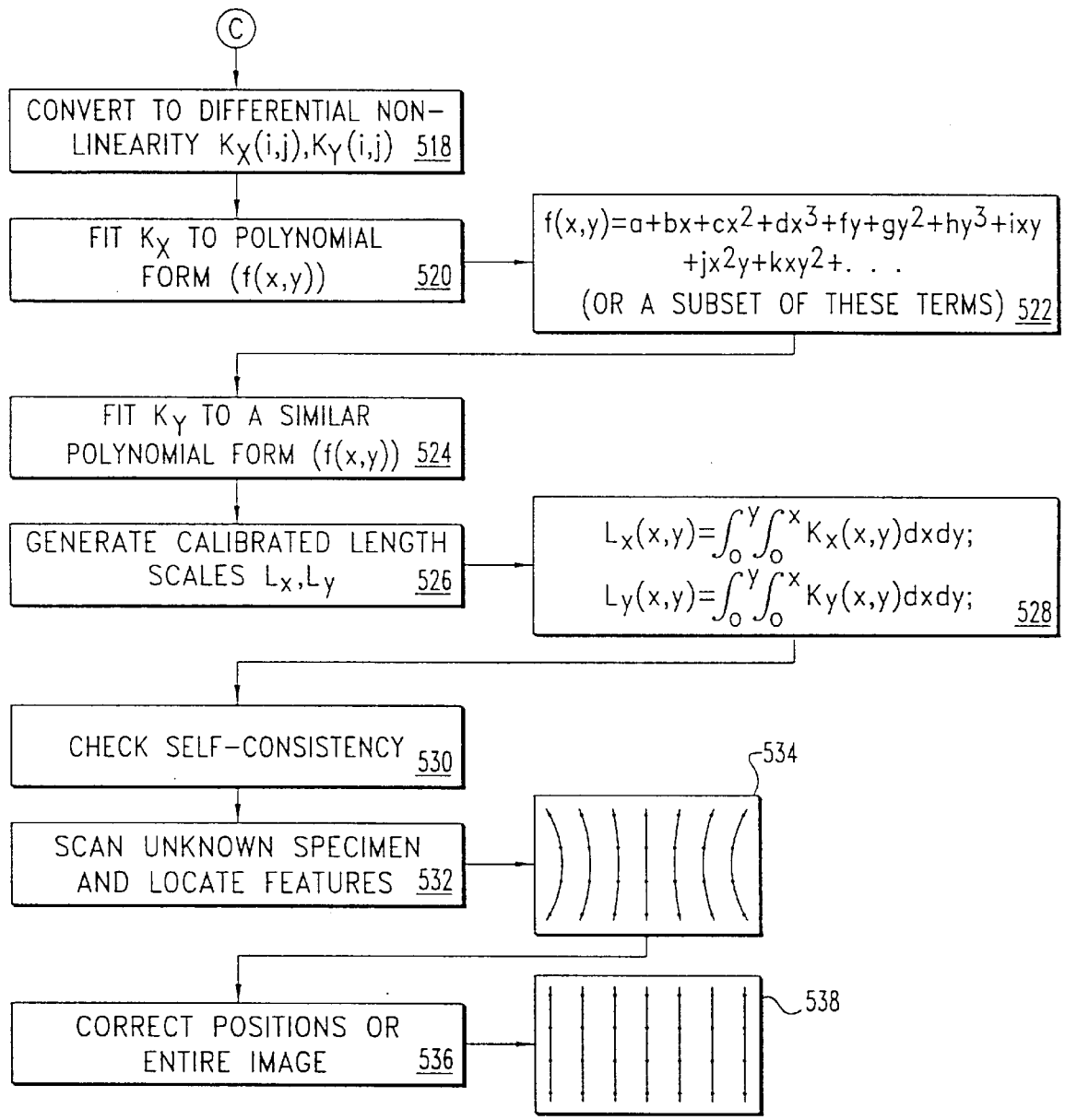

Continuing on FIG. 29b, at step 518, the differential nonlinearity arrays $K_x$ (i,j) and $K_y$ (i,j) are computed by using the general formula $$K = \text{(nominal pitch)/(observed pitch)}$$

as indicated at step 146 of FIG. 11. At step 520, $K_x$ is modeled as a nonlinear function of x and y. For example, $K_x$ may be fit to a polynomial of the form:

$$f(x,y) = a + bx + cx^2 + dx^3 + fy + gy^2 + hy^3 + ixy + jx^2y + kxy^2 \ldots$$

where the indicated terms are shown to third order, as illustrated at 522. In practice, it may be advantageous to use a subset of the terms shown or to extend the polynomial to an even higher order. At step 524, $K_y$ is fitted to a polynomial of the same form. At step 526, calibrated length scales $L_x$, $L_y$ are generated. Each length scale is a function of two variables and is calculated as a definite, double integral, as illustrated at 528 and as follows:

$$L_x = L_x(x,y) = \int_0^y \int_0^x K_x(x,y) dx dy$$

$$L_y = L_y(x,y) = \int_0^y \int_0^y K_y(x,y) dx dy$$

This calculation is analogous to step 152 of FIG. 11.

At step 530, self-consistency is checked by a process analogous to step 82 of FIG. 6. This involves applying the calibrated x and y length scales to the original feature positions, calculating corrected pitch values from the corrected positions, and examining the resulting arrays, both statistically and graphically. The two-dimensional arrays of pitch data can be viewed graphically by a variety of renderings, as will be apparent to those skilled in the art.

At step 532, an unknown specimen is scanned and (optionally) its features are located, as illustrated at 534. At step 536, the calibrated length scales are applied to correct the position of the individual features, or, alternatively, the entire image can be corrected pixel by pixel. This is illustrated at 538. The process of correcting an entire image would use interpolation so that the corrected image consists of an array of Z values on a grid of pixels equally spaced in x and y; such methods of interpolation are well-known to those skilled in the art.

Figure 31:
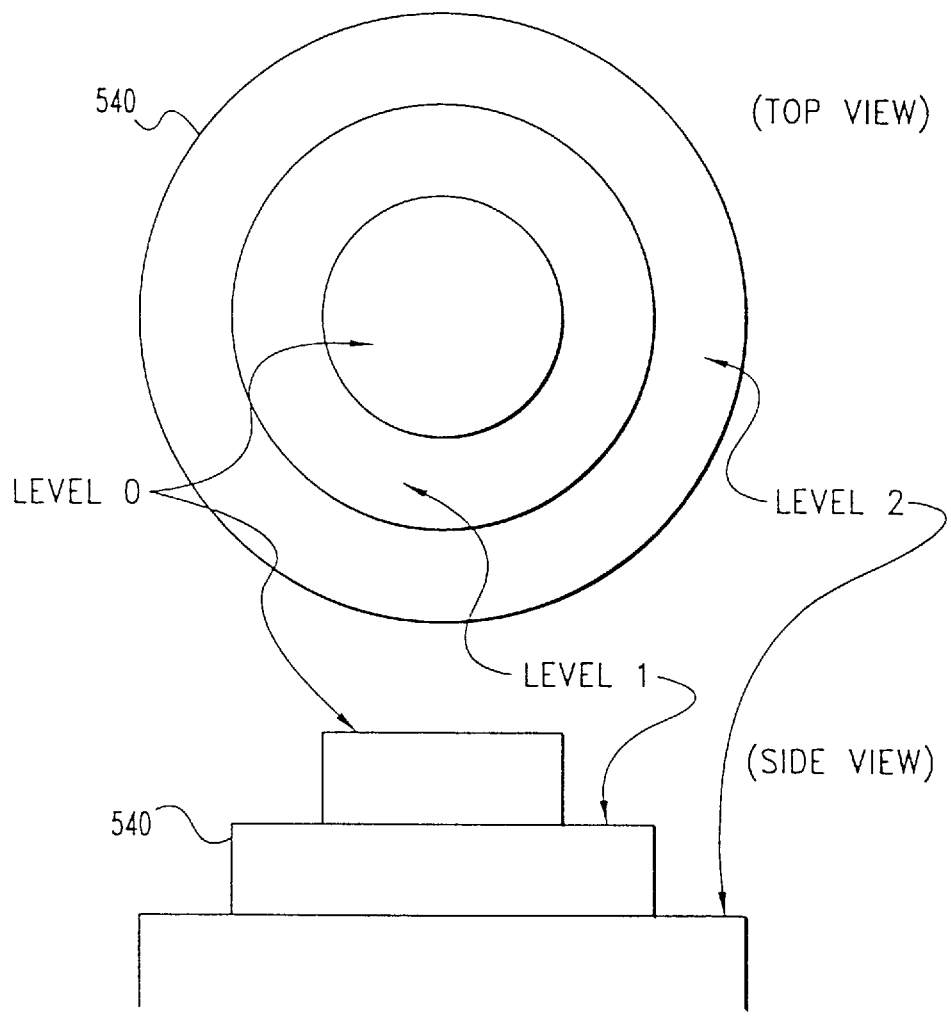
FIG. 31 is a top plan view and a side elevational view of a two-dimensional calibration array of the present invention.

A three-dimensional analog of the two-dimensional distortion correction process can be envisioned. This is important and useful because many technological objects, such as integrated circuits, require tight control over all three dimensions (length, height and width) of microscopic features. Most of the process steps for three-dimensional calibration and distortion correction are completely analogous to the two-dimensional process of FIG. 29, and this process can therefore be extended to three dimensions by those skilled in the art. Some specific elements of the 3-dimensional case are not obvious. These are as follows:

The calibration specimen must be a two-dimensional array of features. Instead of being a simple post, each feature has several levels. The height difference between the levels provides Z pitch information analogous to the x and y pitch information used hereinabove. FIG. 31 shows top and side views of one type of structure 540 that is suitable. As shown, the structure 540 is similar to a wedding cake. It consists of a series of layers of different diameter.

The x, y and z coordinates of each level of a given feature are determined as follows:

The image is partitioned into regions corresponding to each level. Level 0, the top, is approximately a circle. Regions for the lower levels are annuluses.

The z coordinate of each level is the average of z values for the pixels within the corresponding region.

The x and y coordinates of each level are calculated as centroids, with integrals calculated over the corresponding regions. The reason for calculating the x, y coordinates for each level is that a known artifact of SPM scanners will cause the coordinates to be different at different heights, even when the underlying feature is completely symmetric. In order to correct for this artifact (z axis coupling to xy) xy data is required at each level.

For a structure having n levels, the x, y, z position data consist s of n three-dimensional arrays containing the data for all features.

The process is completed using steps analogous to the process of FIG. 29. N−1 sets of pitch data can be calculated from the position data. The pitch data can be fit to nonlinear functions of the three variables x, y, z, calibrated length scales Lx(x,y,z), Ly(x,y,z), and Lz(x,y,z) can be calculated and applied to correct feature position data to entire images.

It will be appreciated by one skilled in the art that the 2- and 3-dimensional calibrated length scales can be used in a realtime process to remove nonlinearities from a closed-loop scanner, by the described approach relative to the 1-dimensional case.

Figure 32:
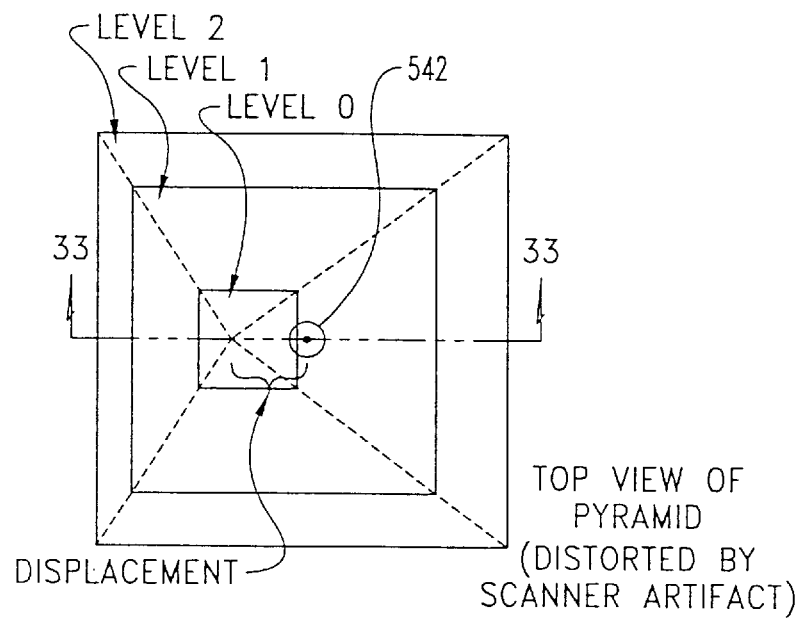
FIG. 32 is a top plan view of a calibration specimen used for correcting Z axis coupling to the X and Y axes.
Figure 33:
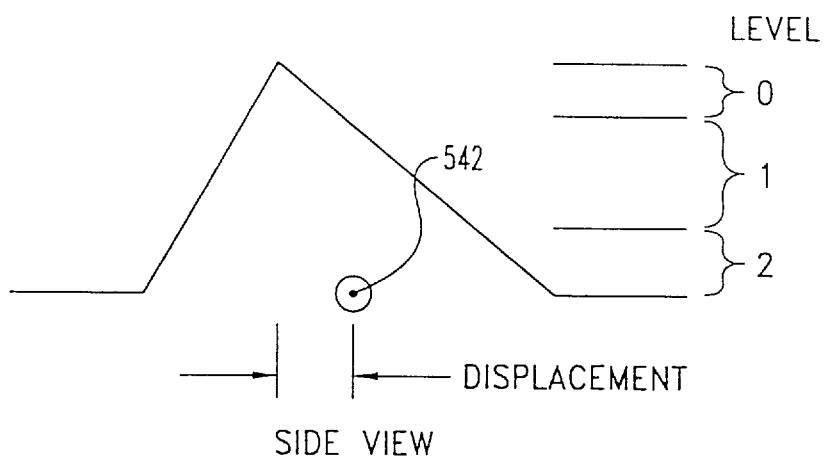
FIG. 33 is a cross-sectional view of the calibration specimen of FIG. 32.

One process related to the complete 3-dimensional process described above is useful on its own. The scanner artifact of z axis coupling to x and y means that when the scanner is driven purely along the z axis there is unwanted horizontal motion. It is important to check the mangitude of this artifact because it degrades the accuracy of sidewall slope angle measurements of steep objects such as microlithographic features. This artifact can be checked using a test specimen consisting of a single symmetric 4-sided pyramid, as illustrated in FIGS. 32 and 33. The sides of the pyramid may be featureless. This specimen is much simpler and more readily fabricated than the "wedding cake" structure described above.

In a prior art method, a "two-point" analysis of z-xy coupling is accomplished by imaging the pyramid. FIGS. 32 and 33 show top and side view images of such a pyramid. It is drawn distorted to illustrate the artifact of interest. The data analysis proceeds as follows: The summit and the four corners of the base are located, by visual inspection of the image at 1-pixel resolution using a cursor on the computer display. The mean of the x,y coordinates of the 4 corners is then calculated (this is the center of the pyramid and is indicated by the circled dot 542). The difference between the calculated center of the base and the x,y coordinates of the summit is the xy displacement distance. In addition, the height of the pyramid is measured. Thus, for a specific z excursion (the height of the pyramid), a specific xy displacement has been measured. There are two deficiencies in this method:

the resolution of feature measurement is limited, so it is difficult to distinguish among scanners that have relatively small z-xy couplings the information is provided only for one specific z excursion value. No information is provided for intermediate z excursions. It is known that the magnitude of the coupling may vary along the z axis. Having more detailed knowledge would help the user choose the most favorable DC offset along the axis.

In an improved process of the present invention for assessing z-xy coupling, the data capture is the same, consisting of imaging the symmetric pyramid. However, the data analysis proceeds as follows. By setting arbitrary height thresholds, the image of the pyramid is partitioned into several regions (for clarity, only 3 are shown in FIG. 32 and 33). For each region, the x and y coordinates of its centroid are calculated, as well as the mean z value. The x and y coordinates are then plotted as a function of these mean z values. The improved method of the present invention has two advantages:

The results are much more precise, so small variations of the z-xy coupling can be detected.

The data analysis is "quasi-continuous". By partitioning the image into more regions we can get progressively more detail about the magnitude of coupling and its variation along the z axis.

Figure 3:
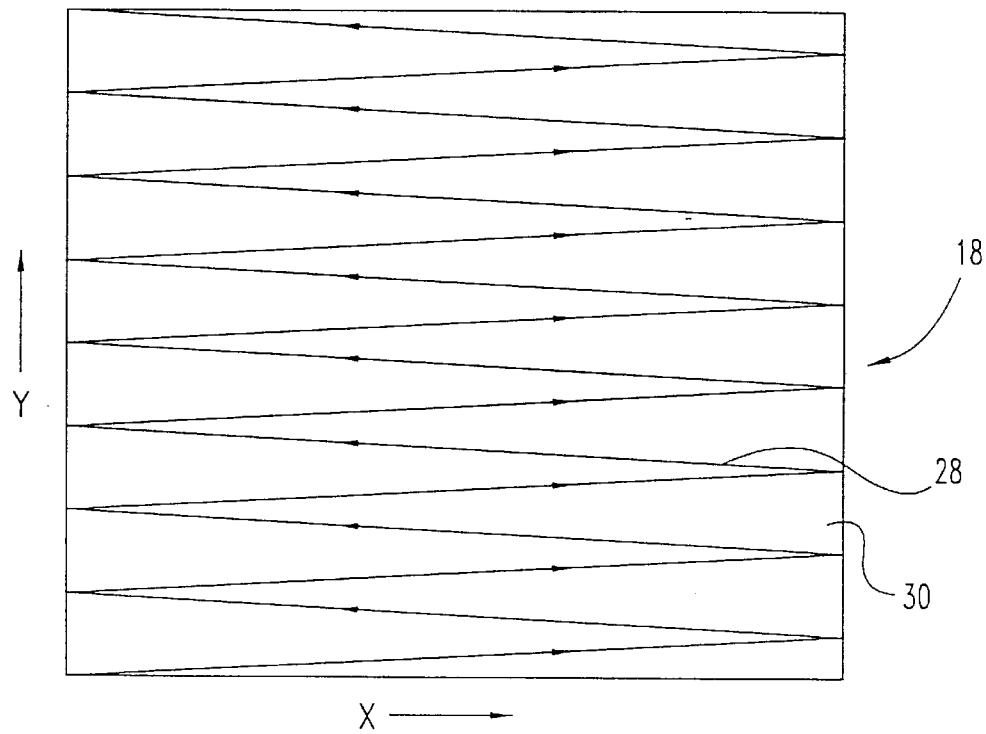
FIG. 3 is a schematic diagram illustrating a trace pattern used for measurement of a sample by the scanner of FIG. 1.
Figure 4:
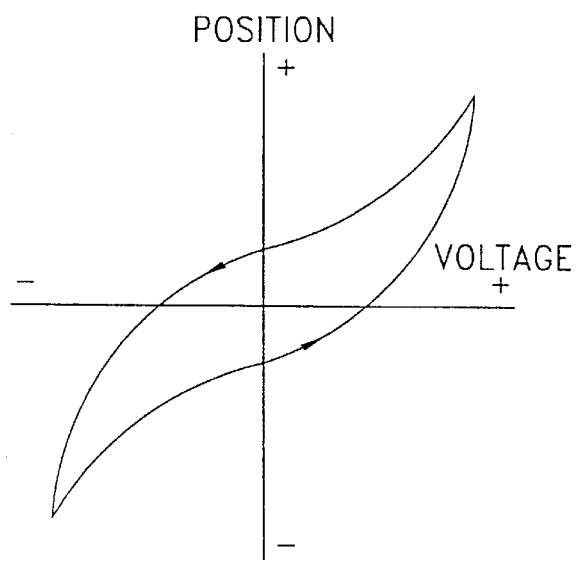
FIG. 4 is a graph of scanner position vs. voltage illustrating the hysteresis exhibited by the scanner of FIG. 1.

Described hereinabove with respect to FIG. 15 is a fine tuning method in which, at step 230, a composite function is fit to the nonlinear function $$D+E*\exp(-Fx)$$

in order to calculate new parameters for the voltage drive function. Although this process does improve the scan linearity, further improvements may be made, particularly for larger scan sizes for the 'slow' axis direction. (Definition: FIG. 3 shows a typical raster pattern for a scanning probe microscope. The X axis is scanned many times per frame, whereas the Y axis is scanned once. We call the X axis "fast" and the Y axis "slow".) After optimizing the above nonlinear function, it is observed that the pitch deviations are systematically positive at the start of scan. This deviation can be in the range 1–10%, which is not a small effect when high precision measurements are needed. The positive deviations tend to decay rapidly, becoming insignificant after the first 5–30% of the scan has been completed.

In one type of prior art scanning probe microscope, the effect of these deviations on measurements parallel to the fast axis can be reduced by using 'rounding'. Rounding describes a process in which the scanner scans a distance X1, but records data only during a smaller segment X2, of the scan, where X2<X1. Typically, the segment X2 is centered within X1. By using rounding, the corrupted data near the start of scan is simply ignored as is the data at the end of scan). A typical rounding value is 0.1, which means that the microscope is not capturing data 10% of the time. Users are generally not aware of this, because the realtime image display is updated rapidly enough (about once a second). However, if this method of rounding were applied on the slow axis, users would be very much aware of it, since the display would be static for 10–30 seconds at the start and end of each frame (assuming frame time is 100–300 seconds and rounding=1.0).

The present invention utilizes a modified type of rounding, which is referred to as "fast rounding", that is suitable for the slow axis. This is likely to be more acceptable to users than ordinary rounding because the idle time is shorter. Before describing the details of the fast rounding method, we note the following terminology. The scan velocity on the fast axis is commonly expressed indirectly, as a product of scan size and scan frequency (lines per second). The scan velocity on the slow axis is expressed even more indirectly: it depends on the scan size, the fast axis frequency and the number of lines per frame. When lines per frame are decreased, the scan duration decreases and the slow axis scan velocity is increased. Because different scan velocities are used in the rounded and normal parts of the frame, fast rounding is distinguished from the prior art rounding method, in which the scan velocity is the same in both the captured and rounded regions.

Figure 36:
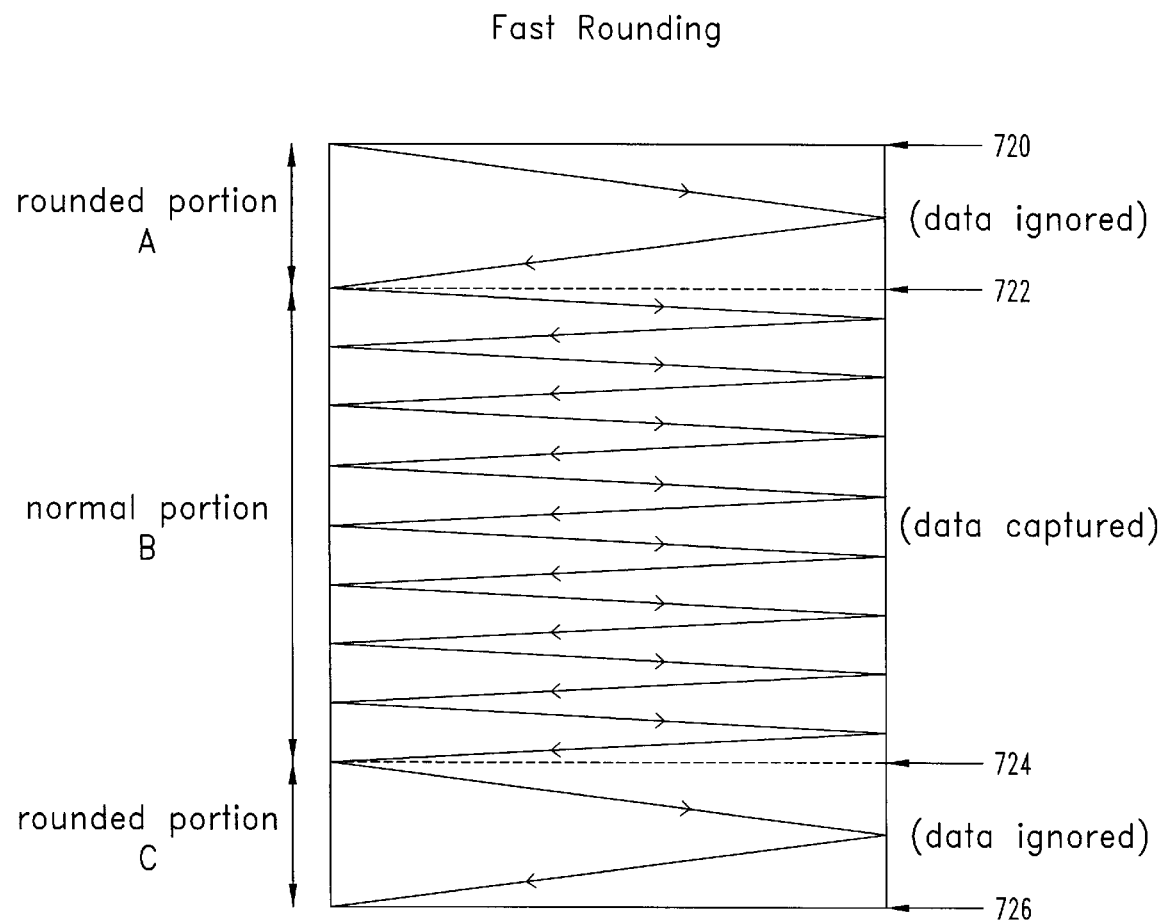
FIG. 36 is a schematic diagram illustrating partitioning of the slow axis scan for a fast rounding operation of the present invention.

Fast rounding can be either symmetric or asymmetric. FIG. 36 shows that the slow axis scan is divided into three regions, labeled A, B, and C and whose boundaries are shown at 720–726. Data is captured for region B only. Each region has a specified physical length and duration of scan. The scan duration can be set so that the fast scan axis completes an integral number of round trips (scan lines) within each section, however this is not an absolute requirement. For the rounded regions (A and C) the scan duration corresponds to a small number of lines (typically 1–4). For the normal region, the scan duration corresponds to a large number of lines (typically 256–512), so that the captured image has sufficient resolution. When the physical lengths of regions A and C differ the rounding is asymmetric.

Figure 37:
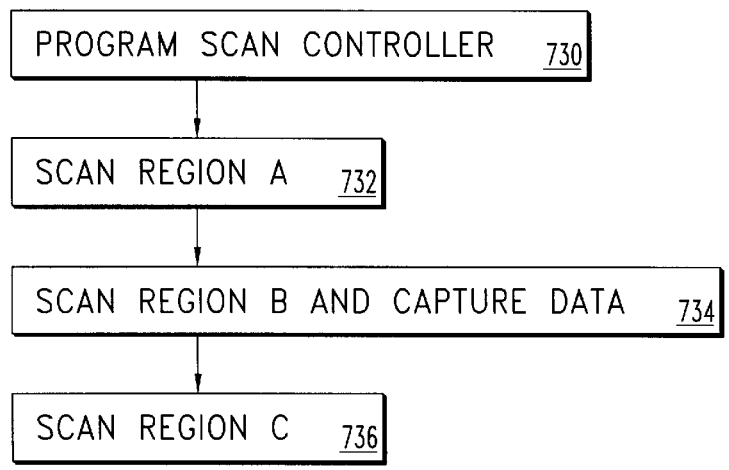
FIG. 37 is a schematic process diagram illustrating a process for fast rounding.

For simplicity, the fast rounding process for a downward-scanned frame is described hereinbelow; analogous steps are used for upward-scanned frames. Referring to FIG. 37, at step 730, the scan controller is programmed with the physical length and scan duration at each region. At step 732, the probe scans region A according to the designated program. At step 734, region B is scanned and the data are captured. At step 736, region C, if specified, is scanned. The process of steps 730 to 736 can then be repeated (in analogous form) for the next (upward) frame.

Instead of using the rounding method described above, we may instead address the root cause of nonlinearity at the start of scan, which is that the voltage increments are not accurate (usually, not large enough). The voltage drive function should therefore be modified accordingly. Two methods to do this are described hereinbelow, the first of which uses an explicit formula for the drive function and the second of which does not. Both of these methods can be applied to both the fast and slow axes of the scanner.

A first method for producing a more accurate voltage drive function is an improvement of the method described by Elings et al (U.S. Pat. No. 5,051,646). Elings et al. describe a drive function consisting of a constant plus a sum of exponential terms. The present invention provides a specific improvement to the Elings et al. function wherein the drive function should be of the form:

$$\text{Drive} = (dV/dt) = D + E^* \exp(-F^*x) + G^* \exp(-H^*x)$$

where it is required that H>2*F and H<50*F. These bounds are set on H in order to stabilize the nonlinear curve fitting process. The values of D, E, and G must also satisfy the normalization requirements for V(t), which were described above in connection with FIG. 15 and the second fine tuning method. This form of the drive function could be used for both the fast and slow scan axes.

Figure 38:
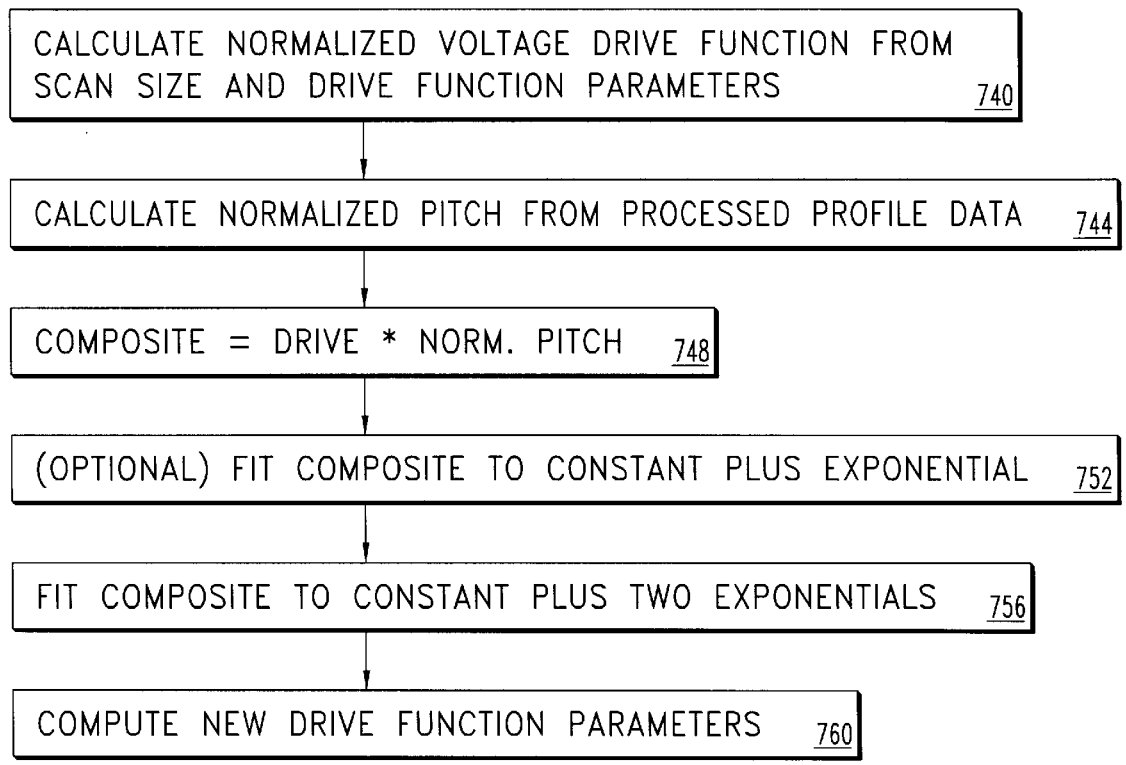
FIG. 38 is a schematic process diagram illustrating a process for producing a more accurate voltage drive function.

The process of adjusting the parameters of this drive function is somewhat analogous to FIG. 15 and is shown in FIG. 38. At step 740, the normalized voltage drive function is calculated from the current scan size and drive function parameters. The current drive function need not be of the double exponential form. At step 744, the normalized pitch values are calculated from the processed profile data and at step 748, the composite function Composite=Drive*Norm. Pitch is calculated. It is well-known in the art of iterative nonlinear curve fitting that unstable or unrealistic fit results are found more frequently when the fitting function has more fitting parameters. Furthermore, the choice of parameter starting values may also affect the outcome. A double exponential form is generally more troublesome than a single exponential form. In order to avoid trouble, the present invention proceeds as follows. If the current drive function was a constant or a constant plus a single exponential, then at step 752, the composite function is optionally fitted to a constant plus exponential (as in step 230). At step 756, the composite function is fitted to a constant plus two exponentials. If step 752 was performed, the values found for parameters D, E, and F should then be used as the starting values for the corresponding parameters at step 756, and the starting value for parameter H should be within the bounds specified above. If the current drive function was a constant plus two exponentials, then the current drive parameters should be used to compute the starting values for all the fitting parameters. At step 760, the new drive function parameters are computed.

Figure 39:
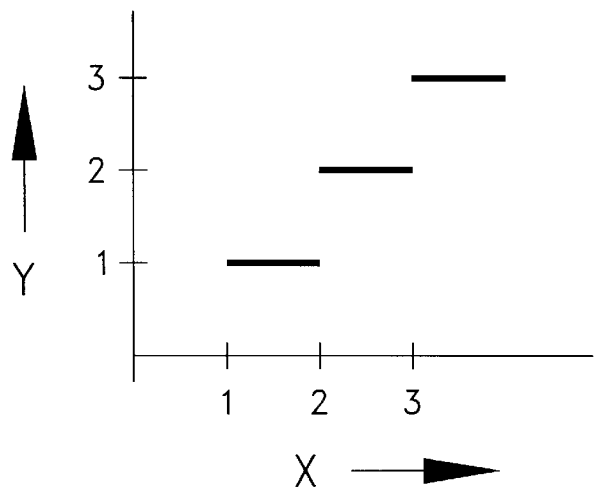
FIG. 39 is a graph illustrating a piecewise continuous approximation of the function Y=X.

A second method for producing a more accurate voltage drive function will now be described. Heretofore, we have expressed the drive function as a mathematically continuous function which is specified by an explicit formula containing a finite (typically just a few) number of parameters. In that case, the accuracy of the drive function depends on how well the functional form and parameters can model the actual behavior of the scanner. In this second method, we express the drive function numerically, as a one-dimensional array (table) of numbers. Such an array is a discrete function as well as being a piecewise continuous approximation to a continuous function. For example, the step function shown in FIG. 39 is a piecewise continuous approximation to y=x. The term piecewise continuous approximation (PCA) will be used herein to refer to these arrays. It will become evident from the discussion below that the PCA approach has the following advantages:

it is more flexible than a method which requires an explicit choice of function form;

despite its flexibility, the process for determining the PCA is stable, well-defined and straightforward.

In the following, for clarity, the process for treating one axis by itself is presented. In fact, two such arrays would be defined for a given scan size, one for the fast scan direction and one for the slow. This is analogous to the need for two sets of drive function parameters (fast and slow) in the case of the first method. The generalization to both axes and to treatment of cross-coupling is obvious in the light of remarks above where it was shown how to use explicitly formulas for those cases (e.g. see FIG. 29).

Hereinabove, a "second fine tuning method" was described with reference to FIG. 15. In that section, a normalized drive function $$\text{Drive} = (dV/dt)$$

was described as a continuous function expressed by an explicit formula. We now speak of an analogous, discrete function, the drive array D, whose N elements are [$D_1$, $D_2$, ... $D_N$]. Each value $D_i$ is a dimensionless number which gives the relative size of the voltage increment used during the i-th portion (time slice) of the scan (the normalized voltage increment needed to move from pixel to pixel). The time scale, being normalized, is also dimensionless. This dimensionless description of scanner actuation collapses the magnitudes of time and drive variations into a more limited range (0 to 1 for time, typically 0.5 to 2 for drive). Nevertheless it preserves the essential shape of the drive function. This enables us to perceive more easily the similarities and differences that may exist between a 1 volt scan whose duration is 0.1 seconds and a 400 volt scan whose duration is 3 seconds. In order to become comfortable with the dimensionless description, consider the following normalization requirements:

For the continuous drive function, we have $$\int_0^1 (dV/dt)dt = 1$$

For the discrete drive function, we have $$\frac{1}{N} \sum_1^N D_i = 1$$

Finally, the normalized time and voltage increments are converted into actual values as follows:

Actual $\Delta t$=(Scan Time/N)

Figure 40:
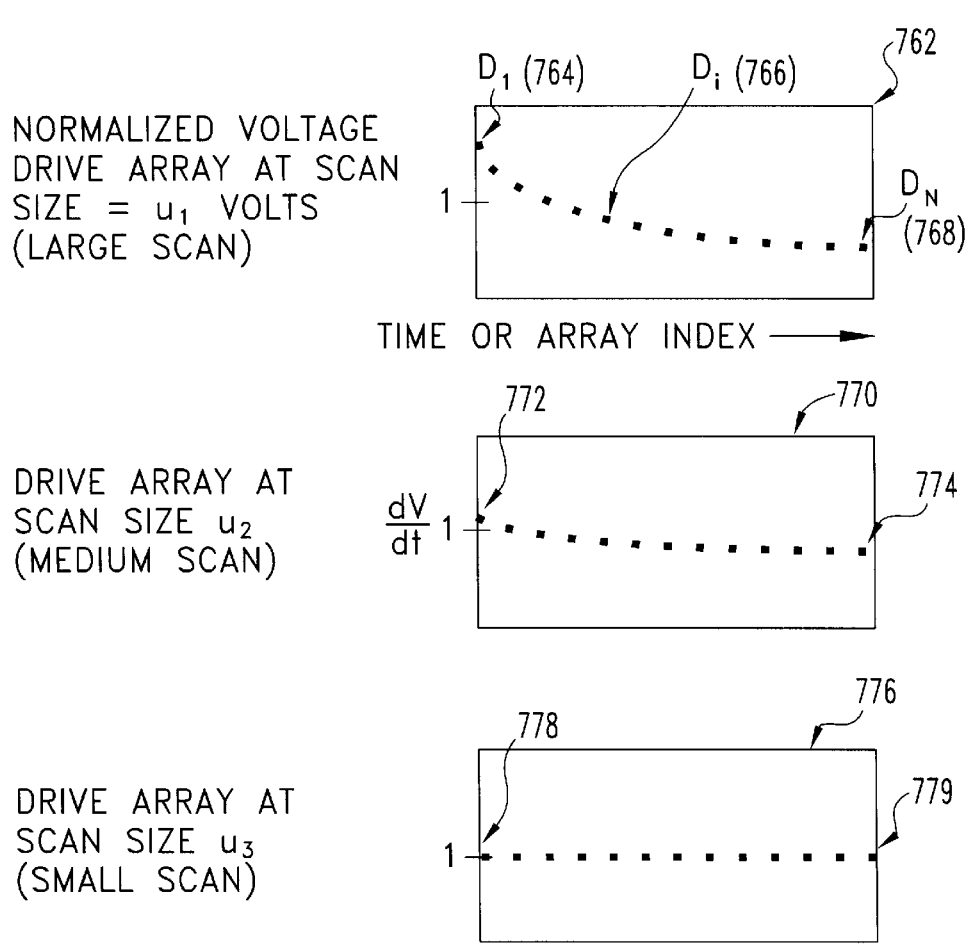
FIG. 40 schematically illustrates graphs of a normalized voltage drive array at three scan sizes.

Actual $\Delta V_i$=(Scan Size/N)*$D_i$ where Scan Time and Scan Size now have dimensions, such as seconds and volts, respectively. The conversion formulas show the $D_i$ is the relative size of the voltage increment during a given portion of the scan. We can compare $D_i$ to voltage increments earlier or later in the same scan and we can compare it to the voltage increment at the corresponding (normalized) time point in scans of other sizes. The structure of one such array is shown at 762 in FIG. 40. If the microscope controller uses N voltage increments to program the scan, then the array contains N elements and the array index corresponds to time. One would typically expect to have at least as many elements in the drive array as pixels per line in the scanned image. The first, i-th and N-th elements of the array, $D_1$, $D_i$, and $D_N$, are show at 764, 766 and 768, respectively.

Figure 41:
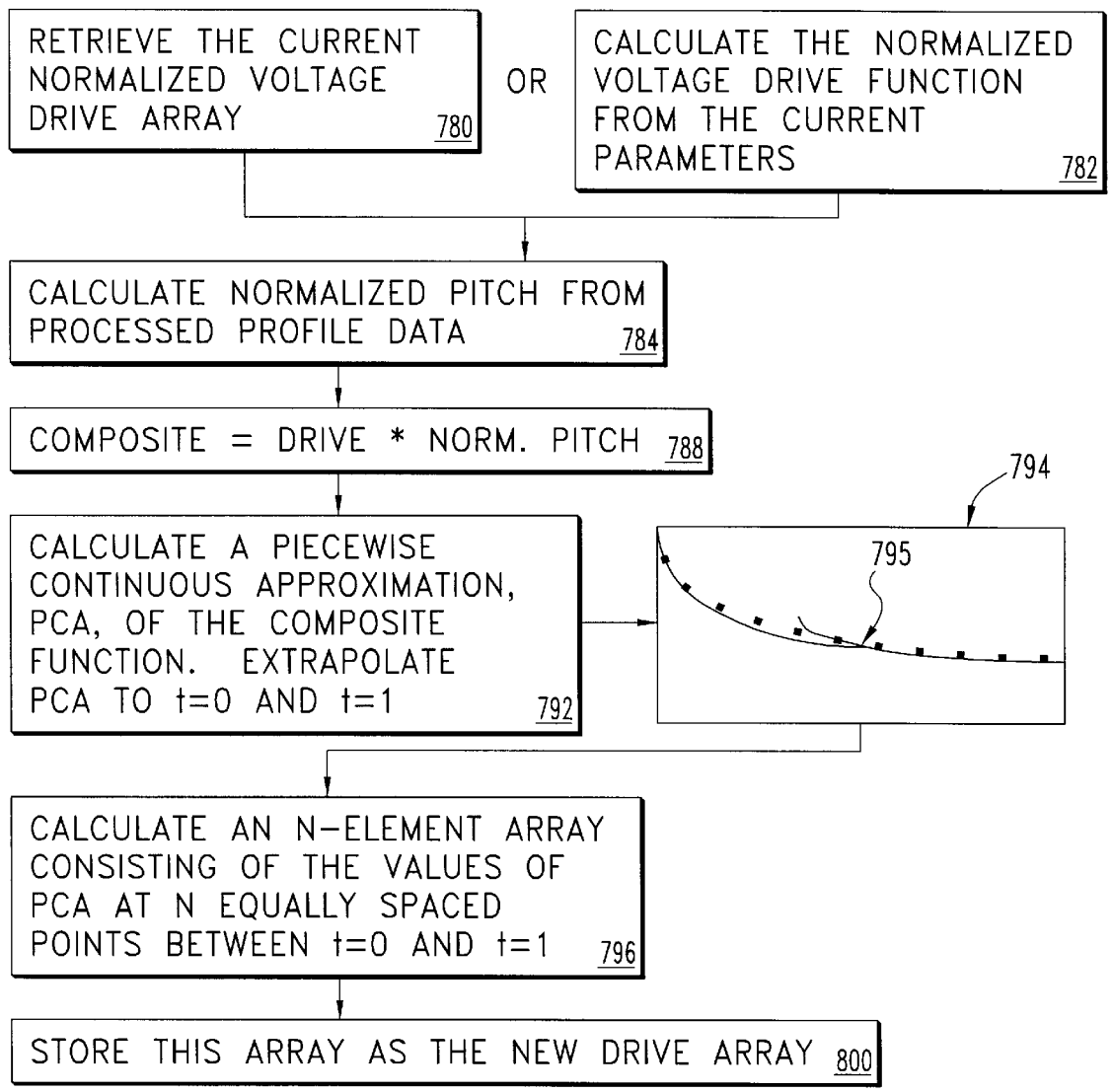
FIG. 41 is a schematic process diagram illustrating a process for producing a more accurate voltage drive function using piecewise continuous approximation.

The array elements at one scan size are computed by an iterative process which is analogous to the second fine tuning method described above with reference to steps 218–236 in FIG. 15. The essential steps in one iteration are shown in FIG. 41. At step 780, the current normalized voltage drive array is retrieved. Alternatively, if Drive was defined as an explicit function, the normalized voltage drive function is calculated from the current parameters at step 782. At step 784, the normalized pitch values are calculated from the processed profile data. At step 788, the composite function:

Composite=Drive*Norm.Pitch is computed. At step 792, a piecewise continuous approximation, PCA, of the composite function is calculated and extrapolated to t=0 and t=1. The PCA is shown at 794. A variety of methods are well-known for approximating discrete data points in a piecewise-continuous manner. The include (but are not limited to):

- defining a straight line between each successive pair of points;
- fitting subarrays separately to polynomial functions (the subarrays may overlap); and
- applying a smoothing algorithm.

For example, one of these methods could be fitting the first and second halves of the entire array to 3rd-order polynomials, and then joining the fit functions at their point of intersection (794) near the middle of the original array. It is noted that a least squares fit to a polynomial can be calculated by a definite set of formulas in a non-iterative process. Such a process is straightforward and stable.

At step 796, an N-element array is calculated consisting of the values of PCA at N equally spaced points between t=0 and t=1. At step 800, this array is stored as the new Drive array.

By representing the Drive function as a numerical array we achieve the following advantages:

- the drive function can more accurately match the characteristics of the scanner, since it is not restricted to a specific functional form; and
- the calculation of PCA is more reliable than an iterative nonlinear curve fitting process.

The above discussion describes a process for obtaining a numerical drive array at a single scan size. A process analogous to steps 388–420 of FIG. 25 can be used to obtain drive arrays for arbitrary scan sizes. Here are some of the differences and similarities: Whereas FIG. 25 refers to the parameters of calibrated length scales for different scan sizes, here we refer to the elements (array values) of normalized drive arrays for different scan sizes. Whereas the process of FIG. 25 treated each parameter as a function of scan size, here we treat each array element as a function of scan size. Whereas FIG. 25 was illustrated with 4 parameters (a,b,c,d), here we use a large number of array elements (e.g. 512).

Figure 42:
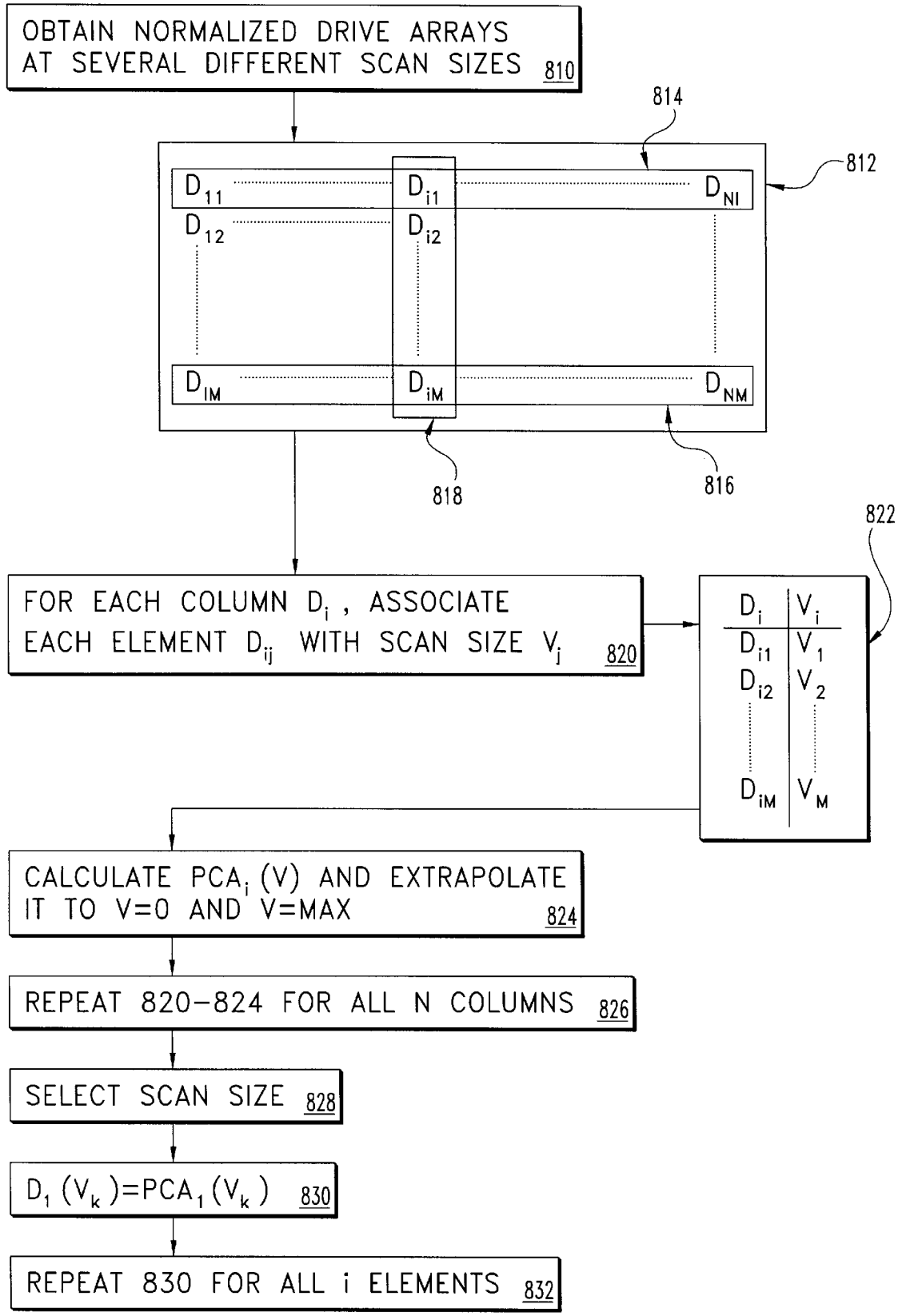
FIG. 42 is a schematic process diagram illustrating a process for linearizing any scan within the range of the scanner using piecewise continuous approximation.
Figure 43:
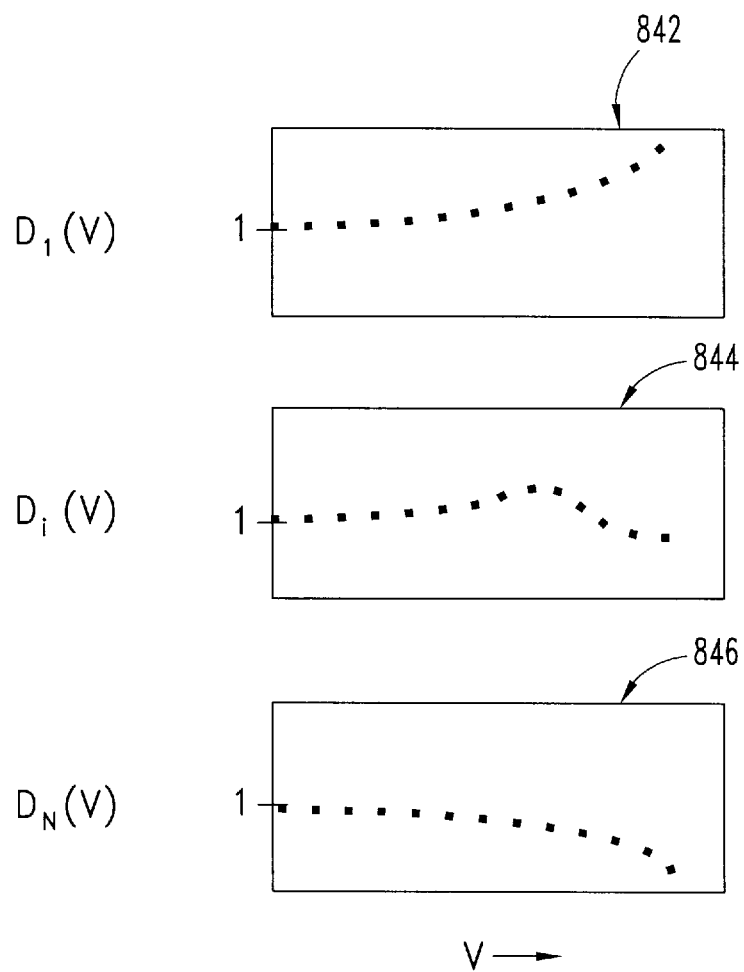
FIG. 43 illustrates several graphs of the normalized voltage increment v. voltage for three different scan sizes.

At step 810 of FIG. 42, the N-element normalized drive arrays are obtained at M different scan sizes (voltages) using the process of FIG. 41. Three such arrays, at scan sizes U1, U2 and U3, are shown schematically as graphs at 762. 770, and 776 in FIG. 40. These one-dimensional arrays are gathered together to form a single two-dimensional array, D, which has dimensions N columns×M rows. This is show at 812. In this new array, each row is the drive array at a given scan size. The rows may be sorted so that row 1 is the largest scan size and row M is the smallest. For example, the drive array at the first scan size is show at 814 and the drive array at the M-th scan size is shown at 816. The element $D_{ij}$ is the normalized voltage increment at the i-th time slice of the j-th scan size. In order to compute drive arrays at arbitrary scan sizes, we need to consider each time slice as a unit. For example, we can select the M elements found in the i-th column. This column (shown at 818) is a one-dimensional array. We will treat its elements as the values of a function $D_i(V)$ which describes the effect of scan size V on the i-th normalized voltage increment. To make the functional dependence apparent, we continue as follows. At step 820, each element $D_{ij}$ of the i-th column is associated with its scan size $V_j$, as shown at 822. A graphical representation of the data from several columns is shown at 842–846 in FIG. 43. At step 824, the piecewise continuous approximation to $D_i(V)$, $PCA_i(V)$, is calculated and extrapolated to V=0 and V=the maximum scanner voltage. At step 826, steps 820–824 are repeated until all N columns have been processed. Steps 828, the scan size $V_k$ is selected. At step 830, the first value of the drive array $D_i(V_k)$ is obtained by retrieving the value $PCA_1(V_k)$. At step 832, this retrieval process is repeated for all i elements of the drive array. This drive array can then be used to program the scanner.

Two distinct approaches for obtaining scanner drive functions have been described hereinabove. One approach (e.g. FIG. 15) is model-dependent: definite models and explicit formulas are employed. The same function is used for all scan sizes, but the parameters of the function may vary with scan size. In order to derive drive functions at arbitrary scan sizes, each parameter's variation with scan size is also modeled with an explicit formula. A second approach (e.g. FIG. 41) is model-independent: the drive function at a given scan size is expressed as a numerical array, using a piecewise continuous approximation to observed data. Corresponding array elements vary with scan size. This variation is in turn expressed as a numerical array, allowing one to determine the appropriate array element at that time slice for a scan of arbitrary size. We now outline two hybrid approaches. A third approach uses a model and formula for the drive function at each scan size, but uses a numerical array to express the variation of parameters with scan size. A fourth approach uses the model-independent numerical array for the drive function, but uses models and explicit formulas to capture the variation of array elements with scan size. It is noted that approaches 1, 3 and 4 are related to approach 2 in the sense that the calculation of a piecewise continuous approximation could proceed using the steps of:

- selecting an explicit model formula
- fitting the data to the model, using the entire array as one piece
- calculating predicted model values at equal intervals of the independent variable in order to fill the PCA array.

Figure 49:
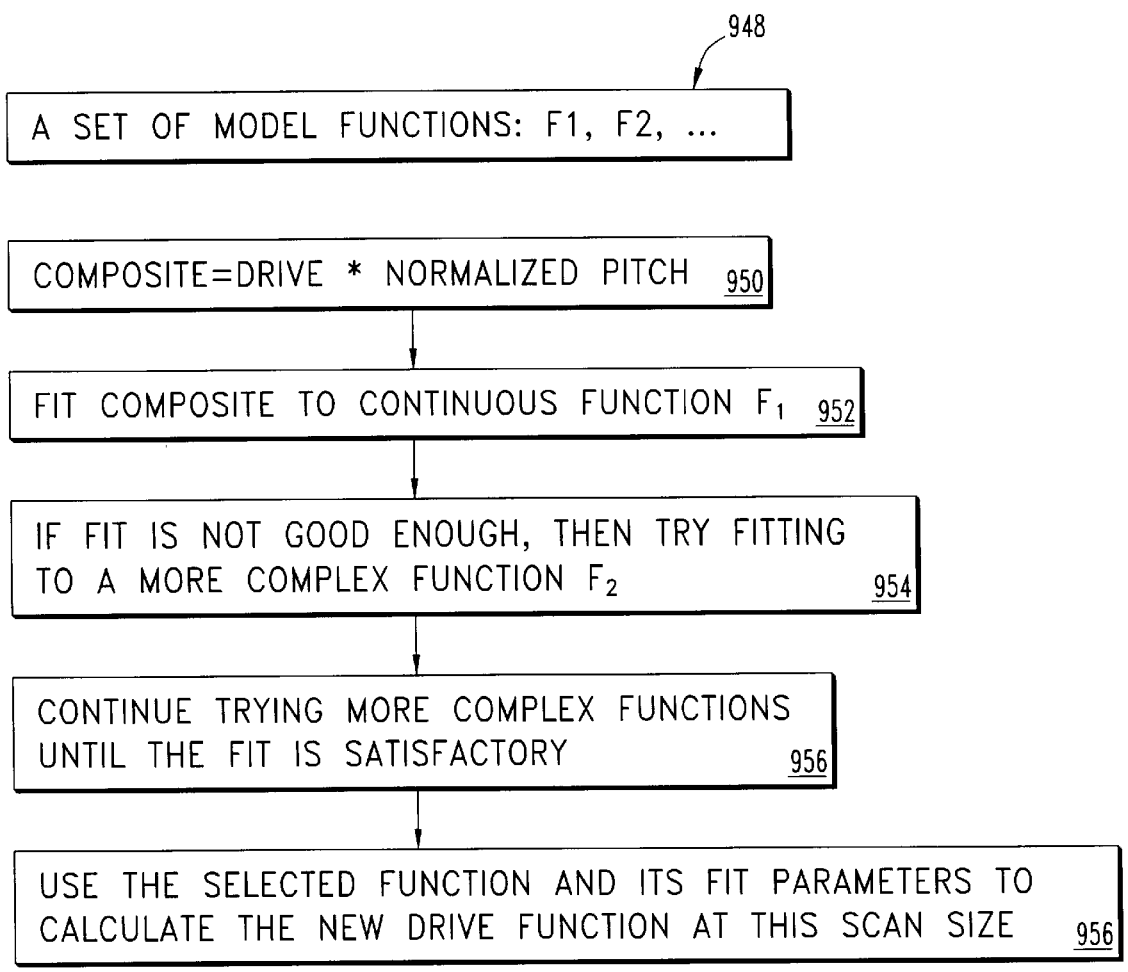
FIGS. 49–51 are schematic process diagrams illustrating a process for linearizing any scan within the range of the scanner using different model functions for different scan sizes.

A fifth approach is model-dependent, but has more flexibility than approach 1. We have observed experimentally that the drive function for a small scan may be modeled accurately by a simple expression, such as constant plus exponential, whereas the drive function needed for a large scan may require a more complex expression. Whereas approach 1 uses the same model function for all scan sizes, the fifth approach selects different model functions as needed. As before, the process is divided into the steps of finding drive functions at one scan size, several scan sizes and for all arbitrary scan sizes. Referring now to FIG. 49 a set of model functions is shown at item 948. For example, a set of two functions might be used:

$F_1$=constant+exponential (for small scans)

and $F_2$=constant+two exponentials (for large scans).

One of the experimental objectives is to determine the voltage at which one changes from one function to the other.

Not shown in FIG. 49 are the usual steps of the present invention of selecting a scan size, capturing an image, calculating the normalized pitch values, and retrieving the drive function. Step 950 corresponds to steps 226 or 788. At step 952, the composite is fit to continuous function $F_1$, At step 954, if the fit is not good enough, the composite is fit to a more complex continuous function $F_2$. At step 954, more complex functions are tried in succession until the fit is satisfactory. At step 958, the selected function and its fit parameters are used to calculate the new drive function at this scan size. As is the case with all the other improved drive functions described herein, this function can be iteratively improved (step 176) before proceeding to the global fit of parameters as a function of scan size. This fine tuning step is not repeated.

Figure 50:
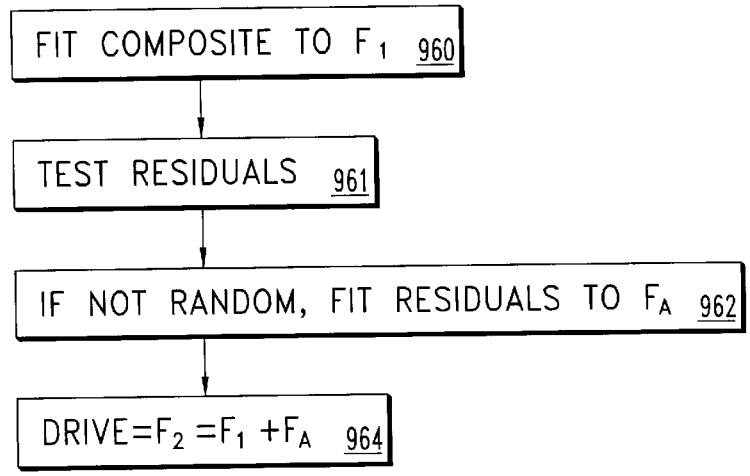

FIG. 50 shows a specific method of selecting and using a set of model functions. Let $F_1$ be a simple form, e.g. constant plus exponential. At step 960, the composite is fitted to $F_1$. At step 961, the residuals of the fit are tested for randomness. A number of appropriate tests are described in the statistics literature. One such test is called the "runs" test and examines sequences of residuals having the same sign. If the residuals are random, then the fit is good and $F_1$ will be used as the new drive function. At step 962, if the residuals are not random, the residuals are fitted to continuous function $F_A$, which may be a "simple" form such as a polynomial. At step 964, $F_2 = F_1 + F_A$ is used as the new drive function.

Figure 51:
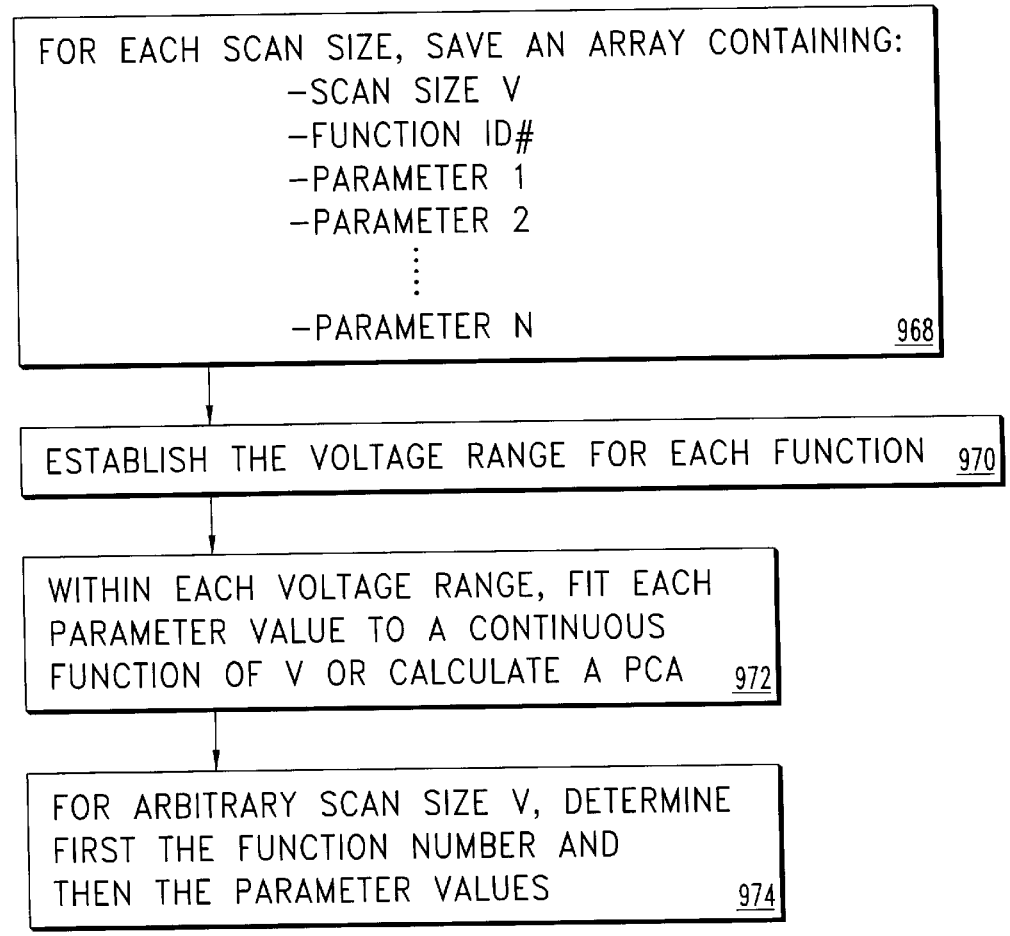

Having optimized the drive functions at several scan sizes, one proceeds to FIG. 51. The results for each scan size are tabulated at step 968 as an array consisting of:

scan size in volts;

function identification number; and the values of the function parameters. At step 970, the voltage range for each identified function is established. For example, suppose that function 1 was selected for several scan sizes in the range 20 to 100 V and that function 2 was selected for scan sizes in the range 150 to 440 V (the maximum scan size). Then the range for function 1 is extended down to 0 V (the minimum scan size) and up to 125 V (the midpoint between two scan sizes where actual data was obtained). Similarly, the range for function 2 would be 125 to 440V. At step 972, each voltage range is considered separately. Within each range, the values of each parameter are fitted to a continuous function of scan size V or a piecewise continuous approximation is calculated. One can now determine the drive function for arbitrary scan sizes. At step 974, given the scan size V, the function number is first determined and then the parameter values are determined.

In the foregoing specification, we have described processes for improving the scan linearity. Once this has been accomplished, it is worthwhile to improve the accuracy of mean sensitivity at a given scan size. Hereinbelow a process for fine tuning the realtime sensitivity calibration of each horizontal axis of an open-loop scanner is presented, for all scan sizes. The slight process modifications needed for a closed-loop scanner would be obvious, by combining information presented above for linearizing closed-loop scanners with the information presented hereinbelow.

In one type of prior art open-loop scanning probe microscope, the sensitivity of each horizontal scan axis is linearly derated for scan size, as depicted in FIG. 19. In addition, a correction is made for scan rate: slower scans have higher sensitivity. For simplicity, we consider here a set of scans captured at different sizes but all at the same rate, e.g. 2 lines/sec or 2 Hz. The method described below can easily be extended to accommodate the more complex model incorporating scan rate dependence. For simplicity, we present the process for one horizontal axis.

Figure 44:
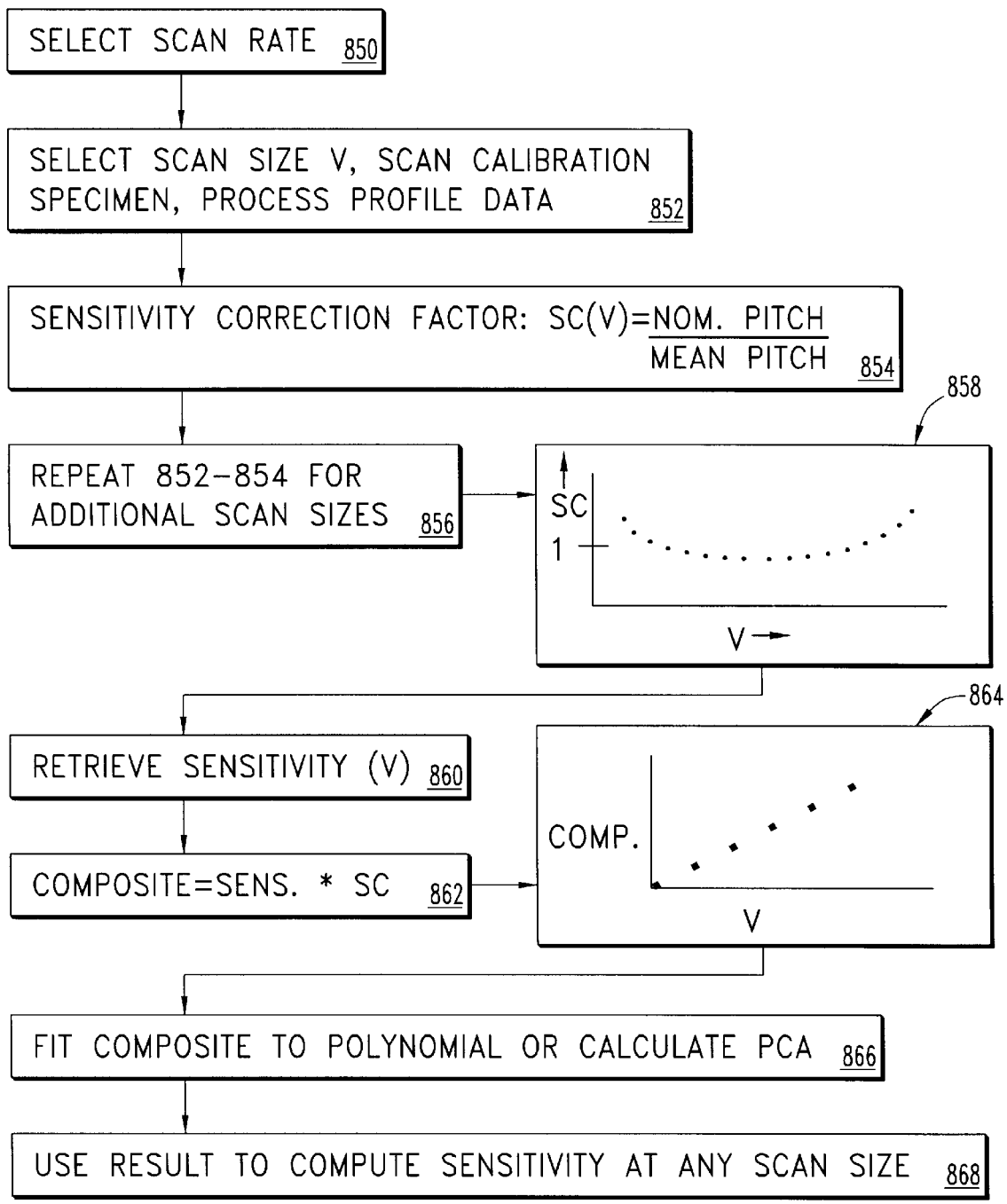
FIG. 44 is a schematic process diagram illustrating a process for fine tuning the realtime sensitivity calibration in an open-loop scanner.

At step 850 of FIG. 44, the scan rate is selected. This will be used for all scan sizes. At step 852, the scan size is selected (in volts), the calibration specimen is scanned and profile data are processed, as was done in steps 160–172 of FIG. 12. At step 854, the mean observed pitch is calculated and a sensitivity correction factor, $SC(v)$ is computed as:

$$SC(V) = \text{Nominal pitch/Mean Pitch.}$$

This expression can be justified qualitatively as follows: when the mean observed pitch is less than the nominal (stated) pitch of the calibration specimen, then the scanner sensitivity is higher than expected.

At step 856, scanning and calculation of the sensitivity correction factor is repeated for additional scan sizes, resulting in an array of SC values as a function of scan voltage. This array is shown graphically at 858. In general, one expects to see modest deviations from 1.0.

At step 860, we retrieve the current sensitivity array or calculate values from the current sensitivity parameters. At step 862, a composite function is calculated as:

$$\text{Composite}(V) = \text{Sens.}(V) * SC(V)$$

This is shown at 864. At 866, the composite function is fit to an explicit functional form, such as polynomial, or a piecewise continuous approximation (PCA) is computed and extrapolated to V=0 and to V=max. At step 868, the result is used to compute the scanner sensitivity at any scan size.

It is apparent that the PCA treatment here is mathematically the same as that used for just one of the columns in the drive voltage array involved in scan linearization (FIG. 42). Therefore, the extension of the sensitivity calculation to the case of multiple scan rates could be accomplished with a two-dimensional array having a data structure analogous to the drive voltage array, where now the additional columns contain sensitivity arrays at different scan rates.

With reference to FIGS. 27, 34 and 35, several processes were presented for checking Z axis linearity. Here we present two additional processes. In the first of these, the generation of the reference profile is omitted. We proceed as follows:

the grating is mounted on a wedged specimen holder;

the grating is scanned in order to generate a two-dimensional calibration array;

a one-dimensional wedge profile is generated by calculating an average cross-section of the calibration data array;

peaks are detected in the wedge profile;

a one-dimensional $Z_{wedge}$ array is generated, containing height values, each value derived from a sub-array of consecutive data points within each peak in the wedge profile; and the difference in height between successive elements in the Z wedge array is calculated.

Figure 45:
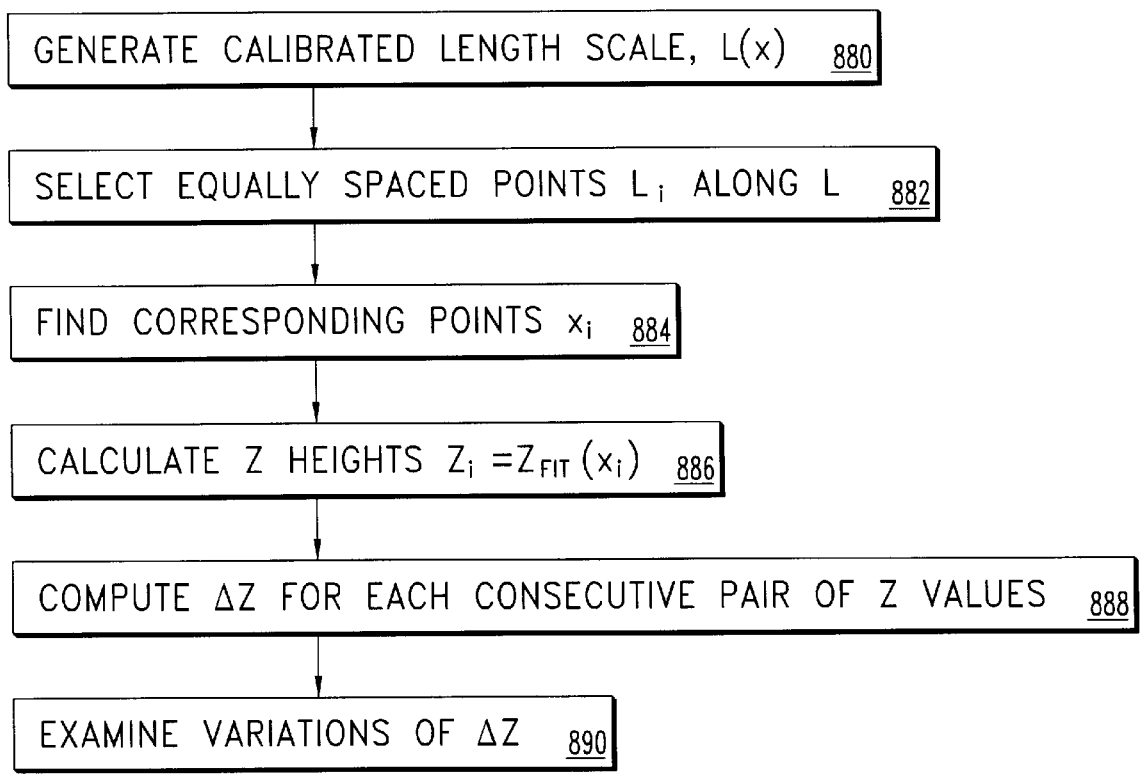
FIG. 45 is a schematic process diagram illustrating a process for checking Z-axis linearity of a scanning probe microscope.

In the second of these additional processes, we break the linkage of Z height differences to the actual peak locations. The peak locations are now used to derive the calibrated length scale. Equally spaced points are then designated on the calibrated length scale and Z heights are found at the corresponding locations on the fitted profile. The first steps of this process are identical to steps 590–610 of FIG. 34, and produce a fitted wedge profile $Z_{fit}(x)$ as well as peak centroid locations from the reference profile. The subsequent steps are shown in FIG. 45. Continuing at step 880, a calibrated length scale $L(x)$ is generated from the peak centroid locations using the process of steps 144–152 of FIG. 11. At step 882, a set of equally spaced points $L_i$ is chosen, that is $L_{i+1}-L_i=$ a constant. At step 884, corresponding values $X_i$ on the uncorrected length scale X are found, such that $L_i=L(X_i)$. At step 886, Z heights are calculated as:

$$Z_i=Z_{fit}(X_i)$$

At step 888, $\Delta Z$ values are computed for each consecutive pair of Z values and at step 890, the variations of $\Delta Z$ values are examined.

The advantage of this process compared with the process of FIG. 34 is that here the variations are smoother, since they lack the noise in Z that correlates with variability (noise) in the peak centroid locations.

Figure 46:
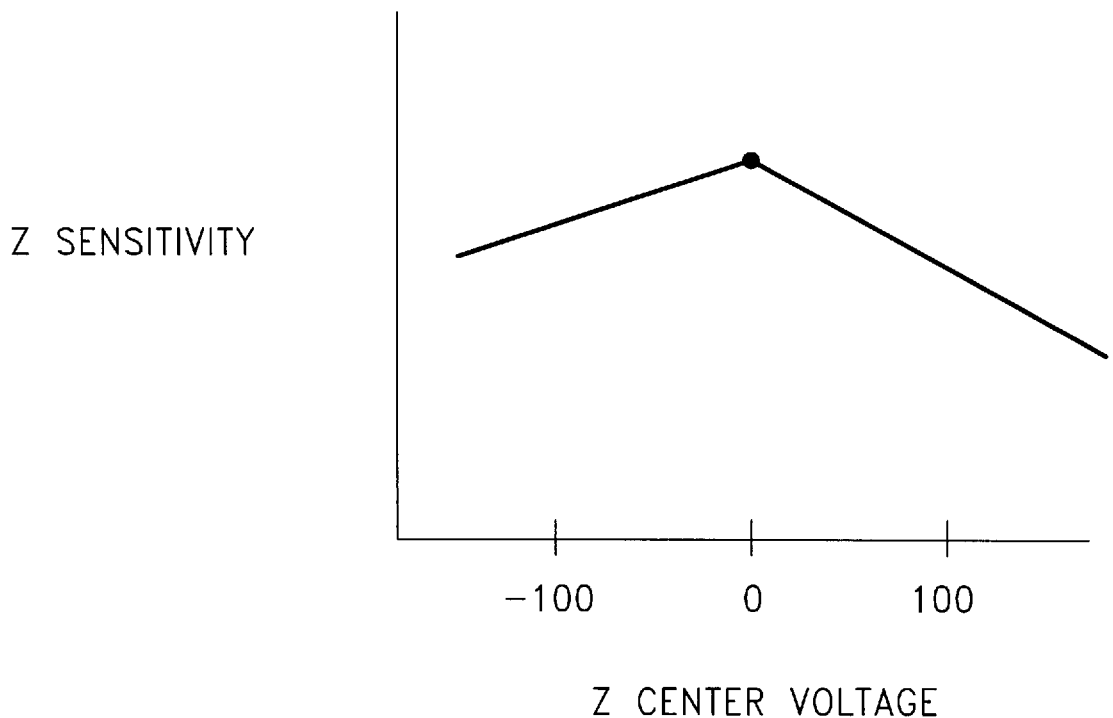
FIG. 46 is a prior art graph of Z-axis sensitivity v. Z-axis center voltage.

Several processes have been presented hereinabove which check the linearity of the Z axis. The processes work equally well for open-loop and closed-loop scanners. We now present a process for adjusting the Z axis calibrated sensitivity of an open-loop scanner and for improving its linearity. In an open-loop scanner, the primary measure of Z axis probe position is the voltage applied to the Z scanner. In one type of prior art scanning probe microscope, it is observed that the Z sensitivity (dZ/dV) depends on the DC level of voltage ("Z center voltage") applied to the Z axis piezo. The standard procedure for calibrating sensitivity and sensitivity derating in that prior art microscope is to record three images of a calibration specimen containing a step of known height (step specimen). One image is recorded at Z center voltage= 0V, one is recorded at −100V, and one is recorded at +100V. The data are used to derive a sensitivity plot like that shown in FIG. 46. Note that the derating (slope) is allowed to be different for positive and negative voltages. We have found experimentally that a more complex model is necessary. For example, Z sensitivity can more accurately be expressed as a polynomial function of Z center voltage, where the voltage of maximum (or minimum) sensitivity is not constrained to be any particular value.

The calibration process uses a staircase specimen, such as the grating mounted on a wedge shown at 592 in FIG. 34. If the wedge angle is known, the $\Delta Z$ value from peak to peak in the wedge profile can be calculated from:

$$\Delta Z_{cal}=\text{grating period}*\sin(\text{wedge angle})$$

In the first case, with a known $\Delta Z_{cal}$, the entire calibration can be carried out using the staircase specimen. In the second case, if the wedge angle is not known, a step specimen should be used to establish the sensitivity at one value of Z center voltage and then the staircase specimen can be used to establish the relative sensitivities at other voltages. For simplicity, we present the first case only. Modifications needed for the second case are then obvious.

Figure 47:
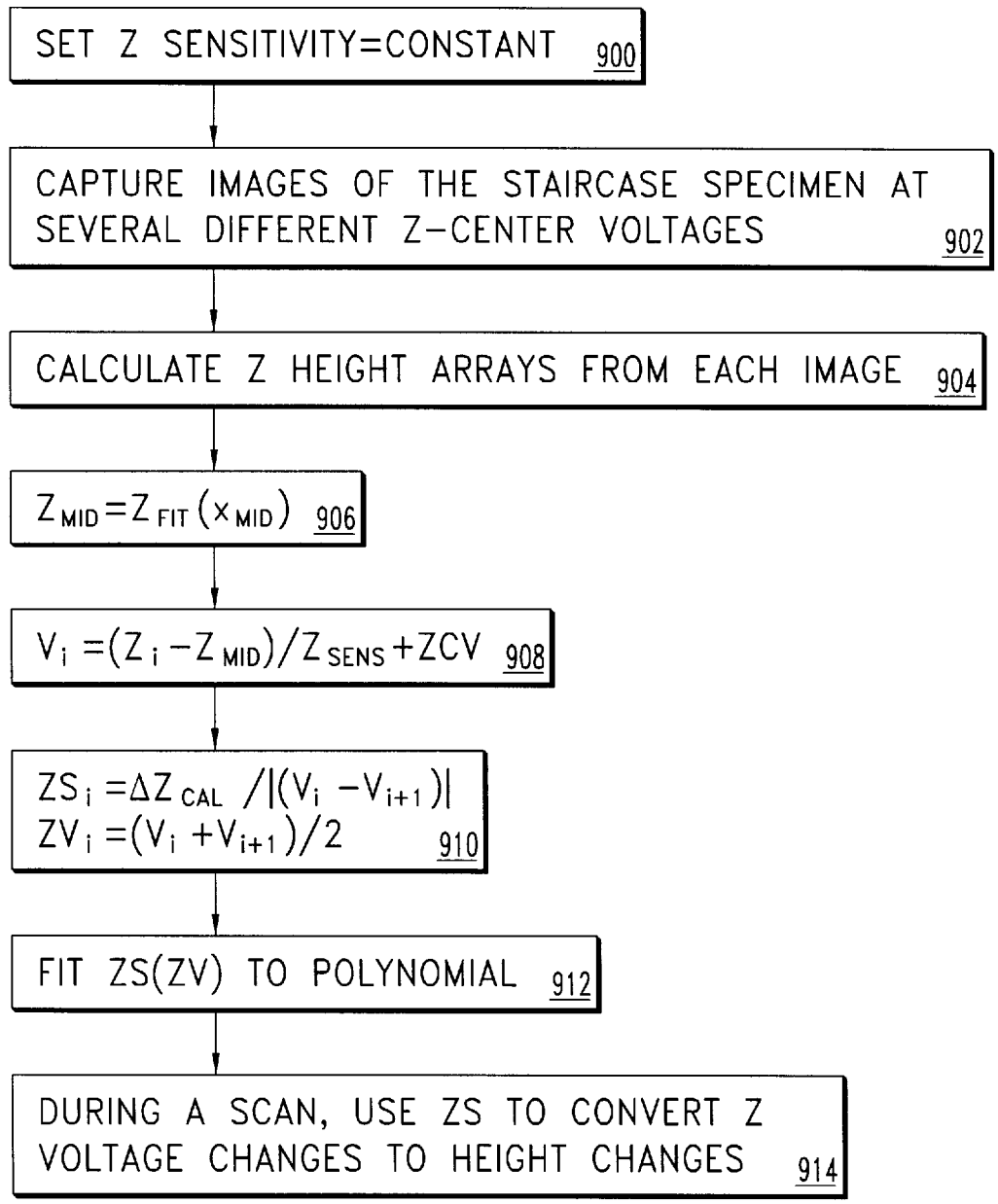
FIG. 47 is a schematic process diagram illustrating a process for adjusting the Z-axis calibrated sensitivity of a scanning probe microscope.

The Z calibration process is shown in FIG. 47. At step 900, the Z sensitivity of the scanner is set to a constant, i.e. all deratings are set to zero. At step 902, images of the staircase specimen are captured at several different Z center voltages and the Z center voltage for each image is noted. The Z center voltage can be varied, for example, by using the coarse Z adjustment (e.g. a mechanical translation) which is built into the scanning probe microscope. At step 904, Z height arrays are calculated from the wedge profile derived from each image, using the process of steps 596–614 of FIG. 34, or one of the other processes described above. Note that each Z array is tabulated as a function of X. We now wish to express Z as an explicit function of Z voltage. At step 906, the Z height at the middle of the image is calculated as:

$$Z_{mid}=Z_{fit}(X_{mid})$$

where $X_{mid}$ is the midpoint of the X scan and $Z_{fit}$ is the function used at step 612. At step 908, the Z voltage, $V_i$, for each point in the Z height array is calculated as $$V_i=(Z_i-Z_{mid})/Z_{sens}+ZCV$$

where $Z_{sens}$ is the sensitivity (dZ/dV) used when the image was captured; and ZCV is the Z center voltage of the image.

At step 910, Z sensitivity values $ZS_i$ are calculated as a function of Z voltage:

$$ZS_i=\Delta Z_{cal}/abs(V_i-V_{i+1})$$

$$ZV_i=(V_i+V_{i+1})/2$$

where abs is the absolute value function and $ZV_i$ is the midpoint voltage between features. The ZS data from several images can be combined to make a global assessment of Z sensitivity. At step 912, ZS(ZV) is fitted to a continuous function, such as a polynomial of order n, and extrapolated to the minimum and maximum Z voltages, e.g. −220 and +220V. At step 914, the fitted Z sensitivity ($ZS_{fit}$) is used during a scan to convert Z voltage changes to height changes. When the scanning probe instrument is operated, the Z voltage is altered incrementally to track surface height variations from spot to spot. The incremental change in voltage is converted to an incremental change in height using the formula $$\Delta height=\Delta voltage*ZSfit$$

Typically, these height values are accumulated and stored in the computer's memory in order to create an image that can be displayed to the user. Alternatively, the $ZS_{fit}$ function can be integrated with respect to voltage, yielding a calibrated length scale for Z height in terms of Z voltage. This calibrated length scale can then be used to directly interpret Z voltage as Z position. Unfortunately, in an open-loop scanner, this alternative approach could be inaccurate due to hysteresis effects.

Figure 48:
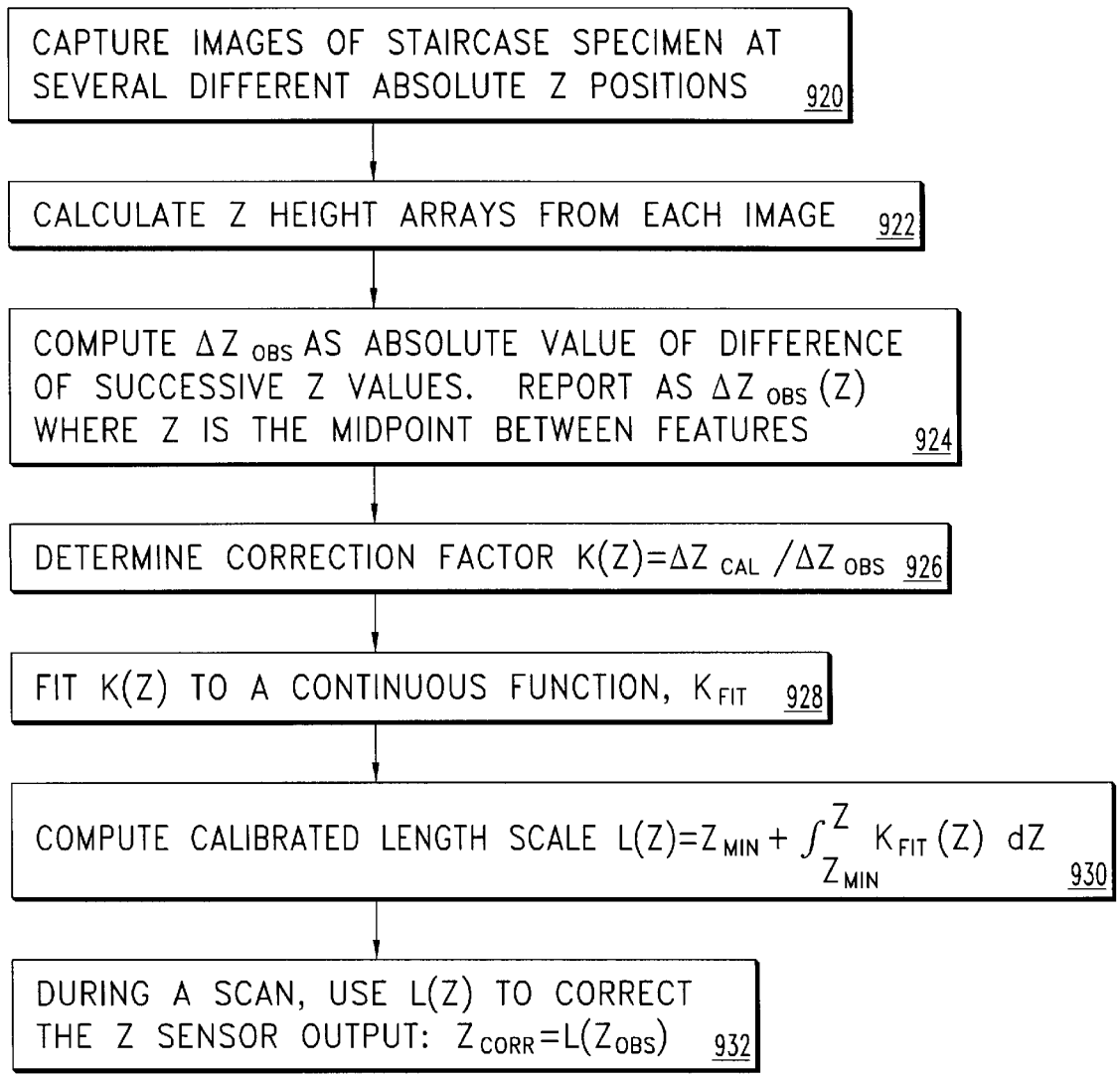
FIG. 48 is a schematic process diagram illustrating a process for fine tuning the realtime sensitivity calibration in an open-loop scanner using piecewise continuous approximation.

A process for adjusting the Z axis calibrated sensitivity of a closed-loop scanner and for improving its linearity is now presented. In a closed-loop scanner, the primary measure of Z axis probe position is the Z sensor output. In the following discussion, $Z_{obs}$ is the observed Z sensor output after conversion to absolute position of the Z scanner. At step 920 of FIG. 48, images of a staircase specimen are captured at several different absolute Z positions. At step 922, Z height arrays are calculated from each image using the process of steps 596–614 of FIG. 34, or one of the other processes described above. At step 924, $\Delta Z_{obs}$ is calculated as the absolute value of the difference of successive Z values. It is reported as $\Delta Z_{obs}(Z)$ where Z is the midpoint between features. At step 926, the correction factor K(Z) is computed for each point:

$$K(Z)=\Delta Z_{cal}/\Delta Z_{obs}$$

where $\Delta Z_{cal}$ is the known Z increment for each feature on the staircase specimen. At step 928, K(Z) is fitted to a continuous function, $K_{fit}$, such as a third-order polynomial. At step 930, the calibrated length scale is computed:

$$L(Z) = \int\int_{Z_{min}}^{Z_{max}} Z_{min} + K_{fit}(Z) dZ$$

where $Z_{min}$ and $Z_{max}$ are the limits of the Z position. At step 932, L(Z) is used to correct the Z sensor output:

$$Z_{corr} = L(Z_{obs})$$

It may be helpful to note that steps 924–930 are analogous to steps 138–152 of the process described above for deriving a calibrated length scale for a horizontal axis. At step 146, we called K the "differential nonlinearity" and here we call it the "correction factor".

The model-independent approach of calculating a PCA has many additional applications to scanners. For example, as an alternative to steps 912 and 914 described above, one could calculate a piecewise continuous approximation to the data of Z sensitivity as a function of Z voltage and then use that PCA during a scan to convert Z voltage changes to height changes. More generally, any scanner characteristic or sensor output which depends on scan size or position might be approximated in this manner. The model-independent approach is most beneficial when simple models do not give sufficient accuracy.

In the foregoing specification, we have described processes for finding features as "peak" detection processes (e.g. in FIG. 6). Because valleys can be converted to peaks by inverting the data (multiplying by −1), we intend that our peak detection processes also apply to valleys.

In the foregoing specification, we have described processes of calibration and measurement with reference to surface topography or height. However, many other surface characteristics may, in principle, be used for these purposes. Thus, where we have written "topography", one should read "any surface characteristic, such as (without limitation) topography (height), friction, adhesion, stiffness, chemical composition, magnetic field, electric field, index of refraction, optical absorbance, etc."

In the foregoing specification, we have described the construction of a corrected length scale for offline correction of images and measurements and we have described processes for improving the realtime calibration, both with reference to a scanning probe microscope. In such an instrument, a scanner (usually made from a piezoelectric material) precisely positions a sharp probe in order to "read" the surface structure. We now wish to consider a related operation, namely, surface modification or "writing".

Much progress in the field of microelectronics depends on learning to fabricate smaller and smaller devices, even down to the nanometer scale. Scanning probe microscopes have been used to "write" such nanostructures. A variety of techniques for using a probe to modify a surface have been discussed in the literature. These include scratching, applying voltage or thermal pulses to remove, deposit or deform material, and moving objects from one point to another. For example, Eigler and other workers at IBM have demonstrated the placement of individual atoms at desired locations. Those skilled in the art will recognize that there are certain similarities of writing with reading. In both writing and reading, one needs to know accurately the position of the probe relative to the surface in order to correlate that position with the measured surface characteristic (when reading) or with the applied signal used to modify the surface (when writing). What is different is the action of the probe. When reading it is desired that the probe sense surface characteristics without altering them. When writing, it is desired to modify surface characteristics in a controlled way. When a scanning probe instrument is used for writing, it is an obvious requirement that the scan be well calibrated in real time, since once a distorted structure has been written it cannot easily be corrected. Finally, we mention that whereas a microscope might also be used as a writing tool, a writing tool might or might not be used as a microscope. In any case, the written structure can be analyzed in a microscope and the observed feature positions used to measure and correct scan distortions, just as a calibration specimen is used for a microscope.

Therefore, we intend that the processes described above for realtime correction of a scanning probe microscope be regarded as covering the application to a scanning probe writing instrument. The essential idea is the correction of the scanner's motion, which is not dependent on the specific purpose for which the scanner is used.

The foregoing specification has been described in terms of scanning probe devices in which a sharp solid probe is placed in proximity to, or in contact with, a surface. A related type of instrument uses a focused particle beam instead of a solid probe. There are strong analogies between the particle beam and probe instruments. When the particles are electrons, the instrument is called a scanning electron microscope (when used for reading) or an electron beam lithography tool (when used for writing). Instruments such as the MEBES electron beam exposure system are used to write mask patterns used for integrated circuit manufacture. When the particles are ions, the instrument is called a focused ion beam machine and it may be used for both reading surface characteristics (e.g. imaging aluminum grains to determine crystallographic orientation) and for writing surface structure (e.g. to disconnect a portion of an integrated circuit by cutting a 0.5 micron-wide conductive trace or to make a new connection by depositing metal in a new trace). In the particle beam instruments, the signal used for reading the surface is typically the intensity of electrons or ions emitted or scattered by the specimen. This is analogous to the topographic signal used in the scanning probe microscope. In the particle beam instruments, controlling the position of the beam is just as important as it is in the scanning probe instruments. The position of the electron or ion beam is controlled by application of electrical and/or magnetic fields along the particle flight path. These fields in turn are usually controlled by an applied voltage or current. This applied electrical signal is completely analogous to the applied voltage or charge used to control a piezo scanner. The fundamental needs to evaluate distortion and calibration and to correct the realtime scan are the same.

Therefore, we intend that the processes described above for realtime correction of scanning probe instruments be regarded as covering the application to a scanning particle beam instrument.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

We claim:

1. A method for high precision calibration by removing artifacts due to nonlinear motion in a scanning probe microscope, comprising the steps of:

a) scanning a calibration specimen in order to create a calibration data array;

b) mapping the calibration data array into a one-dimensional calibration profile;

c) creating a calibrated length scale by comparing the calibration profile to a known topography of the calibration specimen;

d) scanning a measurement specimen in order to create a measurement data array;

e) applying the calibrated length scale to the measurement data array in order to correct nonlinearities in the measurement data array in at least one direction; and f) displaying the corrected measurement data array to a user.

2. The method of claim 1, wherein:

the calibration data array is a two-dimensional array;

step (b) comprises generating the one-dimensional calibration profile by calculating an average cross-section of the calibration data array; and the measurement data array is a two-dimensional array.

3. The method of claim 2, wherein step (e) comprises:

e.1) generating a one-dimensional measurement profile by calculating an average cross-section of the measurement data array; and e.2) applying the calibrated length scale to the measurement profile in order to correct nonlinearities in the measurement profile.

4. The method of claim 2, wherein step (e) comprises:

e.1) applying the calibrated length scale to every line in the measurement data array; and e.2) using interpolation to reconfigure the measurement data array so that data points in the measurement data array are equally spaced.

5. The method of claim 1, wherein step (c) comprises:

c.1) measuring feature locations in the calibration profile; and c.2) creating a calibrated length scale by comparing the feature locations to known topography of the calibration specimen.

6. The method of claim 5, wherein step (c.1) comprises:

c.1.1) detecting peaks in the calibration profile as regions of consecutive data points which exceed a predetermined threshold value; and c.1.2) determining each feature location as an x-coordinate of a centroid of the peak.

7. The method of claim 3, wherein step (c.1) comprises:

c.1.1) detecting peaks in the calibration profile as regions of consecutive data points which exceed a predetermined baseline threshold value; and c.1.2) determining each feature location by calculating at least one edge position for each peak.

8. The method of claim 7, wherein step (c.1.2) comprises:

c.1.2.1) determining a maximum height for each peak;

c.1.2.2) creating a subarray of the calibration profile for each edge, the subarray defined as data points falling within predetermined upper and lower height thresholds;

c.1.2.3) fitting the subarray data points to a linear function; and c.1.2.4) defining the edge position as an intersection of the linear fit function and a predetermined edge height threshold.

9. The method of claim 1, wherein step (c) comprises:

c.1) measuring feature locations in the calibration profile;

c.2) calculating a pitch value for each consecutive pair of feature locations;

c.3) creating a processed profile comprising the pitch values as a function of position;

c.4) calculating a differential nonlinearity as a function of position comprising a theoretical pitch value divided by the calculated pitch value; and c.5) creating the calibrated length scale as an integral of the differential nonlinearity.

10. The method of claim 1, wherein step (c) comprises:

c.1) detecting peaks in the calibration profile; and c.2) creating a calibrated length scale by comparing the detected peaks to the known topography of the calibration specimen.

11. The method of claim 10, wherein the peaks are regions of consecutive data points in the calibration profile which exceed a predetermined threshold value.

12. A method for realtime open-loop control of a scanning probe microscope, comprising the steps of:

a) performing a coarse adjustment of the microscope by determining a nonlinear voltage drive function which corrects some, but not all, artifacts due to nonlinear motion of the microscope;

b) scanning a calibration specimen in order to create a calibration data array;

c) mapping the calibration data array into a one-dimensional calibration profile;

d) measuring feature locations in the calibration profile;

e) calculating a pitch value for each consecutive pair of feature locations;

f) creating a processed profile comprising the pitch values as a function of position;

g) adjusting the nonlinear voltage drive function to order to reduce any nonlinearities in the processed profile; and h) scanning a measurement specimen in order to create a measurement data array.

13. The method of claim 12, wherein step (g) comprises:

g.1) calculating a normalized voltage drive function from a current scan size of the microscope and the current nonlinear voltage drive function;

g.2) calculating normalized pitch values from the processed profile, wherein each of the normalized pitch values is defined as an observed pitch value divided by a mean of the observed pitch values;

g.3) generating a composite function by multiplying the normalized voltage drive function by the normalized pitch values;

g.4) calculating a piecewise continuous approximation (PCA) of the composite function; and g.5) calculating a new nonlinear voltage drive function as an N-element array consisting of values of the PCA at N equally spaced points, where N is an integer.

14. The method of claim 12, wherein step (g) comprises:

g.1) calculating a normalized voltage drive function from a current scan size of the microscope and the current nonlinear voltage drive function;

g.2) calculating normalized pitch values from the processed profile, wherein each of the normalized pitch values is defined as an observed pitch value divided by a mean of the observed pitch values;

g.3) generating a composite function by multiplying the normalized voltage drive function by the normalized pitch values;

g.4) fitting the composite function to a first nonlinear function curve having a functional form equivalent to:
Composite Function=$D+E*\exp(-F*x)+G*\exp(-H*x)$
where $2*F<H<50*F$; and g.5) determining a new nonlinear voltage drive function from the fitted composite function.

15. The method of claim 14, further comprising the step of:

g.6) if the current nonlinear voltage drive function is a constant or a constant plus a single exponential, then fit the composite function to a second nonlinear function curve having a functional form equivalent to:

Composite Function=D+E*exp (−F*x) prior to performing step (g.4).

16. The method of claim 12, wherein step (a) comprises:

a.1) selecting a scan size;

a.2) selecting a linear voltage drive function;

a.3) scanning a calibration specimen in order to create a coarse calibration data array;

a.4) generating a one-dimensional coarse calibration profile by calculating an average cross-section of the coarse calibration data array;

a.5) measuring feature locations in the coarse calibration profile;

a.6) calculating a coarse pitch value for each consecutive pair of feature locations;

a.7) creating a coarse processed profile comprising the coarse pitch values as a function of position;

a.8) calculating normalized coarse pitch values from the coarse processed profile, wherein each of the normalized coarse pitch values is defined as an observed coarse pitch value divided by a mean of the observed coarse pitch values;

a.9) fitting the normalized coarse pitch values as a function of normalized scan position to a nonlinear function curve; and a.10) creating a nonlinear voltage drive function from fit parameters determined in step (a.9).

17. The method of claim 12, wherein:

the calibration data array is a two-dimensional array;

step (c) comprises generating the one-dimensional calibration profile by calculating an average cross-section of the calibration data array; and the measurement data array is a two-dimensional array.

18. The method of claim 12, wherein step (g) comprises adjusting the nonlinear voltage drive function in order to remove any tilt and curvature in the processed profile.

19. The method of claim 10, wherein step (g) comprises:

g.1) calculating a normalized voltage drive function from a current scan size of the microscope and the current nonlinear voltage drive function;

g.2) calculating normalized pitch values from the processed profile, wherein each of the normalized pitch values is defined as an observed pitch value divided by a mean of the observed pitch values;

g.3) generating a composite function by multiplying the normalized voltage drive function by the normalized pitch values;

g.4) fitting the composite function to a nonlinear function curve having a functional form equivalent to the current nonlinear voltage drive function; and g.5) determining a new nonlinear voltage drive function from the fitted composite function.

20. A method for realtime closed-loop control of a scanning probe microscope, comprising the steps of:

a) scanning a calibration specimen in order to create a calibration data array;

b) mapping the calibration data array into a one-dimensional calibration profile;

c) creating a calibrated length scale L(X) by comparing the calibration profile to a known topography of the calibration specimen;

d) beginning a scan of a measurement specimen by moving the probe to a first programmed scan position PX(t);

e) receiving a probe position S(t) from the scanning probe microscope;

f) calculating a corrected probe position $S_{corr}(t)=L(S(t))$;

g) calculating a current feedback value $D_{corr}(t)=S_{corr}(t)-PX(t)$; and h) applying a drive voltage v(t+1) to the microscope in order to move the probe to a next programmed scan position PX(t+1), wherein v(t+1) is determined using $D_{corr}(t)$ in order to minimize an absolute value of $D_{corr}(t+1)$.

21. The method of claim 20, wherein:

the calibration data array is a two-dimensional array;

step (b) comprises generating the one-dimensional calibration profile by calculating an average cross-section of the calibration data array; and the measurement data array is a two-dimensional array.

22. The method of claim 20, wherein step (c) comprises:

c.1) measuring feature locations in the calibration profile;

c.2) calculating a pitch value for each consecutive pair of feature locations;

c.3) creating a processed profile comprising the pitch values as a function of position;

c.4) calculating a differential nonlinearity as a function of position comprising a theoretical pitch value divided by the calculated pitch value;

c.5) creating the calibrated length scale as an integral of the differential nonlinearity; and c.6) adjusting the calibrated length scale in order to reduce any nonlinearities in the processed profile.

23. A method for realtime open-loop control of a scanning probe microscope executing a scan of any size, comprising the steps of:

a) selecting a first scan size;

b) scanning a calibration specimen using the first scan size in order to create a two-dimensional first calibration data array;

c) generating a one-dimensional first calibration profile by calculating an average cross-section of the first calibration data array;

d) measuring first feature locations in the first calibration profile;

e) calculating a pitch value for each consecutive pair of first feature locations;

f) creating a first processed profile comprising the pitch values as a function of position;

g) determining a first nonlinear voltage drive function $\Delta v_1(t)$ including a term $Mag_1 * e^{(-Arg_1)t}$, where $Mag_1$ and $Arg_1$ are selected in order to reduce nonlinearities in the first processed profile;

h) selecting a second scan size;

i) scanning a calibration specimen using the second scan size in order to create a two-dimensional second calibration data array;

j) generating a one-dimensional second calibration profile by calculating an average cross-section of the second calibration data array;

k) measuring second feature locations in the second calibration profile;

l) calculating a pitch value for each consecutive pair of second feature locations;

m) creating a second processed profile comprising the pitch values as a function of position;

n) determining a second nonlinear voltage drive function $\Delta v_2(t)$ including a term $Mag_2 * e^{(-Arg_2)t}$, where $Mag_2$ and $Arg_2$ are selected in order to reduce nonlinearities in the second processed profile;

o) fitting $Mag_1$ and $Mag_2$ to a first derating function in order to create a first fit function;

p) fitting $Arg_1$ and $Arg_2$ to a second derating function in order to create a second fit function;

q) selecting a measurement scan size;

r) determining a measurement nonlinear voltage drive function $\Delta v_m(t)$ including a term $Mag_m * e^{(-Arg_m)t}$, where $Mag_m$ is interpolated/extrapolated from the first fit function and $Arg_m$ is interpolated/extrapolated from the second fit function; and s) applying the measurement nonlinear voltage drive function to the microscope in order to execute a measurement scan.

24. The method of claim 23, wherein:

the first derating function is a nonlinear function; and the second derating function is a linear function.

25. A method for high precision calibration by removing artifacts due to nonlinear motion in a scanning probe microscope, comprising the steps of:

a) scanning a calibration specimen in order to create a two-dimensional calibration data array;

b) generating a one-dimensional x-coordinate calibration profile by calculating an average cross-section of the calibration data array parallel to the x-axis;

c) creating an x-coordinate calibrated length scale by comparing the x-coordinate profile to a known topography of the calibration specimen;

d) generating a one-dimensional y-coordinate calibration profile by calculating an average cross-section of the calibration data array parallel to the y-axis;

e) creating a y-coordinate calibrated length scale by comparing the y-coordinate profile to a known topography of the calibration specimen;

f) scanning a measurement specimen in order to create a two-dimensional measurement data array;

g) applying the x-coordinate calibrated length scale to the x-coordinates of the measurement data array in order to correct nonlinearities in the measurement data array; and h) applying the y-coordinate calibrated length scale to the y-coordinates of the measurement data array in order to correct nonlinearities in the measurement data array.

26. A method for high precision calibration by removing artifacts due to nonlinear motion in a scanning probe microscope executing a scan of any size, comprising the steps of:

a) selecting a first scan size;

b) scanning a calibration specimen using the first scan size in order to create a first calibration data array;

c) mapping the first calibration data array into a one-dimensional first calibration profile;

d) creating a first calibrated length scale by comparing the first calibration profile to a known topography of the calibration specimen;

e) selecting a second scan size;

f) scanning a calibration specimen using the second scan size in order to create a second calibration data array;

g) mapping the second calibration data array into a one-dimensional second calibration profile;

h) creating a second calibrated length scale by comparing the second calibration profile to a known topography of the calibration specimen;

i) selecting a measurement scan size; and j) creating a measurement calibrated length scale L(X) applicable to the measurement scan size by interpolating/extrapolating parameters from the first and second calibrated length scales.

27. The method of claim 26, further comprising the steps of:

k) scanning a measurement specimen in order to create a two-dimensional measurement data array;

l) applying the measurement calibrated length scale to the measurement data array in order to correct nonlinearities in the measurement data array in at least one direction; and m) displaying the corrected measurement data array to a user.

28. The method of claim 26, wherein:

the first calibration data array is a two-dimensional array;

the second calibration data array is a two-dimensional array;

step (c) comprises generating the one-dimensional first calibration profile by calculating an average cross-section of the first calibration data array; and step (g) comprises generating the one-dimensional second calibration profile by calculating an average cross-section of the second calibration data array.

29. The method of claim 26, further comprising the steps of:

k) beginning a scan of a measurement specimen by moving the probe to a first programmed scan position PX(t);

l) receiving a probe position S(t) from the scanning probe microscope;

m) calculating a corrected probe position $S_{corr}(t)=L(S(t))$;

n) calculating a current feedback value $D_{corr}(t)=S_{corr}(t)-PX(t)$; and o) applying a drive voltage v(t+1) to the microscope in order to move the probe to a next programmed scan position PX(t+1), wherein v(t+1) is determined using $D_{corr}(t)$ in order to minimize an absolute value of $D_{corr}(t+1)$.

30. A method for high precision determination of Z-axis linearity in a scanning probe microscope, comprising the steps of:

a) providing a staircase-shaped specimen;

b) scanning the staircase specimen in order to generate a two-dimensional calibration data array;

c) generating a one-dimensional wedge profile by calculating an average cross-section of the calibration data array;

d) generating a reference profile;

e) detecting peaks in the reference profile;

f) generating a one-dimensional $Z_{reference}$ array containing height values at each peak pixel in the reference profile;

g) generating a one-dimensional $Z_{wedge}$ array containing height values at each pixel in the wedge profile corresponding to each pixel in the reference profile; and h) calculating a difference in height between successive peaks using the $Z_{wedge}$ and $Z_{reference}$ arrays.

31. The method of claim 27, wherein step (f) further comprises:
   f.1) for each peak, fitting data points corresponding to the peak to a nonlinear function;
   f.2) calculating a local maximum of each nonlinear function;
   f.3) calculating a height of each local maximum; and
   f.4) generating a one-dimensional $Z_{reference}$ array containing the local maximum heights.

32. The method of claim 30, wherein step (f) further comprises:
   f.1) defining a subarray of consecutive data points within each peak in the reference profile;
   f.2) for each subarray, averaging the heights of all of the data points within the subarray to obtain an average height for each peak; and
   f.3) generating a one-dimensional $Z_{reference}$ array containing the average height values.

33. The method of claim 30, wherein step (d) comprises:
   d.1) creating a two-dimensional modified calibration data array by performing a 3rd-order planefit of the calibration data array; and
   d.2) generating a one-dimensional reference profile by calculating an average cross-section of the modified calibration data array.

34. The method of claim 30, wherein step (d) comprises:
   d.1) fitting $Z_{wedge}$ to a third order polynomial $Z_{fit}$; and
   d.2) calculating a reference profile=$Z_{wedge}-Z_{fit}$.

35. The method of claim 30, further comprising the step of:
   i) adjusting a z-axis calibrated sensitivity of the microscope if the height differences of step (h) do not meet a predetermined criterion.

36. The method of claim 30, wherein step (g) further comprises:
   g.1) defining a sub-array of consecutive data points within each peak in the wedge profile;
   g.2) for each sub-array, averaging the heights of all of the data points within the sub-array to obtain an average height for each peak; and
   g.3) generating a one-dimensional $Z_{wedge}$ array containing the average height values.

37. The method of claim 30, wherein step (g) further comprises:
   g.1) for each peak, fitting data points corresponding to the peak to a nonlinear function;
   g.2) calculating a local maximum of each nonlinear function;
   g.3) calculating a height of each local maximum; and
   g.4) generating a one-dimensional $Z_{wedge}$ array containing the local maximum heights.

38. The method of claim 30, wherein step (a) further comprises mounting a linear grating on a wedged specimen holder.

39. A method for high precision determination of Z-axis linearity in a scanning probe microscope, comprising the steps of:
   a) providing a staircase-shaped specimen;
   b) scanning the staircase specimen in order to generate a two-dimensional calibration data array;
   c) generating a one-dimensional wedge profile by calculating an average cross-section of the calibration data array;
   d) fitting the wedge profile to an nth order polynomial;
   e) generating a reference profile equal to the wedge profile minus the fitted profile;
   f) detecting peaks in the reference profile;
   g) determining a peak centroid location for each peak;
   h) determining a height at each peak centroid location using the fitted profile; and
   i) calculating a difference in height between successive peak centroids.

40. The method of claim 39, further comprising the step of:
   j) adjusting a z-axis calibrated sensitivity of the microscope if the height differences of step (i) do not meet a predetermined criterion.

41. The method of claim 39, wherein step (a) further comprises mounting a linear grating on a wedged specimen holder.

42. A method for high precision calibration by removing artifacts due to nonlinear motion in a scanning probe microscope, comprising the steps of:
   a) scanning a calibration specimen comprising an array of features in order to create a two-dimensional calibration data array;
   b) locating the features in the calibration data array;
   c) generating a two-dimensional array of feature positions;
   d) generating a two-dimensional pitch array calculated as an observed separation between adjacent features in the calibration data array, wherein each pitch value is associated with an (x, y) coordinate of a midpoint between the adjacent features;
   e) calculating a two-dimensional x-coordinate differential nonlinearity array;
   f) calculating a two-dimensional y-coordinate differential nonlinearity array;
   g) fitting the x-coordinate differential nonlinearity array to a first nonlinear function;
   h) fitting the y-coordinate differential nonlinearity array to a second nonlinear function;
   i) creating an x-coordinate calibrated length scale as an integral of the x-coordinate differential nonlinearity array; and
   j) creating a y-coordinate calibrated length scale as an integral of the y-coordinate differential nonlinearity array.

43. The method of claim 42, further comprising the steps of:
   k) scanning a measurement specimen in order to create a two-dimensional measurement data array;
   l) applying the x-coordinate calibrated length scale to the measurement data array in order to correct nonlinearities in the measurement data array in the x direction;
   m) applying the y-coordinate calibrated length scale to the measurement data array in order to correct nonlinearities in the measurement data array in the y direction; and
   n) displaying the corrected measurement data array to a user.

44. The method of claim 42, wherein step (c) comprises calculating x- and y-coordinates of a centroid of each feature.

45. A method for high precision calibration by removing artifacts due to nonlinear motion in a scanning probe microscope, comprising the steps of:

a) scanning a calibration specimen comprising an array of multi-level structures, wherein each structure includes a feature on each level, in order to create a two-dimensional calibration data array;

b) for each level, locating each feature in the calibration data array;

c) for each level, calculating a z-coordinate of each feature as an average of z-coordinate values associated with each feature;

d) for each level, calculating an x-coordinate and a y-coordinate of each feature as a centroid of each feature;

e) for each level, generating a two-dimensional pitch array calculated as an observed separation between adjacent features, wherein each pitch value is associated with an (x, y) coordinate of a midpoint between the adjacent features;

f) calculating a three-dimensional x-coordinate differential nonlinearity array;

g) calculating a three-dimensional y-coordinate differential nonlinearity array;

h) calculating a three-dimensional z-coordinate differential nonlinearity array;

i) fitting the x-coordinate differential nonlinearity array to a first nonlinear function;

j) fitting the y-coordinate differential nonlinearity array to a second nonlinear function;

k) fitting the z-coordinate differential nonlinearity array to a third nonlinear function;

l) creating an x-coordinate calibrated length scale Lx(x, y,z) as an integral of the x-coordinate differential non-linearity array;

m) creating a y-coordinate calibrated length scale Ly(x, y,z) as an integral of the y-coordinate differential non-linearity array;

n) creating a z-coordinate calibrated length scale Lz(x,y,z) as an integral of the z-coordinate differential nonlinearity array.

46. The method of claim 45, further comprising the steps of:

o) scanning a measurement specimen in order to create a two-dimensional measurement data array;

p) applying the x-coordinate calibrated length scale to the measurement data array in order to correct nonlinearities in the measurement data array in the x direction;

q) applying the y-coordinate calibrated length scale to the measurement data array in order to correct nonlinearities in the measurement data array in the y direction;

r) applying the z-coordinate calibrated length scale to the measurement data array in order to correct nonlinearities in the measurement data array in the z direction; and s) displaying the corrected measurement data array to a user.

47. A method for high precision determination of Z-axis linearity in a scanning probe microscope, comprising the steps of:

a) providing a staircase-shaped specimen;

b) scanning the staircase specimen in order to generate a two-dimensional calibration data array;

c) generating a one-dimensional wedge profile by calculating an average cross-section of the calibration data array;

d) detecting peaks in the wedge profile;

e) generating a one-dimensional $Z_{wedge}$ array containing height values, wherein each height value is derived from a sub-array of consecutive data points within each peak in the wedge profile; and f) calculating a difference in height between successive elements in the $Z_{wedge}$ array.

48. The method of claim 47, further comprising the step of:

g) adjusting a Z-axis calibrated sensitivity of the microscope if the height differences of step (f) do not meet a predetermined criterion.

49. The method of claim 47, wherein step (a) further comprises mounting a linear grating on a wedged specimen holder.

50. A method for high precision determination of Z-axis linearity in a scanning probe microscope, comprising the steps of:

a) providing a staircase-shaped specimen;

b) scanning the staircase specimen in order to generate a two-dimensional calibration data array;

c) generating a one-dimensional wedge profile by calculating an average cross-section of the calibration data array;

d) fitting the wedge profile to an nth order polynomial, $Z_{fit}$;

e) generating a reference profile equal to the wedge profile minus the fitted profile;

f) detecting peaks in the reference profile;

g) determining a peak centroid location for each peak;

h) generating a calibrated length scale L(X) from the peak centroid locations;

i) choosing a set of equally spaced points $L_i$ on the calibrated length scale;

j) determining a set of corresponding points $X_i$, such that $L_i = L(X_i)$;

k) calculating Z-axis heights $Z_i$ at the points $X_i$ as: $Z_i = Z_{fit}(X_i)$; and l) calculating a difference in height between successive points $Z_i$ in order to determine Z-axis linearity.

51. The method of claim 50, further comprising the step of:

m) adjusting a Z-axis calibrated sensitivity of the microscope if the height differences of step (l) do not meet a predetermined criterion.

52. The method of claim 50, wherein step (a) further comprises mounting a linear grating on a wedged specimen holder.

53. A method for high precision adjustment of Z-axis calibrated sensitivity in a scanning probe microscope, comprising the steps of:

a) setting the Z-axis sensitivity ($Z_{sens}$) of the microscope to a constant;

b) providing a staircase-shaped specimen;

c) selecting a Z-axis center voltage (ZCV) for the microscope;

d) scanning the staircase specimen in order to generate a two-dimensional calibration data array;

e) generating a one-dimensional wedge profile by calculating an average cross-section of the calibration data array;

f) fitting the wedge profile to an nth order polynomial, $Z_{fit}$;

g) generating a reference profile equal to the wedge profile minus the fitted profile;

h) detecting peaks in the reference profile;

i) determining a Z-axis height $Z_i$ of each peak;

j) repeating steps (c) through (i) for at least one other Z-axis center voltage;

k) for each Z-axis center voltage scan, determining a Z voltage ($V_i$) for each point in the Z-axis height $Z_i$ array;

l) for each Z-axis center voltage scan, determining Z-axis sensitivity values $ZS_i$ as a function of Z voltage;

m) combining the Z-axis sensitivity values $ZS_i$ from each Z-axis center voltage scan; and n) fitting the combined Z-axis sensitivity values $ZS_i$ to a continuous function.

54. The method of claim 53, wherein step (a) further comprises mounting a linear grating on a wedged specimen holder.

55. The method of claim 53, wherein step (i) further comprises:

(i.1) determining a peak centroid location for each peak; and (i.2) determining a Z-axis height $Z_i$ at each peak centroid location as $Z_i = Z_{fit}(X_1)$.

56. The method of claim 53, wherein step (i) further comprises:

generating a one-dimensional $Z_i$ array containing height values, wherein each height value is derived from a sub-array of consecutive data points within each peak in the wedge profile.

57. The method of claim 53, wherein step (i) further comprises:

i.1) determining a peak centroid location for each peak;

i.2) generating a calibrated length scale L(X) from the peak centroid locations;

i.3) choosing a set of equally spaced points $L_i$ on the calibrated length scale;

i.4) determining a set of corresponding points $X_i$, such that $L_i = L(X_i)$;

i.5) calculating Z-axis heights $Z_i$ at the points $X_i$ as: $Z_i = Z_{fit}(X_i)$.

58. The method of claim 53, further comprising the steps of:

o) performing a measurement scan on a measurement sample; and p) using the fitted Z-axis sensitivity values to convert Z-axis voltage changes from the microscope to Z-axis height changes of the measurement sample.

59. A method for high precision adjustment of Z-axis calibrated sensitivity in a scanning probe microscope, comprising the steps of:

a) providing a staircase-shaped specimen;

b) scanning the staircase specimen at a plurality of absolute Z-axis positions in order to generate a plurality of corresponding two-dimensional calibration data arrays;

c) for each calibration data array, generating a one-dimensional wedge profile by calculating an average cross-section of the calibration data array;

d) for each wedge profile, fitting the wedge profile to an nth order polynomial;

e) for each wedge profile and each corresponding fitted profile, generating a reference profile equal to the wedge profile minus the fitted profile;

f) for each reference profile, detecting peaks in the reference profile;

g) for each reference profile, determining a peak centroid location for each peak;

h) for each reference profile, determining a height at each peak centroid location using the fitted profile;

i) using all of said reference profiles and associated peak centroid height values, calculating $WZ_{obs}(Z_i)$ as an absolute value of a difference between successive Z-axis height values, where $Z_i$ is a midpoint between peak centroid locations;

j) calculating a correction factor $K(Z_i)$ as:
$K(Z_i) = WZ_{cal}/WZ_{obs}(Z_i)$,
where $WZ_{cal}$ is a known Z-axis height increment of the grating;

k) fitting $K(Z_i)$ to a continuous function $K_{fit}(Z)$; and l) creating a calibrated length scale L(Z) from $K_{fit}(Z)$.

60. The method of claim 59, further comprising the steps of:

m) performing a measurement scan on a measurement sample; and n) correcting a Z-axis sensor output of the microscope using the calibrated length scale L(Z).

61. The method of claim 59, wherein step (a) further comprises mounting a linear grating on a wedged specimen holder.

62. A method for high precision calibration by removing artifacts due to nonlinear motion in a scanning probe microscope, comprising the steps of:

a) scanning a calibration specimen comprising a pyramid in order to create a two-dimensional calibration data array;

b) partitioning the calibration data array into a plurality of regions corresponding to data points having z-coordinate heights between a plurality of predetermined height thresholds;

c) calculating an (x, y) coordinate of a centroid of each of said plurality of regions;

d) calculating a mean z-coordinate height of each of said plurality of regions; and e) plotting said centroid (x, y) coordinates as a function of said mean z-coordinate heights.

63. A method for high precision calibration by removing artifacts due to non-linear motion in a scanning probe microscope, comprising the steps of:

a) selecting a scan size;

b) partitioning a slow axis of the scan size into at least a first region and a second region;

c) scanning a specimen in the first region of the slow axis using a relatively small number of fast axis scan lines to traverse the first region; and d) scanning the specimen in the second region of the slow axis using a relatively large number of fast axis scan lines to traverse the second region.

64. The method of claim 63, further comprising the steps of:

e) not capturing data when the microscope is scanning the first region; and f) capturing data when the microscope is scanning the second region.

65. A method for high precision calibration of a scanning probe microscope executing a scan of any size, comprising the step of:

a) selecting a scan size;

b) scanning a calibration specimen in order to create a calibration data array;

c) mapping the calibration data array into a one-dimensional calibration profile;

d) measuring feature locations in the calibration profile;

e) calculating a pitch value for each consecutive pair of feature locations;

f) creating a processed profile comprising the pitch values as a function of position;

g) calculating a normalized voltage drive function from a current scan size of the microscope and the current nonlinear voltage drive function;

h) calculating normalized pitch values from the processed profile, wherein each of the normalized pitch values is defined as an observed pitch value divided by a mean of the observed pitch values;

i) generating a composite function by multiplying the normalized voltage drive function by the normalized pitch values;

j) calculating a piecewise continuous approximation (PCA) of the composite function;

k) calculating a new nonlinear voltage drive function as an N-element array consisting of values of the PCA at N equally spaced points, where N is an integer;

l) repeating steps (a) through (k) for M different scan sizes, where M is an integer;

m) forming an N×M two dimensional array from the arrays calculated at step (k), arranged in order of scan size, where N is a number of steps in each scan;

n) associating each element $D_{ij}$ of the two-dimensional array with its scan size $V_j$, where $1 \leq i \leq N$ and $1 \leq j \leq M$;

o) calculating a piecewise continuous approximation ($PCA_i(V)$) to $D_i(V)$ for each column i in the two dimensional array;

p) selecting a measurement scan size $V_k$;

q) determining a drive array for the scanner by retrieving the values $PCA_i(V_k)$ for $1 \leq i \leq N$; and r) applying the drive array of step (q) to the microscope in order to execute a measurement scan.

66. A method for high precision calibration of a scanning probe microscope executing a scan of any size, comprising the steps of:

a) selecting a scan size;

b) scanning a calibration specimen in order to create a calibration data array;

c) mapping the calibration data array into a one-dimensional calibration profile;

d) measuring feature locations in the calibration profile;

e) calculating a pitch value for each consecutive pair of feature locations;

f) creating a processed profile comprising the pitch values as a function of position;

g) calculating a normalized voltage drive function from a current scan size of the microscope and the current nonlinear voltage drive function;

h) calculating normalized pitch values from the processed profile, wherein each of the normalized pitch values is defined as an observed pitch value divided by a mean of the observed pitch values;

i) generating a composite function by multiplying the normalized voltage drive function by the normalized pitch values;

j) fitting the composite function to a first continuous function;

k) if the composite function fit is inadequate in view of predetermined criteria, fitting the composite function to a more complex continuous function;

l) repeating step (k) until the predetermined criteria are satisfied;

m) repeating steps (a) through (1) for M different scan sizes, where M is an integer;

n) tabulating the results of steps (a) through (m) in an array consisting of scan size, function identification number, and values of the function parameters;

o) establishing an applicable scan voltage range for each identified function in the array;

p) calculating a piecewise continuous approximation PCA (V) of each function parameter within each voltage range;

q) selecting a measurement scan size $V_k$;

r) determining the fitted composite function parameters $PCA(V_k)$ for the measurement scan size;

s) determining a nonlinear drive function for the measurement scan size from the fitted composite function; and t) applying the nonlinear drive function to the microscope in order to execute a measurement scan.

67. A method for high precision calibration of a scanning probe microscope executing a scan of any size, comprising the steps of:

a) selecting a scan size;

b) scanning a calibration specimen in order to create a calibration data array;

c) mapping the calibration data array into a one-dimensional calibration profile;

d) measuring feature locations in the calibration profile;

e) calculating a pitch value for each consecutive pair of feature locations;

f) creating a processed profile comprising the pitch values as a function of position;

g) calculating a normalized voltage drive function from a current scan size of the microscope and the current nonlinear voltage drive function;

h) calculating normalized pitch values from the processed profile, wherein each of the normalized pitch values is defined as an observed pitch value divided by a mean of the observed pitch values;

i) generating a composite function by multiplying the normalized voltage drive function by the normalized pitch values;

j) fitting the composite function to a first continuous function;

k) if the composite function fit is inadequate in view of predetermined criteria, fitting the composite function to a more complex continuous function;

l) repeating step (k) until the predetermined criteria are satisfied;

m) repeating steps (a) through (1) for M different scan sizes, where M is an integer;

n) tabulating the results of steps (a) through (m) in an array consisting of scan size, function identification number, and values of the function parameters;

o) establishing an applicable scan voltage range for each identified function in the array;

p) fitting the values of the function parameters to a continuous function within each voltage range;

q) selecting a measurement scan size $V_k$;

r) determining the fitted composite function parameters for the measurement scan size from the appropriate continuous function from step (p);

s) determining a non linear drive function for the measurement scan size from the fitted composite function; and t) applying the nonlinear drive function to the microscope in order to execute a measurement scan.

68. A method for realtime sensitivity calibration in an open-loop scanner, comprising the steps of:

a) selecting a scan rate;

b) selecting a scan size;

c) scanning a calibration specimen in order to create a calibration data array;

d) mapping the calibration data array into a one-dimensional calibration profile;

e) measuring feature locations in the calibration profile;

f) calculating a pitch value for each consecutive pair of feature locations;

g) creating a processed profile comprising the pitch values as a function of position;

h) calculating a mean observed pitch of the processed profile;

i) calculating a sensitivity correction factor SC(V) for the selected scan size as follows:
SC(V)=nominal pitch (V)/mean pitch (V),
where V is the selected scan size;

j) repeating steps (b) through (i) for M different scan sizes, where M is an integer, thereby creating a 1×M array SC(V);

k) retrieving a current scanner sensitivity array SENS(V);

l) calculating a composite function as follows:
Composite (V)=SENS(V)*SC(V);

m) fitting the composite function to a continuous function;

n) selecting a measurement scan size $V_k$;

o) determining a measurement scanner sensitivity from the fitted composite function for the measurement scan size; and p) scanning a measurement specimen using the measurement scanner sensitivity in order to create a measurement data array.

69. A method for realtime sensitivity calibration in an open-loop scanner, comprising the steps of:

a) selecting a scan rate;

b) selecting a scan size;

c) scanning a calibration specimen in order to create a calibration data array;

d) mapping the calibration data array into a one-dimensional calibration profile;

e) measuring feature locations in the calibration profile;

f) calculating a pitch value for each consecutive pair of feature locations;

g) creating a processed profile comprising the pitch values as a function of position;

h) calculating a mean observed pitch of the processed profile;

i) calculating a sensitivity correction factor SC(V) for the selected scan size as follows:
SC(V)=nominal pitch (V)/mean pitch (V),
where V is the selected scan size;

j) repeating steps (b) through (i) for M different scan sizes, where M is an integer, thereby creating a 1×M array SC(V);

k) retrieving a current scanner sensitivity array SENS(V);

l) calculating a composite function as follows:
Composite (V)=SENS(V)*SC(V);

m) calculating a piecewise continuous approximation PCA(V) of the composite function;

n) selecting a measurement scan size $V_k$;

o) determining a measurement scanner sensitivity PCA ($V_k$) for the measurement scan size; and p) scanning a measurement specimen using the measurement scanner sensitivity in order to create a measurement data array.

* * * * *